(12) United States Patent
Unkefer et al.

(10) Patent No.: US 7,706,806 B2
(45) Date of Patent: *Apr. 27, 2010

(54) SYSTEMS AND METHODS FOR EVALUATING A CHANGE IN CLASS FOR A POINT OF COMMUNICATION

(75) Inventors: Ronald A. Unkefer, Dallas, TX (US); Gary Marlin Lawrence, Dallas, TX (US); William Roland Hieatt, III, Richardson, TX (US); Harold A. Rose, Dallas, TX (US)

(73) Assignee: Media Technology Ventures, LLC, Dallas, TX (US)

( * ) Notice: Subject to any disclaimer, the term of this patent is extended or adjusted under 35 U.S.C. 154(b) by 96 days.

This patent is subject to a terminal disclaimer.

(21) Appl. No.: 11/690,051

(22) Filed: Mar. 22, 2007

(65) Prior Publication Data

US 2007/0225010 A1 Sep. 27, 2007

Related U.S. Application Data

(60) Provisional application No. 60/785,337, filed on Mar. 23, 2006.

(51) Int. Cl.
*H04Q 7/20* (2006.01)
(52) U.S. Cl. ............ 455/452.2; 455/450; 455/423; 455/452.1; 455/435.3
(58) Field of Classification Search ........... 455/452.1, 455/67.11, 425, 450, 422.1; 703/6; 701/214
See application file for complete search history.

(56) References Cited

U.S. PATENT DOCUMENTS

| | | | |
|---|---|---|---|
| 5,732,354 A | 3/1998 | MacDonald | |
| 6,094,580 A | 7/2000 | Yu et al. | |
| 6,336,035 B1 * | 1/2002 | Somoza et al. | 455/446 |

(Continued)

OTHER PUBLICATIONS

U.S. Appl. No. 11/689,988, filed Mar. 22, 2007, Communication Spectrum Maximization Systems and Methods.

(Continued)

*Primary Examiner*—Patrick N Edouard
*Assistant Examiner*—Julio Perez
(74) *Attorney, Agent, or Firm*—Knobbe, Martens, Olson & Bear, LLP

(57) ABSTRACT

A computer-based program performs calculations to analyze, vary, test, manage, and/or improve the performance of channels and/or frequencies in the communication spectrum. The program varies parameters of a point of communication, such as the location, transmission power, channel frequency, antenna height, and the like, alone or in combination, to measure, test, and/or evaluate which parameter changes increase the market coverage of a target market or area. In some scenarios, changes to one point of communication cause the regulations governing the broadcast relationship between one or more nearby points of communication to be violated. When this occurs, the program determines which of the parameters, such as the location, transmission power, channel and/or frequency, antenna height, and the like, alone or in combination, of the point of communication interfering with the increased market coverage scenario to vary to overcome the conflict with communications and/or regulatory law. In addition, the program can determine simultaneously which of the parameters of multiple points of communication to vary to overcome the conflict with communications and/or regulatory law. The program outputs multiple solutions with varying degrees of difficulty and varying amounts of performance improvement.

2 Claims, 34 Drawing Sheets

U.S. PATENT DOCUMENTS

| | | | |
|---|---|---|---|
| 6,408,185 | B1 | 6/2002 | Freeman et al. |
| 6,625,454 | B1 | 9/2003 | Rappaport et al. |
| 6,832,070 | B1 * | 12/2004 | Perry et al. .................. 455/3.02 |
| 6,834,180 | B1 * | 12/2004 | Marshall ................... 455/67.11 |
| 7,035,632 | B2 | 4/2006 | Gutowski |
| 7,035,642 | B2 | 4/2006 | Rappaport et al. |
| 7,035,643 | B2 | 4/2006 | Slawitschka et al. |
| 7,079,844 | B2 | 7/2006 | Furukawa et al. |
| 7,085,697 | B1 | 8/2006 | Rappaport et al. |
| 7,096,173 | B1 | 8/2006 | Rappaport et al. |
| 7,113,753 | B2 | 9/2006 | Cotanis |
| 7,116,753 | B2 | 10/2006 | Bigler et al. |
| 7,146,298 | B2 * | 12/2006 | Motamedi et al. .............. 703/6 |
| 7,248,876 | B2 | 7/2007 | Hirvonen |
| 7,289,811 | B2 | 10/2007 | Sawaya et al. |
| 7,580,712 | B2 | 8/2009 | Nordling |
| 2002/0050944 | A1 * | 5/2002 | Sheynblat et al. ....... 342/357.06 |
| 2002/0058503 | A1 * | 5/2002 | Gutowski .................... 455/423 |
| 2002/0063656 | A1 | 5/2002 | Gutowski |
| 2004/0242158 | A1 | 12/2004 | Fattouch et al. |
| 2006/0031082 | A1 * | 2/2006 | Amaitis et al. ................. 705/1 |
| 2008/0125130 | A1 | 5/2008 | Francalanci et al. |

OTHER PUBLICATIONS

U.S. Appl. No. 11/690,066, filed Mar. 22, 2007, Systems and Methods for Evaluating Point of Communication Locations.

U.S. Appl. No. 11/690,044, filed Mar. 22, 2007, Systems and Methods for Evaluating Changes in Transmissions for a Point of Communication.

U.S. Appl. No. 11/690,051, filed Mar. 22, 2007, Systems and Methods for Evaluating a Change in Class for a Point of Communication.

U.S. Appl. No. 11/690,022, filed Mar. 22, 2007, Systems and Methods for Scoring Communication Spectrum Maximization.

U.S. Appl. No. 11/690,023, filed Mar. 22, 2007, Systems and Methods for Determining Feasibility of Communication Spectrum Maximization.

U.S. Appl. No. 11/689,983, filed Mar. 22, 2007, Systems and Methods for Determining a Community of License.

U.S. Appl. No. 11/689,979, filed Mar. 22, 2007, Systems and Methods for Analyzing Accommodation Facilities.

U.S. Appl. No. 11/690,079, filed Mar. 22, 2007, Systems and Methods for Calculating Height Above Average Terrain.

U.S. Appl. No. 11/690,039, filed Mar. 22, 2007, Systems and Methods for Determining Replacement Communication Facility.

U.S. Appl. No. 11/690,050, filed Mar. 22, 2007, Systems and Methods for Determining a Location for a Communication Facility.

* cited by examiner

| Call | Cls | City | In Mkt Pop | % Mkt Increase | Total % of Mkt | Cmp Score <> |
|------|-----|------|-----------:|---------------:|---------------:|-------------:|
| KKHQFM | C | Oelwein, IA | 170085 | 90.08 | 100.00 | 900 |
| KGRR | C3 | Epworth, IA | 140429 | 82.56 | 82.56 | 862 |
| KBEAFM | C1 | Muscatine, IA | 169046 | 69.91 | 99.39 | 849 |
| KMCS | A | Muscatine, IA | 145164 | 85.35 | 85.35 | 775 |
| KMAQFM | A | Maquoketa, IA | 170085 | 100.00 | 100.00 | 700 |
| KQMGFM | A | Independence, IA | 168763 | 99.22 | 99.22 | 695 |
| KQMGFM_A | A | Independence, IA | 168763 | 99.21 | 99.22 | 695 |
| KSKB | C2 | Brooklyn, IA | 168710 | 99.19 | 99.19 | 645 |
| KDST | A | Dyersville, IA | 159791 | 93.95 | 93.95 | 613 |
| KCIIFM | C2 | Washington, IA | 614 | 0.36 | 0.36 | 451 |
| KRTI | A | Grinnell, IA | 949 | 0.56 | 0.56 | 451 |
| KZATFM | C2 | Belle Plaine, IA | 61032 | 35.88 | 35.88 | 373 |
| KBOBFM | A | De Witt, IA | 0 | 0.00 | 0.00 | 0 |
| KLVVC | C2 | Dubuque, IA | 0 | 0.00 | 0.00 | 0 |
| WJOD_C | C2 | Asbury, IA | 0 | 0.00 | 0.00 | 0 |
| KLYV | C2 | Dubuque, IA | 0 | 0.00 | 0.00 | 0 |
| KXIA | C1 | Marshalltown, IA | 0 | 0.00 | 0.00 | 0 |
| KMCH | A | Manchester, IA | 0 | 0.00 | 0.00 | 0 |
| KOELFM | C3 | Cedar Falls, IA | 0 | 0.00 | 0.00 | 0 |
| KCRR | C3 | Grundy Center, IA | 0 | 0.00 | 0.00 | 0 |
| AP280_A | A | Dunkerton, IA | 0 | 0.00 | 0.00 | 0 |
| KCVM | A | Hudson, IA | 0 | 0.00 | 0.00 | 0 |
| WJOD | C3 | Asbury, IA | 0 | 0.00 | 0.00 | 0 |

Scenario for KXXI (original channel = 229C)

| # | Cha | Cls | CLOFS | Tower | Ovl | In Ma... | Ek% | Scn% | %Dif | Ex Tot | Scn Tot | Dif T... | Imp Sc | Pop Sc | Comp... |
|---|---|---|---|---|---|---|---|---|---|---|---|---|---|---|---|
| 4 | 229 | C | 50.0 | -573.13 | 2 | 641023 | 0.0 | 90.1 | 90.1 | 101795 | 679983 | 578188 | 30 | 900 | 600 |
| 5 | 229 | C | 49.6 | -647.7 | 0 | 490004 | 0.0 | 68.9 | 68.9 | 101795 | 530656 | 428861 | 90 | 688 | 794 |
| 2 | 229 | C | 53.2 | -172.19 | 2 | 453559 | 0.0 | 63.7 | 63.7 | 101795 | 496495 | 394700 | 30 | 637 | 468 |
| 11 | 229 | C0 | 46.4 | -423.13 | 2 | 435848 | 0.0 | 61.2 | 61.2 | 101795 | 470219 | 368424 | 25 | 612 | 431 |
| 13 | 229 | C0 | 45.1 | -524.7 | 2 | 323560 | 0.0 | 45.5 | 45.5 | 101795 | 359459 | 257664 | 85 | 454 | 652 |
| 3 | 229 | C | 49.3 | -22.19 | 2 | 266752 | 0.0 | 37.5 | 37.5 | 101795 | 303189 | 201394 | 25 | 374 | 312 |
| 7 | 229 | C0 | 53.1 | 226.72 | 2 | 218989 | 0.0 | 30.8 | 30.8 | 101795 | 265466 | 163671 | 30 | 307 | 303 |
| 1 | 229 | C0 | 14.3 | -57.66 | 1 | 2346 | 0.0 | 0.3 | 0.3 | 101795 | 215308 | 113513 | 35 | 3 | 176 |
| 8 | 229 | C1 | 17.6 | -40.26 | 1 | 9225 | 0.0 | 1.3 | 1.3 | 101795 | 211743 | 109948 | 35 | 12 | 181 |
| 15 | 229 | C0 | 15.2 | -162.28 | 1 | 5515 | 0.0 | 0.8 | 0.8 | 101795 | 208577 | 106782 | 35 | 7 | 178 |
| 17 | 229 | C1 | 24.5 | -554.54 | 1 | 5331 | 0.0 | 0.7 | 0.7 | 101795 | 191765 | 89970 | 35 | 7 | 178 |
| 12 | 229 | C1 | 42.0 | -272.13 | 0 | 160527 | 0.0 | 22.6 | 22.6 | 101795 | 188927 | 87132 | 25 | 225 | 237 |
| 18 | 229 | C2 | 12.2 | -285.47 | 2 | 1914 | 0.0 | 0.3 | 0.3 | 101795 | 179586 | 77791 | 75 | 2 | 376 |
| 24 | 229 | C2 | 12.5 | 108.74 | 0 | 1958 | 0.0 | 0.3 | 0.3 | 101795 | 164059 | 62264 | 65 | 2 | 326 |
| 21 | 229 | C0 | 18.4 | -291.9 | 2 | 2502 | 0.0 | 0.4 | 0.4 | 101795 | 128985 | 27190 | 25 | 3 | 126 |
| 20 | 229 | C1 | 40.4 | -373.7 | 0 | 84501 | 0.0 | 11.9 | 11.9 | 101795 | 114688 | 12893 | 85 | 118 | 484 |
| 19 | 229 | C1 | 22.6 | 403.54 | 2 | 3136 | 0.0 | 0.4 | 0.4 | 101795 | 93161 | 8634 | 85 | 4 | 427 |
| 14 | 229 | C1 | 44.9 | 120.01 | 0 | 38452 | 0.0 | 4.3 | 4.3 | 101795 | 61923 | 39072 | 25 | 21 | 135 |
| 23 | 229 | C2 | 17.5 | 254.54 | 2 | 1914 | 0.0 | 0.3 | 0.3 | 101795 | 54203 | 47592 | 90 | 1 | 425 |
| 8 | 229 | C0 | 48.7 | 378.72 | 2 | 3478 | 0.0 | 0.5 | 0.5 | 101795 | 45708 | 58087 | 85 | 2 | 126 |
| 18 | 229 | C | 47.8 | -588.42 | 0 | 3800 | 0.0 | 1.4 | 1.4 | 101795 | 33438 | 68357 | 85 | 8 | 453 |
| 16 | 229 | C0 | 40.7 | -436.42 | 0 | 9692 | 0.0 | 1.4 | 1.4 | 101795 | 24491 | 77384 | 65 | 6 | 420 |
| 23 | 229 | C1 | 39.3 | -285.42 | 2 | 8234 | 0.0 | 1.2 | 1.2 | 101795 | 18471 | 83324 | 85 | 5 | 427 |
| 22 | 229 | C3 | 25.3 | 261 | 0 | 6517 | 0.0 | 0.9 | 0.9 | 101795 | 8537 | 93258 | 85 | 4 | 327 |
| 23 | 229 | C2 | 31.5 | 136.42 | 2 | 4508 | 0.0 | 0.6 | 0.6 | 101795 | 7992 | 93813 | 85 | 3 | 426 |
| 27 | 229 | A | 18.1 | 261 | 0 | 4807 | 0.0 | 0.7 | 0.7 | 101795 | 6107 | 85688 | 85 | 3 | 426 |
| 26 | 229 | C3 | 26.5 | -86.42 | 2 | 2696 | 0.0 | 0.3 | 0.3 | 101795 | 5454 | -96341 | 85 | 1 | 425 |
| 28 | 229 | A | 20.3 | -88.42 | 0 | 2478 | 0.0 | 0.3 | 0.3 | 101795 | 4443 | 97352 | 85 | 1 | 425 |

SYSTEMS AND METHODS FOR EVALUATING A CHANGE IN CLASS FOR A POINT OF COMMUNICATION

This application claims the benefit of priority under 35 U.S.C. §119(e) of U.S. Provisional Application No. 60/785,337 filed on Mar. 23, 2006 and titled COMMUNICATION SPECTRUM MAXIMIZATION SYSTEMS AND METHODS, the entirety of which is hereby incorporated herein by reference.

BACKGROUND OF THE INVENTION

1. Field of the Invention

This invention relates generally to systems and methods for analyzing, varying, testing, managing, and/or improving transmission in the communication spectrum.

2. Description of the Related Art

Broadcasting includes the distribution of audio, video, and/or data signals from a point of communication to one or more devices and from the one or more devices to the point of communication.

There has also been extensive growth in communications throughout the world. Many separate entities are involved. Furthermore, these entities are typically assigned specific portions of the communication spectrum within defined regions.

For example, communication systems are often regulated by one or more government organizations. In the United States, for instance, the Federal Communications Commission (FCC) licenses radio and television stations. Further, the FCC regulates the broadcast frequency, the transmission power, the distance between stations, and the like so that the communication facilities provide improved service in service coverage areas for the benefit of the public. The FAA (Federal Avionics Administration), in an example, determines the allowable tower height. The FCC confirms that the tower height has been accepted by the FAA before listing the tower in a tower database. The Antenna Structure Registration (ASR) database is an example of an FCC tower database.

Population growth, changing demographics, and improvements in broadcasting technologies, however, have created needs for new and improved communication techniques. Unfortunately, making improvements and modifications to existing communication systems is a highly complex process as improvements and modifications made to one point of communication may encroach on the rights of other facilities or may violate governmental rules and regulations.

SUMMARY OF THE INVENTION

Today there are thousands of points of communication in the United States, and many more worldwide. For example, embodiments of the invention can be applied to points of communication that include, but are not limited to, analog transmissions or digital transmissions such as radio, television, wireless, cellular, WI-FI, WiMAX, emergency communications systems, data transmissions, and the like. In these embodiments, the points of communication can represent radio stations, television stations, wireless transmission points, cellular transmission points, satellite transmitters, WI-FI transmission points, WiMAX transmission points, emergency communications systems, data transmission systems, and the like.

Many of these points of communication can be altered to increase market or area coverage. For example, it is possible to increase the coverage associated with a particular point of communication by changing one or more of the operational parameters. These operational parameters may include by way of example, facility location, broadcast frequency, transmission power, station class, broadcast antenna height, or the like.

In one embodiment of the invention, a computerized system tests, analyzes, varies, manages, decreases and/or increases one or more potential operational parameters associated with a point of communication to determine the likely improvement in desired coverage. Furthermore, one embodiment of the invention electronically ranks the potential operational parameters based at least in part on user-defined objectives. Such user defined objectives may include, but are not limited to, coverage of target markets, target areas, geographic areas, populations, and/or demographics. Another embodiment evaluates the potential operational parameters with respect to applicable communications and/or regulatory laws.

For example, an embodiment analyzes and/or varies possible transmission locations and/or orientations associated with allocated communication spectrum. Another embodiment analyzes and/or varies possible transmission locations and/or orientations associated with allocated communication spectrum with respect to applicable communications and/or regulatory laws. The coverage attributes of the signal transmitted from each such location and/or orientation are then calculated and/or analyzed applying user defined parameters to improve the potential of the communication spectrum.

One embodiment of the invention analyzes user-defined existing transmission location options. Another embodiment analyzes hypothetical transmission location options by applying user-defined parameters. One embodiment maximizes the effective broadcast coverage by optimizing the number, placement, and/or power of "virtual" boosters, "virtual" antennas, "virtual" broadcast sites, and/or "virtual" translators within the user-defined target area. In other words, an embodiment of the invention plots these virtual devices in places where they currently do not exist (and varies their characteristics such as: power, height, polarization, and/or frequency) in order to formulate the ideal combination of transmission components to reach the market or area coverage goal.

One embodiment locates the "virtual" antenna(s) on existing structures, such as towers and buildings, with heights defined in an accessible database. Another embodiment locates the "virtual" antenna(s) anywhere in the coverage geography at height limits with respect to applicable communications and/or regulatory laws.

An embodiment analyzes and/or varies signal transmission attributes including, but not limited to, power and/or height, and/or antenna attributes including, but not limited to, orientation, directionalization, and/or polarization. Another embodiment analyzes and/or varies signal transmission attributes including, but not limited to, power and/or height, and/or antenna attributes including, but not limited to, orientation, directionalization, and/or polarization with respect to applicable communications and/or regulatory laws. The various coverages associated with each of the modified transmission and/or antenna attributes are then calculated and/or analyzed applying user-defined parameters to improve the potential of the communication spectrum. One embodiment varies the effected radiated power at different heights and tests the results against user-defined parameters with respect to applicable communications and/or regulatory laws. Another embodiment varies the orientation directionalization, and/or polarization of the transmitting antenna and matches that data against specific antenna patterns in order to maximize user-defined coverages of target markets, target areas, geographic areas, and/or population/demographics.

Another embodiment analyzes channels in a user-defined target area by combining a plurality of channels to meet user-defined coverage objectives in such area. Another embodiment analyzes low signal level areas of a station's field strength contour that can be improved with one or more booster(s), translator(s), and/or repeater(s). An embodiment analyzes and/or varies alternative channels. Another embodiment analyzes and/or varies alternative channels with respect to applicable communications and/or regulatory laws. The coverage attributes of the signal transmitted on each such channel are then calculated and/or analyzed applying user defined parameters to improve the potential of the communication spectrum.

Another embodiment analyzes and/or varies alternative transmission frequencies. Another embodiment analyzes and/or varies alternative transmission frequencies with respect to applicable communications and/or regulatory laws. The coverage attributes of the signal transmitted on each such frequency are then calculated and/or analyzed applying user defined parameters to improve the potential of the communication spectrum. One embodiment analyzes frequencies to determine spacing attributes relative to other frequency allocations. Another embodiment analyzes frequencies to determine the field strength contour overlap/separation relative to frequency allocations.

An embodiment combines some or all of its output and external data in order to rank and/or score each of the different spectrum alternatives to maximize user defined objectives. Each spectrum alternative can be assigned one or more numerical scores based at least in part on financial or other indications of feasibility.

In another embodiment, the performance score is based upon the increase of the coverage of the targeted population and/or demographic. In another embodiment, the complexity score indicates how well each alternative meets spacing requirements. In another embodiment, the complexity score indicates how well each alternative meets spacing requirements with respect to applicable communications and/or regulatory laws. In another embodiment, the efficiency score indicates the feasibility of output scenarios from a financial perspective such as values of various cost factors for each output scenario, including but not limited to, transmitter power, antenna type, FCC filing type, and/or tower height to show how well each alternative meets user-defined financial parameters and/or objectives. In another embodiment, the net present value calculates costs and values involved in meeting the market or area coverage goal of the target station. In another embodiment, the composite score reflects a combination of the performance, complexity, efficiency, net present value and/or other scores in accordance with user-defined criteria.

An embodiment analyzes partial market or area coverage station(s) that can be combined with a target station to produce enhanced coverage of a user-defined area.

Another embodiment receives data from a remote signal strength measurement and reporting system. Areas or points can be set in geographic locations in each market or area based upon user-defined criteria. Each area and/or point could have topographical data associated with it along with location data. An embodiment analyzes and/or adjusts the parameters, including but not limited to, transmission power, antenna height, and/or antenna orientation until the coverage characteristics meet the user-defined objectives.

Another embodiment analyzes the furthest reception points around the perimeter of a target market area using known obstructions, including but not limited to, buildings and/or topography, to model the location for a transmitting tower. Once the tower is located, various parameters, including but not limited to, transmission power, antenna height and/or antenna orientation can be applied to enhance coverage of the field strength contour until it reaches the user-defined coverage objective.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 28 is a screen shot illustrating a list of possible target stations, according to an embodiment of the invention.

FIG. 29 is a screen shot illustrating a list of scenarios for a target station, according to an embodiment of the invention.

FIG. 31 is a screen shot illustrating a list of possible accommodation stations, according to an embodiment of the invention.

DETAILED DESCRIPTION OF THE PREFERRED EMBODIMENTS

In one example of the invention, a computer-based program performs calculations to analyze, vary, test, manage, and/or improve the performance of channels and/or frequencies in the communication spectrum. The program varies parameters of a point of communication, such as the location, transmission power, channel frequency, antenna height, and the like, alone or in combination, to determine which parameter changes improve the market or area coverage of a target market or area. In some scenarios, changes to one point of communication cause the regulations governing the broadcast relationship between nearby points of communication to be violated. When this occurs, the program determines which of the parameters, such as the location, transmission power, channel, frequency, antenna height, and the like, alone or in combination, of the point of communication interfering with the improved market or area coverage scenario to vary to overcome conflicts from communications and/or regulatory laws.

Figure 1:
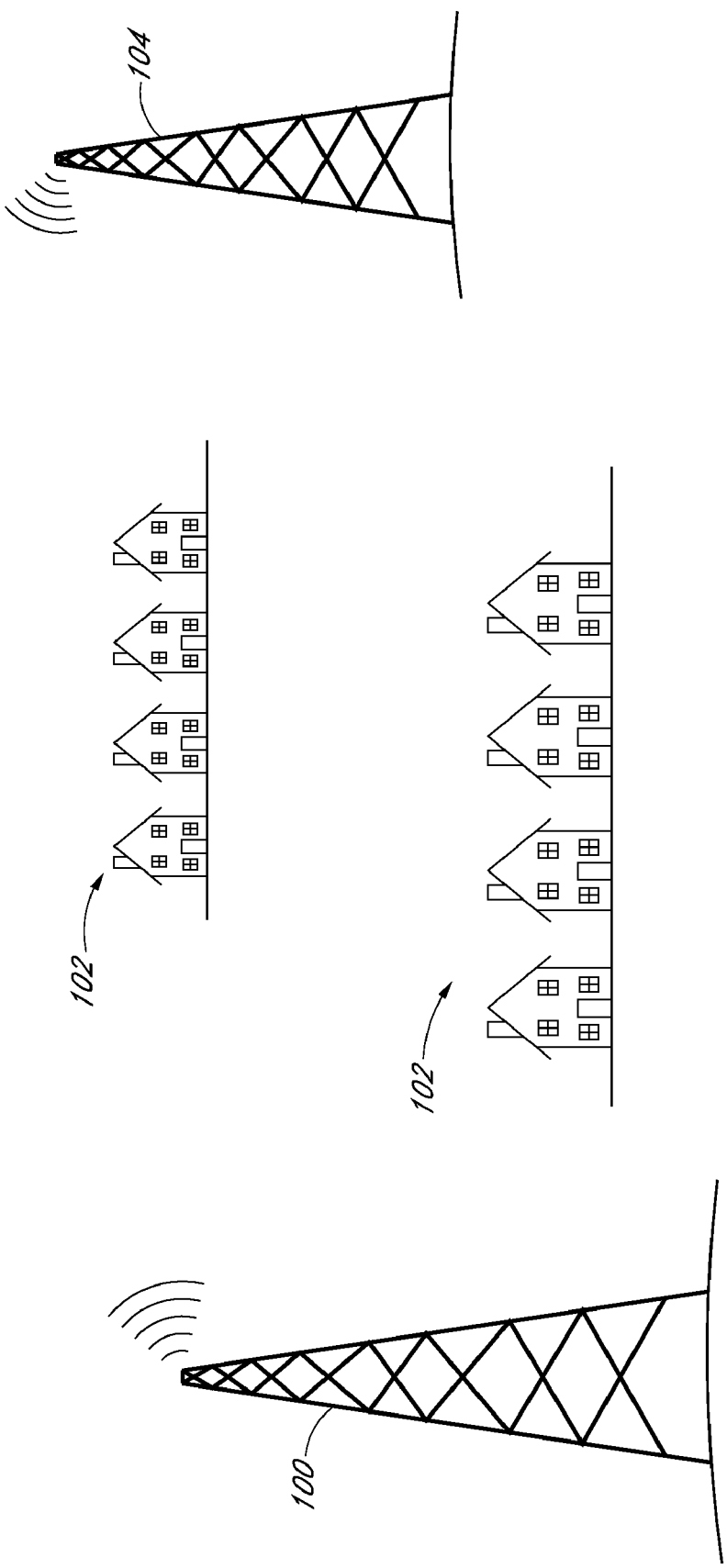
FIG. 1 illustrates a target station having a coverage area and a possible accommodation station, according to an embodiment of the invention.

Referring to FIG. 1, a market or area 102 receives broadcast coverage from a first point of communication 100. The market or area 102 can be defined by a geographic area, population, or demographics, such as age, ethnicity, or the like. Embodiments described below relate to increasing the market or area coverage of the first point of communication or the target station 100. In an embodiment of the invention, the program 3414 varies parameters of the target station 100, such as the location, transmission power, channel, frequency, antenna height, and the like, alone or in combination, to determine which parameter changes improve the broadcast coverage of the market or area 102 by the target station 100.

In some scenarios, changes to the target station 100 cause the regulations governing the broadcast relationship between the target station 100 and a second point of communication or accommodation station 104 to be violated. When this occurs, the program 3414 determines which of the parameters, such as the location, transmission power, channel, frequency, antenna height, and the like, alone or in combination, of the second point of communication or accommodation station 104 to vary to possibly overcome the regulatory conflict between the target station 100 and the accommodation station 104.

The embodiments described below relate to varying the communication spectrum of FM radio. Thus, the target station 100 and the accommodation station 104 represent FM radio stations in the embodiments described below.

Other embodiments of the invention can be applied to other ranges of the communication spectrum, including, but not limited to analog transmissions, or digital transmissions such as radio, television, wireless, cellular, WI-FI, WiMAX, emergency communications systems, data transmissions and the like. In these embodiments, the points of communication 100, 104 can represent radio stations television stations, wireless transmission points, cellular transmission points, satellite transmitters, WI-FI transmission points, WiMAX transmission points, emergency communications systems, data transmission systems, and the like.

Figure 2:
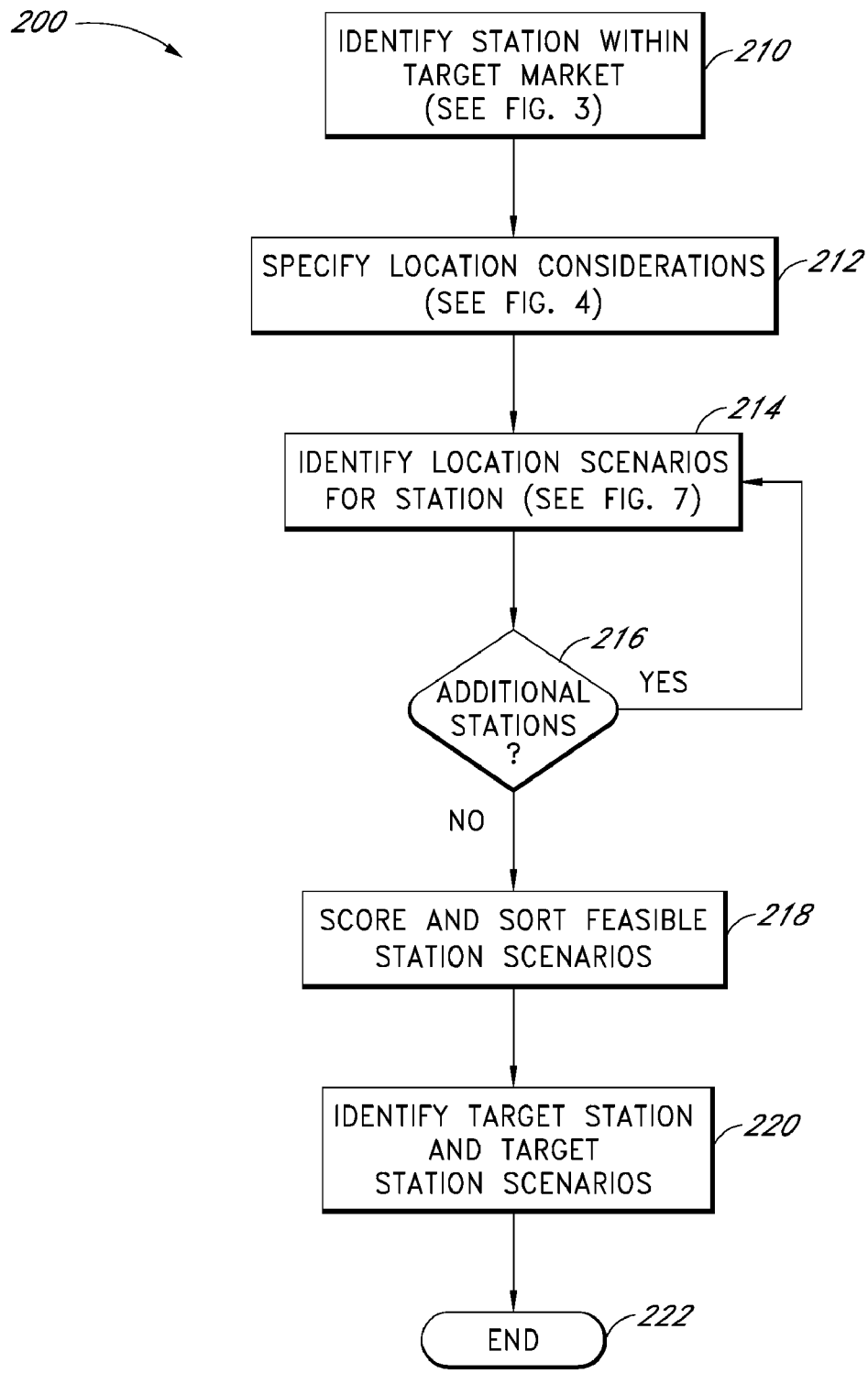
FIG. 2 is a flow chart of an embodiment of the communication spectrum variation process.

FIG. 2 is a flow chart of an embodiment of a communication spectrum maximization process 200. The communication spectrum maximization process 200 identifies the target radio stations 100 and possible target station scenarios that meet the market criteria. In an embodiment, the market criteria are user-defined. In an embodiment, the target station scenarios comprise changes to the target station 100. In another embodiment, the target station scenarios comprise changes to the target station 100 and one or more accommodation stations 104.

In an embodiment, the communication spectrum maximization process 200 is implemented as a computer-based software application or firmware/hardware based application and/or program. A communication spectrum improvement system 3400 comprising a computer 3410, and memory 3412 is described in detail in FIG. 34. In an embodiment, the memory 3412 comprises a computer-based software application or firmware/hardware based application and/or program 3414, which comprises the communication spectrum maximization process 200, and database information 3416. In an embodiment, the database information 3416 comprises terrain databases, demographic databases, location databases, station databases, and the like.

Figure 3:
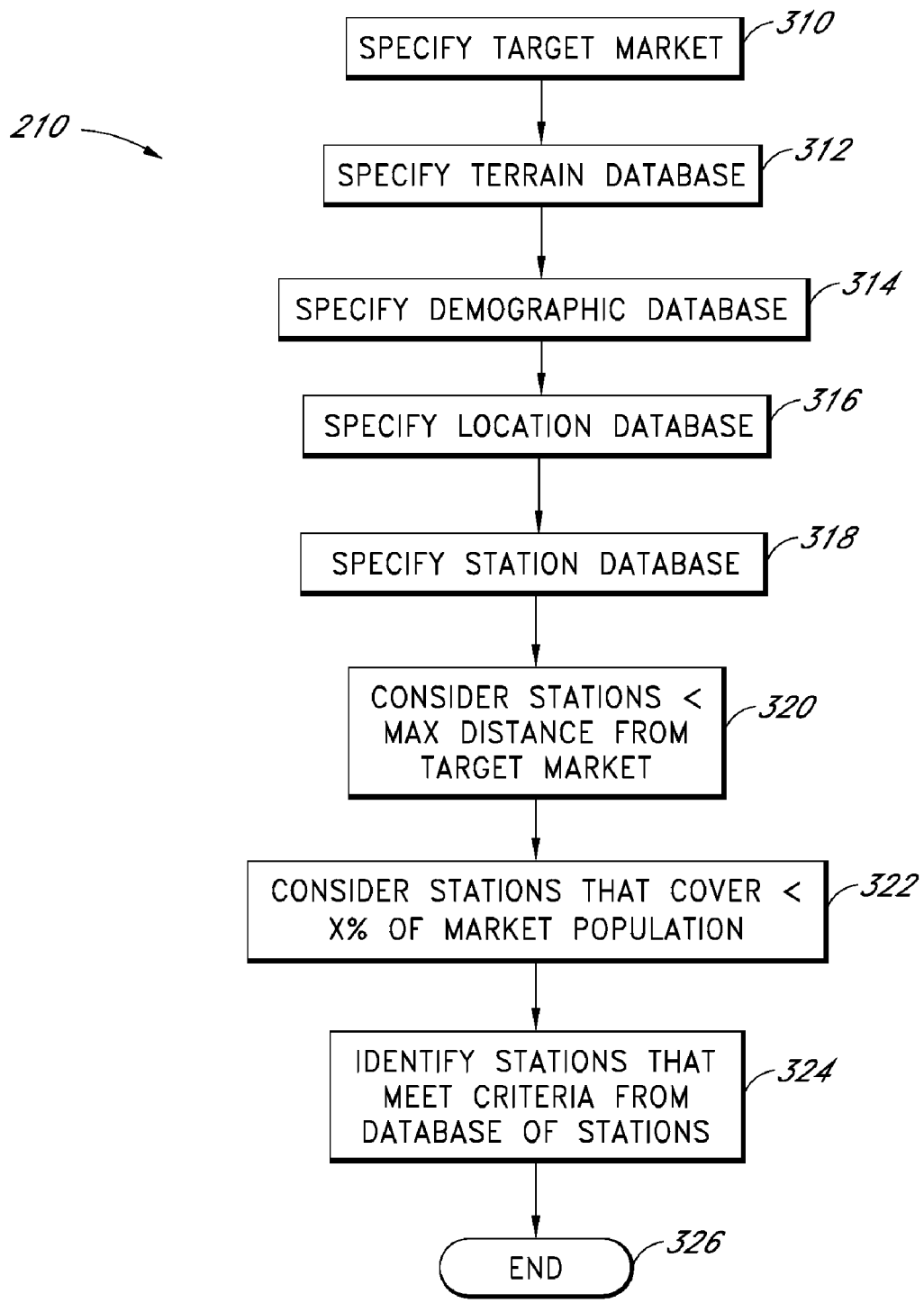
FIG. 3 is a flow chart illustrating the process of identifying stations within the target area, according to an embodiment of the invention.

In block 210, the program 3414 identifies target stations 100 that are located within the target market or area 102 and meet the market criteria. In an embodiment, the target market or area 102 and the market criteria are user-defined. For example, the user specifies that the program 3414 identify radio stations in the target market or area 102 that presently broadcast to less than 50% of the target market or area 102. FIG. 3 describes block 210 in more detail.

Figure 4:
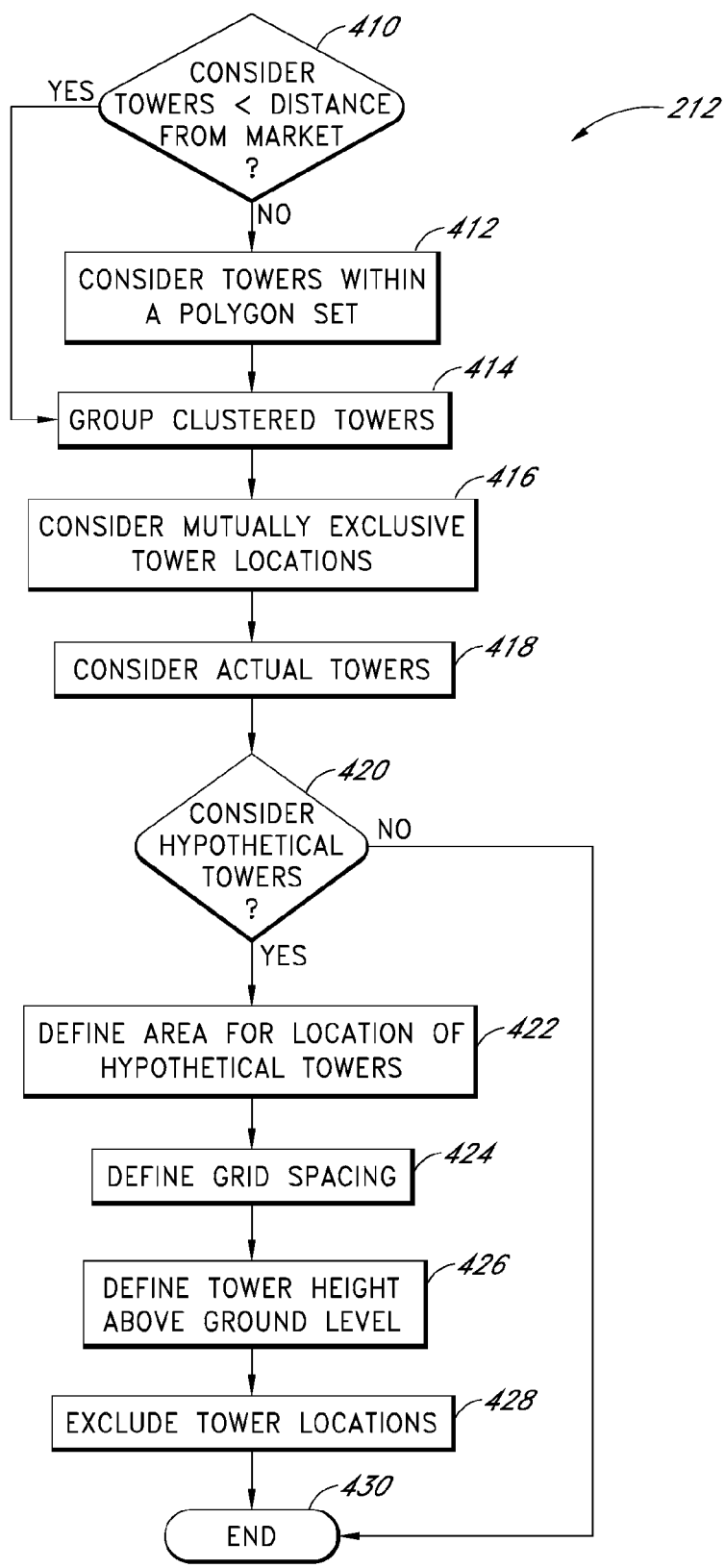
FIG. 4 is a flow chart illustrating the process of specifying location considerations, according to an embodiment of the invention.

In block 212, the user specifies location related parameters for the program 3414 to consider. For example, the user specifies that the program 3414 consider changing the location of the target station 100 identified in block 210 to both actual radio tower locations and hypothetical radio tower locations, which are within 50 miles of the target market or area 102. FIG. 4 describes block 212 in more detail.

For example, one embodiment of the invention electronically analyzes multiple alternative locations for the target station 100, where the alternative locations are different from the location of the target station 100. In a further embodiment, the invention ranks the alternative locations based at least in part on the variance in one or more user-defined objectives such as the coverage associated with the alternative locations.

The program 3414 identifies location scenarios for the target station 100 in block 214. The location scenarios comprise, either alone or in combination, changes to the class, transmission power, channel and/or frequency of the target station 100 at each location specified in block 212. For example, the program 3414 calculates the target market coverage for the radio station identified in block 210 that is relocated to each of the actual and hypothetical tower locations within 50 miles of the target market or area 102. In addition, the program 3414 varies the channel and/or frequency and/or class/transmission power at each of the locations and calculates the target market coverage.

The program 3414 determines whether the location scenario is feasible or whether the location scenario violates the broadcast coverage regulations between the target station 100 and another station. Conflicts can occur, for example, if the new location of the target station 100 is too close to another radio station, according to FCC Rules. When conflicts occur, the program 3414 determines whether changes to at least one of the location, class, and channel of the conflicted or accommodation station 104 alleviates the conflict. In an embodiment, changes to more than one accommodation station 104 can be cascaded or daisy chained to provide a feasible scenario for the target station 100.

For example, an embodiment of the invention electronically analyzes one or more alternative operational parameters associated with a communication and electronically determines whether the alternative operational parameters are feasible.

Figure 7:
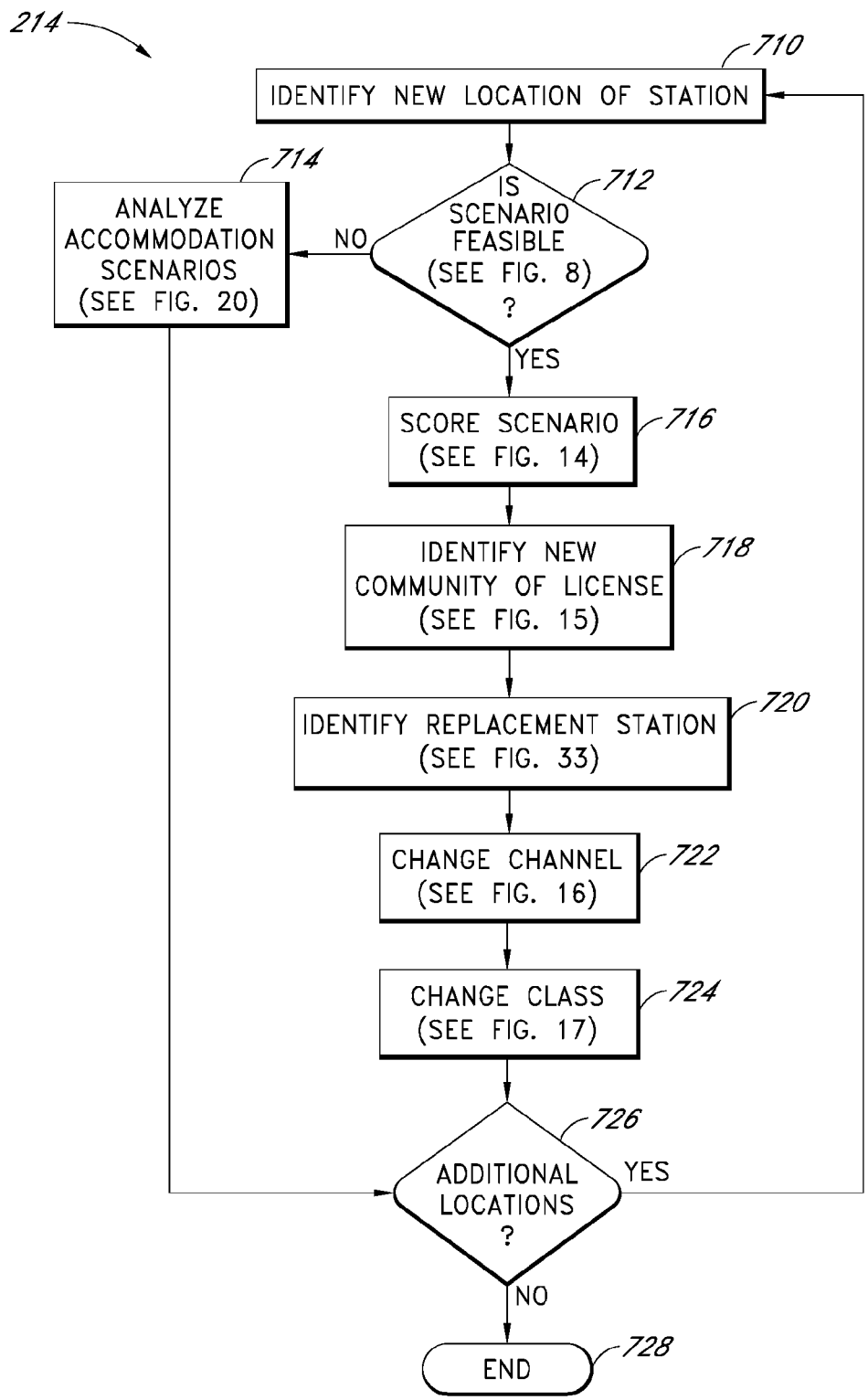
FIG. 7 is a flow chart illustrating the process of analyzing scenarios, according to an embodiment of the invention.

Further, in block 214, the program 3414 scores the feasible location scenarios. FIG. 7 describes block 214 in more detail.

In block 216, the program 3414 determines if location scenarios have been considered for the target stations 100 identified in block 210. If there are additional stations 100, the program 3414 returns to block 214 and identifies the location scenarios for the next target station 100. When the location scenarios for the identified target stations 100 have been analyzed, the program 3414 sorts the scored feasible station scenarios in block 218.

The program 3414 outputs a sorted list of target stations 100 and target station scenarios in block 220. For example, the program 3414 outputs a list comprising a first radio station, a second radio station, and a third radio station. All three of the radio stations are within 50 miles of the target market area. The first radio station has the highest feasibility score and increases its market coverage from below 50% to 97% by relocating from its current tower to an existing tower. The second radio station's feasibility score is less than the first radio station and greater than the third radio station's feasibility score. The second radio station increases its market or area coverage from below 50% to 95% by relocating to a hypothetical tower and by changing its broadcast channel, while the third radio station increases its market or area coverage from below 50% to 95% by relocating from its current tower to a existing tower and relocating a fourth radio station to another existing tower. The program 3414 ends in block 222.

FIG. 3 is a flow chart illustrating the process 210 of identifying stations within the target market or area 102 that are possible candidates for the study, according to an embodiment of the invention. In block 310, the user specifies the target market or area 102. In an embodiment, the user defines the target market or area 102 as a geographic circle by specifying a point having latitude and longitude coordinates and a radius. In another embodiment, the user specifies the target market or area 102 as a set of polygons, where each of the polygons is defined by a set of vertices having latitude and longitude coordinates.

In block 312, the user specifies terrain databases 3416. In an embodiment the databases are stored in the memory 3412. The program 3414 uses the terrain databases 3416 to identify terrain information associated with the target market areas specified in block 310. Examples of terrain databases 3416 are the US Arc-Second USGS (US Geological Survey) Terrain Database comprising 3 arc-second data for the 48 contiguous Untied States, Puerto Rico, and Hawaii; the Second World Terrain Database comprising 30 arc-second data for the world; the 3 second USGS Alaska Terrain Database comprising 3 second data for Alaska; the 30 Second NGDC (National Geophysical Data Center) US Database comprising 30 arc-second NGDC data; the NED (National Elevation Dataset) 3 Second US Database comprising 3 arc-second data for the Untied States that was generated from the 30 meter National Elevation Dataset; the NED 3 Second Alaska Database comprising 3 arc-second data for Alaska that was generated from the 30 meter National Elevation Dataset; the NED 30 Meter Database comprising 30 meter National Elevation Dataset data for the US; the NASA SRTM (Shuttle Radar Topography Mission) 1 Second Database comprising 1 arc-second data for most of the world, which provides 1 arc-second resolution for the United States and 3 arc-second resolution for most of the world; and the like.

In an embodiment, the program 3414 accesses one or more terrain databases 3416. The program 3414 accesses the primary database to obtain the elevation at a point. If the elevation at the specified point cannot be located in a first database, additional databases can be accessed.

The program 3414 accesses demographic databases 3416, which are specified in block 314, to determine the demographics within the target market or area 102. In an embodiment, the databases are stored in the memory 3412. Examples of demographic databases 3416 are the 1990 US Census, the 2000 US Census, the 1990 Puerto Rico Census, the 1996

Canada Census, and the like. In an embodiment, the program 3414 can access the total population from the demographic database 3416, or sub-categories such as race, ethnicity, age, and the like.

The program 3414 accesses location databases 3416, which are specified in block 316, to determine the locations of existing points of communication, such as stations, towers, antennas, and the like. In an embodiment, the databases are stored in the memory 3412. Examples of location databases 3416 are the Antenna Structure Registration (ASR) database, the National Oceanic and Atmospheric Administration (NOAA) database, site management databases, such as the American Tower database, the SBA Communications database, and the like.

Further, the program 3414 accesses station databases 3416, which are specified in block 318. In an embodiment, the databases are stored in the memory 3412. The station databases 3416 comprise the locations of existing points of communication. Examples of station databases are the Consolidated Database System for the FCC's Media Bureau (CDBS) database, the FCCInfo.com database maintained by Cavell, Mertz & Davis, Inc., and the like.

In an embodiment, the program 3414 identifies radio stations within a user-specified distance from the target market or area 102. In block 320, the user can optionally specify this distance from the target market or area 102. For example, the program 3414 identifies the radio stations from the FCC database that are within 50 miles from the center of the target market or area 102.

In another embodiment, the program 3414 identifies radio stations that cover less than a user-specified percentage of the target market or area 102. This percentage determines the level at which a station is no longer considered a good candidate because it already covers most of the target market or area 102. In block 322, the user can optionally specify this percentage. For example, if the percentage is set to 90%, then any station that already covers at least 90% of the population and/or demographics of the target market or area 102 is not considered. In another embodiment, the user can manually identify stations to be considered.

In block 324, the program 3414 identifies the radio stations within the target market or area 102 or within the specified distance from the target market or area 102 that meet the percentage of market coverage criterion. In an embodiment, the program 3414 identifies the radio stations from the FCC database of radio stations. The process 210 ends in block 326.

FIG. 4 is a flow chart illustrating the process 212 of specifying location considerations, according to an embodiment of the invention. The process 212 defines the set of locations that the program 3414 analyzes for each of the candidate radio stations identified by the process 210. In block 410, the user can optionally select whether to consider radio station locations or towers within a user-selected distance from the geographic center of the target market or area 102. In an embodiment, towers comprise stations, repeaters, translators, antennas, self-supporting structures, guyed towers, building rooftop locations, locations suitable for a broadcast antenna, and the like.

In block 412, the user can select whether to consider radio station locations or towers within a specified polygon set. This option uses a user-defined polygon set to define the boundaries of the geographic region inside which towers are considered.

In block 414, the user can select whether to consider only the tallest tower in a cluster of towers. This option can be used in situations where towers that are clustered within a user-defined distance are grouped together and considered as one tower in the analysis. The location of the tallest tower in the cluster is used as the location for the cluster of towers.

In block 416, the user can select whether to limit consideration to those towers that are mutually exclusive with the existing facility being considered and are within the target market area. For example, in the FM radio embodiment, mutually exclusive towers are defined as those towers that are separated from the existing facility by no more than approximately the FCC Rules section 73.207 allocation distance plus an extended search area. In an embodiment, the extended search area is twice the maximum class 70 dBu field strength contour distance.

In block 418, the user can optionally select whether to consider existing tower locations. This option considers actual tower locations found in the database of tower locations specified in block 316.

In block 420, the user can optionally select whether to consider hypothetical tower locations. One embodiment locates the hypothetical or virtual antenna(s) on existing structures, such as buildings, with heights in an accessible database. Another embodiment locates the hypothetical or virtual antenna(s) anywhere in the coverage geography at height limits with respect to applicable communications and/or regulatory laws. When the program 3414 considers hypothetical locations, the user has several hypothetical tower consideration options.

In block 422, the user specifies a polygon or a set of polygons that define an area where the program 3414 considers hypothetical towers. In block 424, the user selects the grid spacing for the hypothetical tower area. The program 3414 generates hypothetical towers on a grid at locations inside the polygon boundary area. The user-specified grid spacing defines how far apart each hypothetical tower will be in the grid.

In block 426, the user can optionally select to default to the Above Ground Level (AGL) tower height. Hypothetical towers will have their above ground tower height default to this value. For locations near airports or other user-defined polygons, the program 3414 will limit the tower heights as required by communications and/or regulatory laws. For example, the program 3414 calculates the tower height for hypothetical towers near airports based on the FCC Rules section 17.7 glide slope requirements.

In block 428, the user can optionally select to exclude hypothetical tower locations within a user-defined distance from a user-defined area, such as a polygon. For example, the program 3414 will exclude possible hypothetical tower locations from airports, National Parks, Indian Reservations, lakes, and any other locations where towers are not permitted or are highly impractical. The process 212 ends in block 430.

Figure 5:
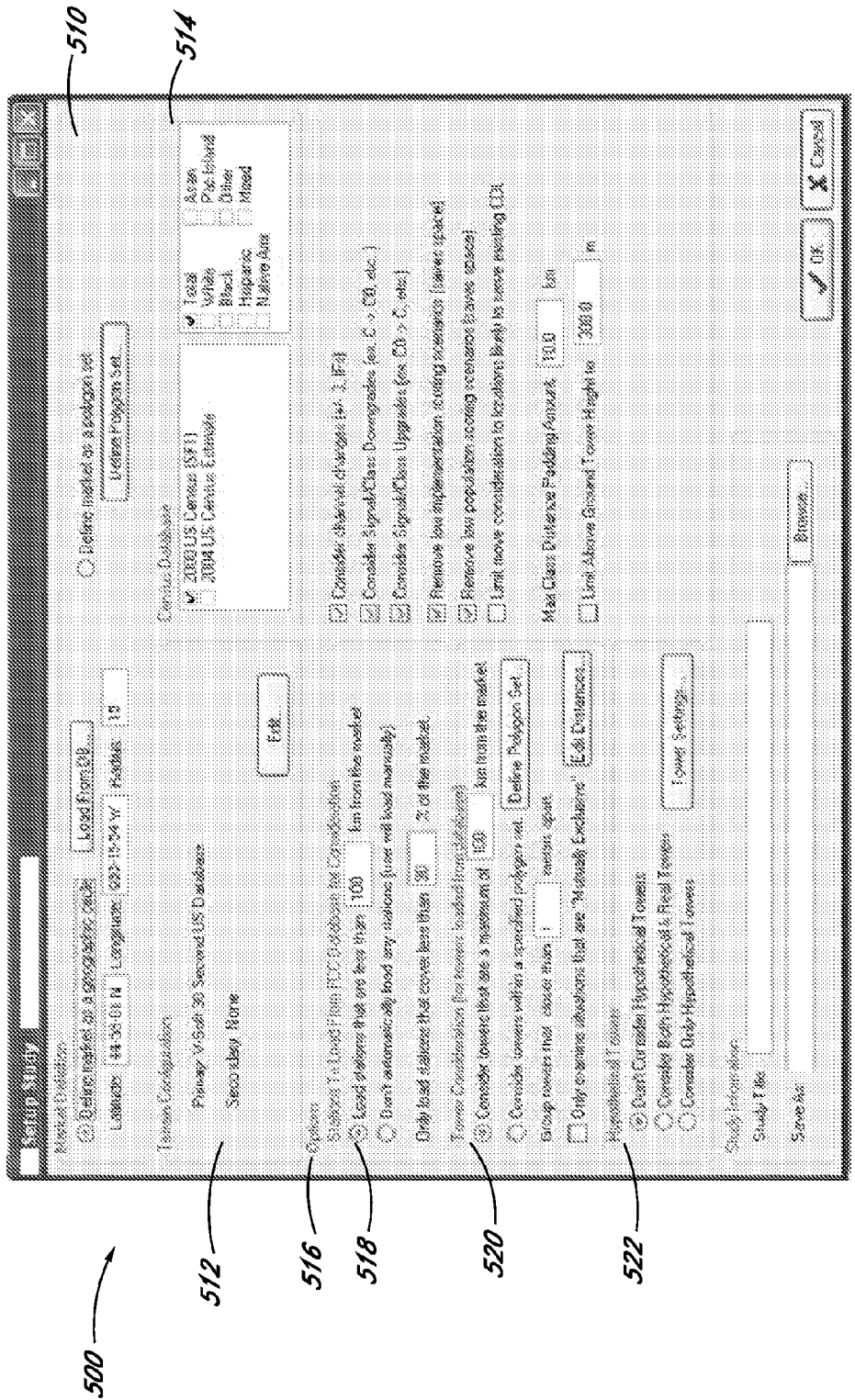
FIG. 5 is a screen shot of an embodiment of a communication spectrum set-up screen, according to an embodiment of the invention.

FIG. 5 is a screen shot of an embodiment of a communication spectrum set-up screen 500, according to an embodiment of the invention. The set-up screen 500 comprises a market definition section 510, a terrain configuration section 512, and a census database section 514. The user can choose whether to define the market or area 102 as a geographic circle or a polygon set in the market definition section 510. The terrain configuration section 512 indicates the terrain databases 3416, which the program 3414 uses. The census database section 514 indicates the census databases 3416 and any sub-categories, which the program 3414 uses to calculate the population and/or demographics of the target market or area 102.

The set-up screen 500 further comprises an options section 516. The options section 516 comprises station options 518, tower options 520, and hypothetical tower options 522. In the example illustrated in FIG. 5, the station options 518 permit the user to select characteristics of stations to load from an FCC database of stations for inclusion in the study. The "load stations" option permits the user to enter the maximum distance from the market or area 102 that will be searched for stations to include in the study.

The "don't load" option permits the user to skip searching the database for stations to include in the study. Instead, user-defined stations used in the study are loaded into the program 3414. The "load stations" that cover less than a percentage option permits the user to set the level at which a station is no longer considered a good candidate because it already covers the market. For example, if this option is set to 90%, then any station that already covers at least 90% of the defined market or area 102, on a population and/or demographics count basis, will not be examined.

The tower options 520 permit the user to select characteristics of actual towers locations to include in the study. The "consider towers within a maximum distance from the market" option defines the maximum distance from the market that a tower can be for it to be included in the study. The "consider towers within a specified polygon set" option defines the boundaries of the geographic region inside which tower locations are considered using a polygon set.

The "group towers" option groups towers that are closer together than a distance and considers the group as a single tower location in the study. The program 3414 uses the height and location of the tallest tower in the group. The "mutually exclusive" option limits consideration to those towers that are mutually exclusive with the existing facility being considered. Mutually exclusive towers are towers that are within the market search area and are separated from the existing facility by no more than approximately an allocation distance plus an extended search area distance. In an embodiment, the allocation distance is the FCC Rules section 73.207 allocation distance. The extended search area distance corresponds to the class of the existing facility, and in an embodiment, the extended search area distance is twice the 70 dBu max class field strength contour distance.

The hypothetical tower options 522 permit the user to select characteristics of hypothetical tower locations to include in the study. The "tower settings" options permit the user to enter grid spacing, to choose to default to AGL tower height, to choose to exclude towers, and the like. The "don't consider" option uses only real tower locations in the study. The "consider both" option uses both real tower locations and hypothetical tower locations in the study. The "consider only" option uses only hypothetical tower locations in the study.

The options section 516 further comprises additional functions. The "consider channel changes" option permits the program 3414 to evaluate channel and/or frequency changes for the station at each location. The "consider signal/class downgrades" option permits the program 3414 to study changing the station being examined to a lower class. In another embodiment, the program 3414 studies changing the station being examined to a higher class. Other options, such as "remove low implementation scoring scenarios" and "remove low population scoring scenarios" remove scenarios from the study that have low implementation scores and low or no coverage of the market or area, respectively, from the study.

For example, one embodiment of the invention electronically analyzes multiple alternative channels and/or frequencies for the target station 100, wherein the alternative channels and/or frequencies are different than the channel and/or frequency of the target station 100. In a further embodiment, the invention ranks the alternative channels and/or frequencies based at least in part on the variance in one or more user-defined objectives such as the coverage associated with the alternative channels and/or frequencies.

The "limit move consideration" option permits the program 3414 to consider locations that are within the maximum class 70 dBu field strength contour of the community of license of the existing station. If selected, this option narrows the search to regions where the community of license coverage is likely to be maintained at the new location of the station. If not selected, the program 3414 uses locations that are within the market radius plus the maximum class 60 dBu distance plus a padding amount. The "max class distance padding amount" option permits the user to define the padding amount. The "limit above ground tower height" option allows the user to select tower height characteristics. When selected, the program 3414 uses the supplied maximum value for towers where the calculated height is greater than the supplied value. When unselected, the program 3414 uses the height for the towers at which the maximum height above average terrain is attained.

Figure 6:
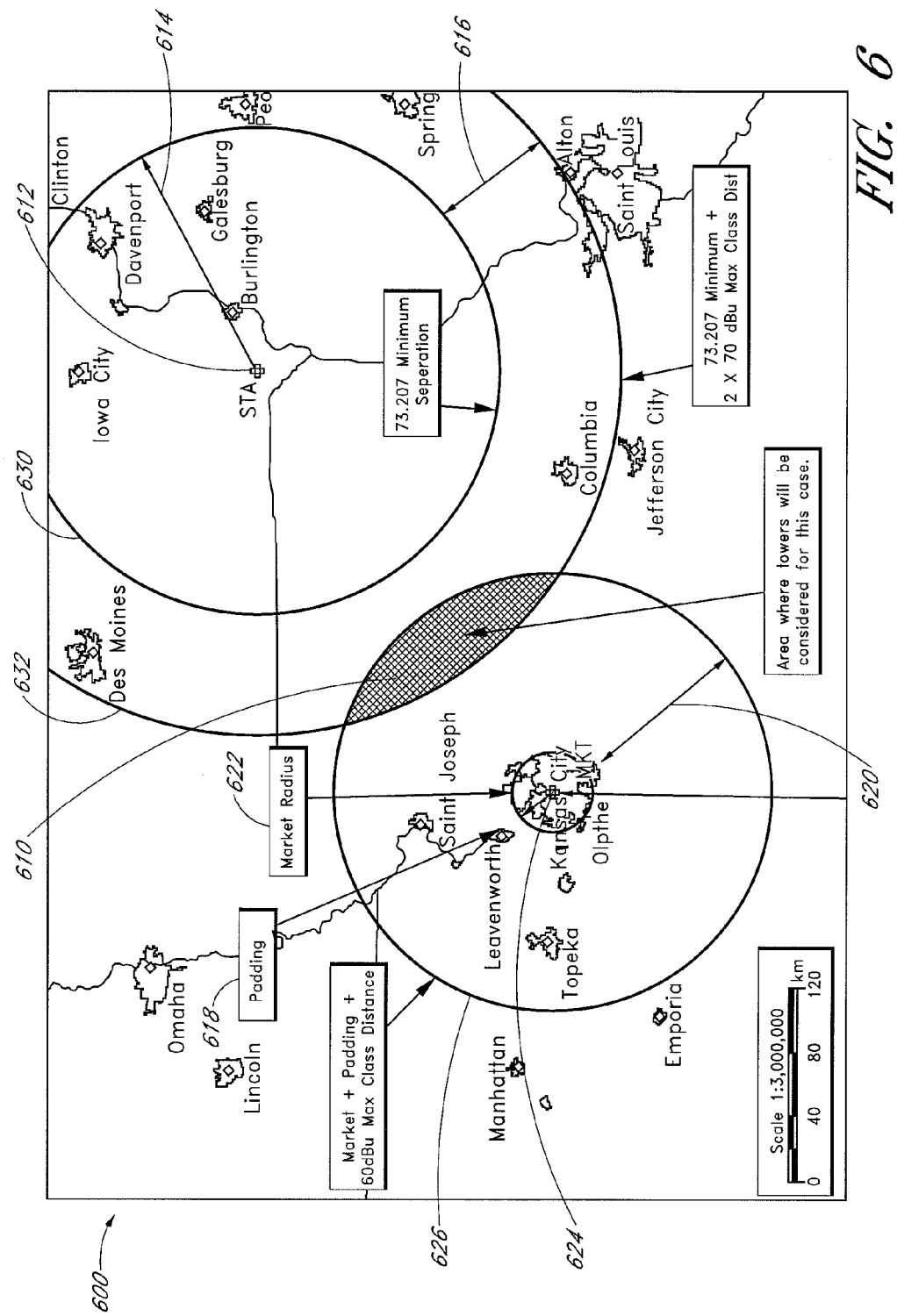
FIG. 6 illustrates mutually exclusive tower locations, according to an embodiment of the invention.

FIG. 6 is a map 600 illustrating an area in which the program 3414 considers new station locations for an existing point of communication 612, according to an embodiment of the invention. A first area 630 around the station 612 is defined by the location of the station 612 and a minimum separation radius 614. In this example, the minimum separation radius 614 is the FCC Rules section 73.207 minimum separation distance for the station 612. Adding an extended search distance 616 to the minimum separation radius 614 defines a maximum regulatory relocation area 632 around the station 612. In this example, the extended search distance 616 is approximately twice the 70 dBu maximum class field strength contour distance.

In FIG. 6, a market area 626 is the area defined by a point 624 and a radius comprising a market radius 622, a user defined padding distance 618, and the 60 dBu maximum class distance 620.

In an embodiment where the station locations are limited to mutually exclusive stations or towers, the program 3414 considers stations or towers in a mutually exclusive area 610, which comprises the overlap of the market consideration area 626 of the target market 624 and the maximum regulatory relocation area 632 of the target station 612.

Figure 32:
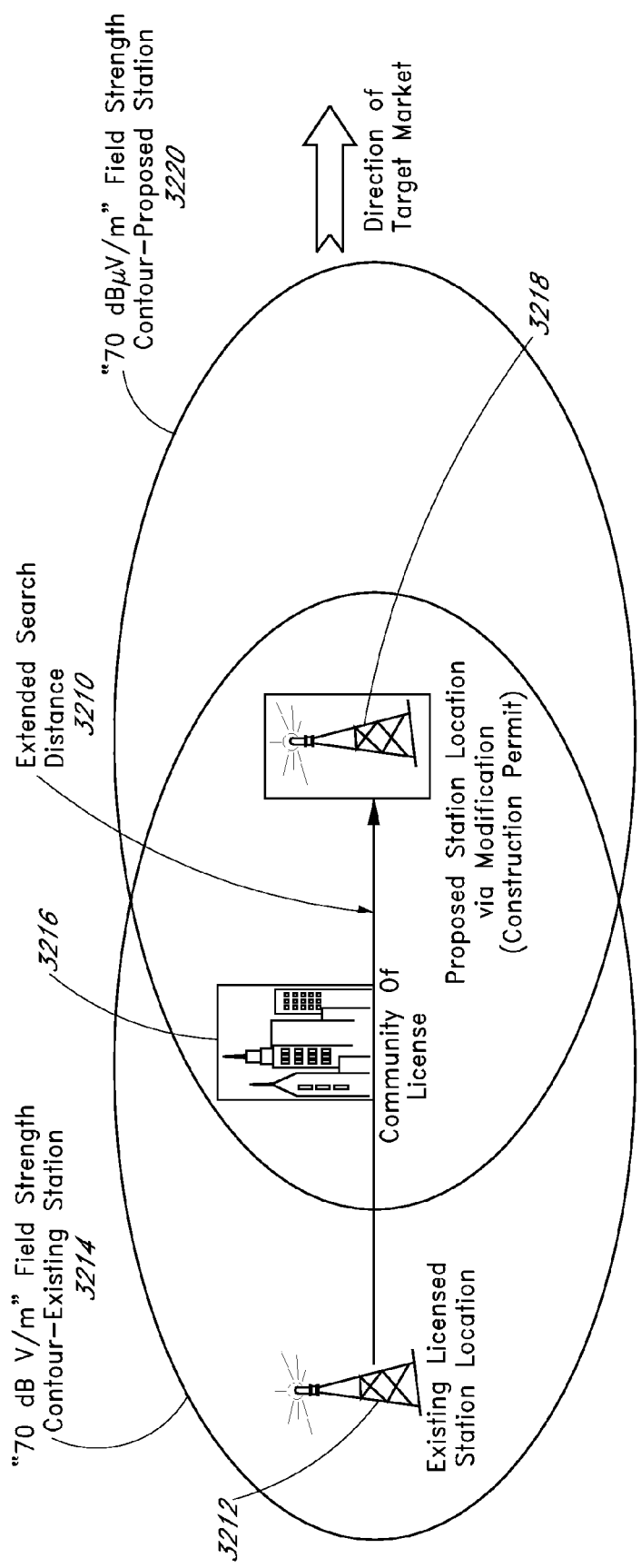
FIG. 32 is a graphical representation of an extended search area, according to an embodiment of the invention.

In an embodiment, the extended search distance 616 is related to the class of the existing communication facility 612 under consideration and extends the allowable regulatory relocation distance of the existing station 612 toward the market 626. In the example illustrated in FIG. 6, the extended search distance 616 is approximately twice the 70 dBu maximum class field strength contour distance. In another embodiment, the extended search distance is user-defined. In another embodiment, the extended search distance is defined by communications and/or regulatory laws. FIG. 32 describes the extended search distance in further detail.

FIG. 32 is a graphic representation of an extended search distance 3210 for broadcast radio, according to an embodiment of the invention. The extended search distance 3210 provides an extended search area by taking advantage of allowable regulatory rules. An existing station 3212 has a 70 dBu field strength contour 3214, which covers its community of license 3216. For example, the FCC regulations specify that the broadcast station 3212 provide a 70 dBµV/m field strength over both 85% of the area and 85% of the population of the community of license 3216. A proposed new location 3218 for the existing station 3212 has a 70 dBu field strength contour 3220, which also covers the community of license 3216. In an embodiment, the extended search distance 3210 is the distance between the location of the existing broadcast station 3212 and the proposed new location 3218, while maintaining a minimum field strength (dBµV/m) level over the existing stations community of license 3216 at the proposed new location.

Broadcast regulations allow the broadcast station 3212 to relocate to another location 3218 as long as the minimum field strength is maintained over the community of license 3216. In FIG. 32, the 70 dBµV/m field strength contour 3214 of the radio station at its existing location 3212 and the 70 dBµV/m field strength contour 3220 of the radio station at the proposed location 3218 both provide the minimum field strength requirements for the community of license 3216, and the locations 3212, 3218 are separated by the extended search distance 3210. In an embodiment, this can be accomplished by submitting a minor modification application, such as a construction permit, to a regulatory body, such as the FCC. The new location 3218 is generally in the direction of the target market or area and the extended search distance 3210 increases the allowable regulatory relocation distance of the broadcast station 3212 towards the target market 102 or area of interest.

In other words, the extended search distance 3210 extends the allowable distance that a broadcast station 3212 can move to cover the target market or area 102. In an embodiment that uses station locations that are mutually exclusive to the existing facility being considered, the mutually exclusive station locations are station locations separated by no more than the FCC Rules Section 73.207 allocation distance plus the additional extended search distance 3210. In an embodiment, the program 3414 defaults to the extended search distance 3210 of twice the 70 dBu maximum class field strength contour distance.

In another embodiment for determining which station locations are to be considered in the study, when the locations are not limited to those likely to serve the existing community of license, the program 3414 considers stations within the market radius+max class 60 dBu distance+padding distance of the market center. In an embodiment, the padding amount is user-defined.

Figure 8:
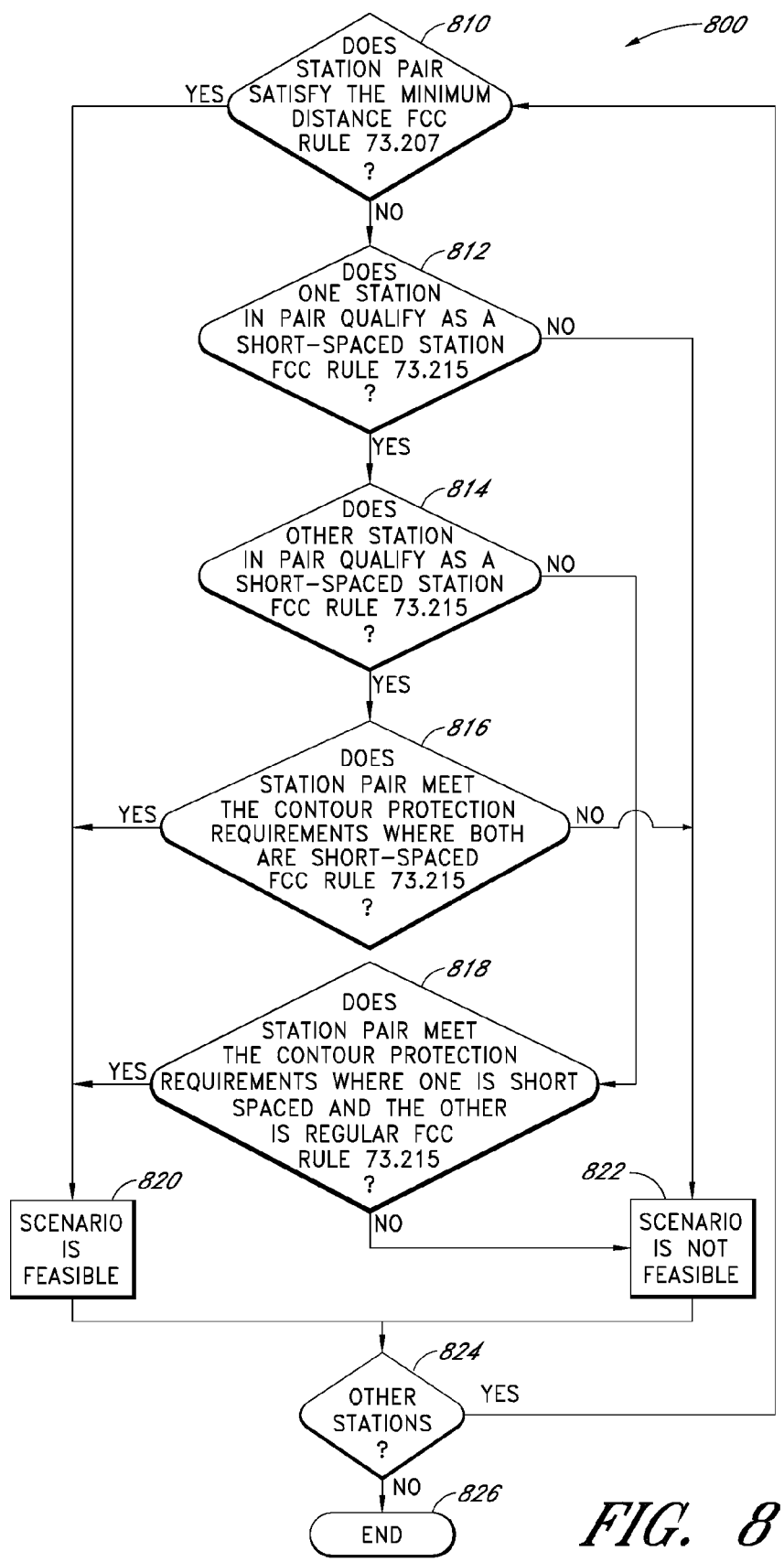
FIG. 8 is a flow chart illustrating the process of determining whether a scenario is feasible, according to an embodiment of the invention.

Once the program 3414 identifies the stations to include in the study and the location consideration information, the program 3414 analyzes scenarios for each of the identified stations. FIG. 7 is a flow chart illustrating the process 214 of analyzing the scenarios, according to an embodiment of the invention. In an embodiment, analyzing comprises generating analyzing, and testing. In block 710, the program 3414 identifies a possible new location for the target station 100. In block 712, the program 3414 determines if the scenario of the target station 100 at the new location is feasible. FIG. 8 describes the process of determining whether the scenario is feasible.

Figure 14:
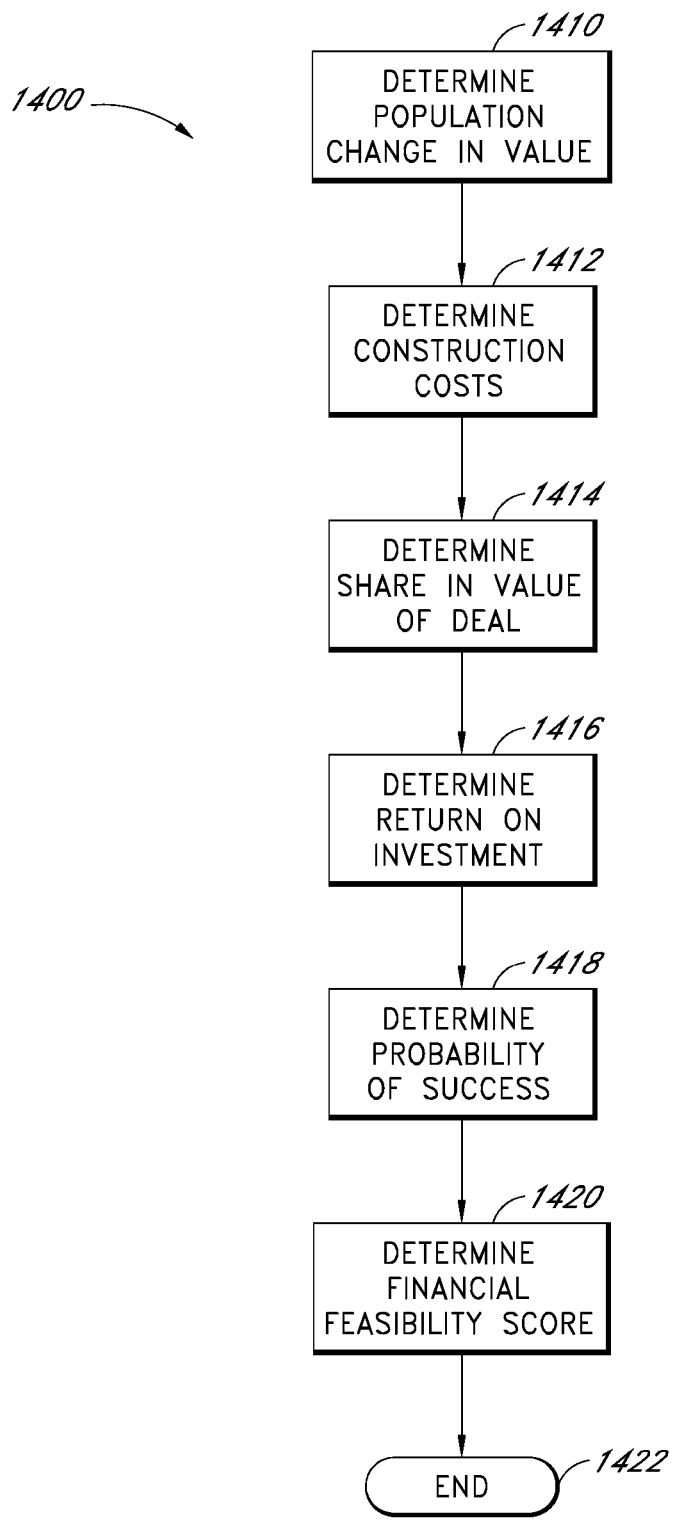
FIG. 14 is a flow chart illustrating the financial feasibility/numerical scoring process, according to an embodiment of the invention.
Figure 15:
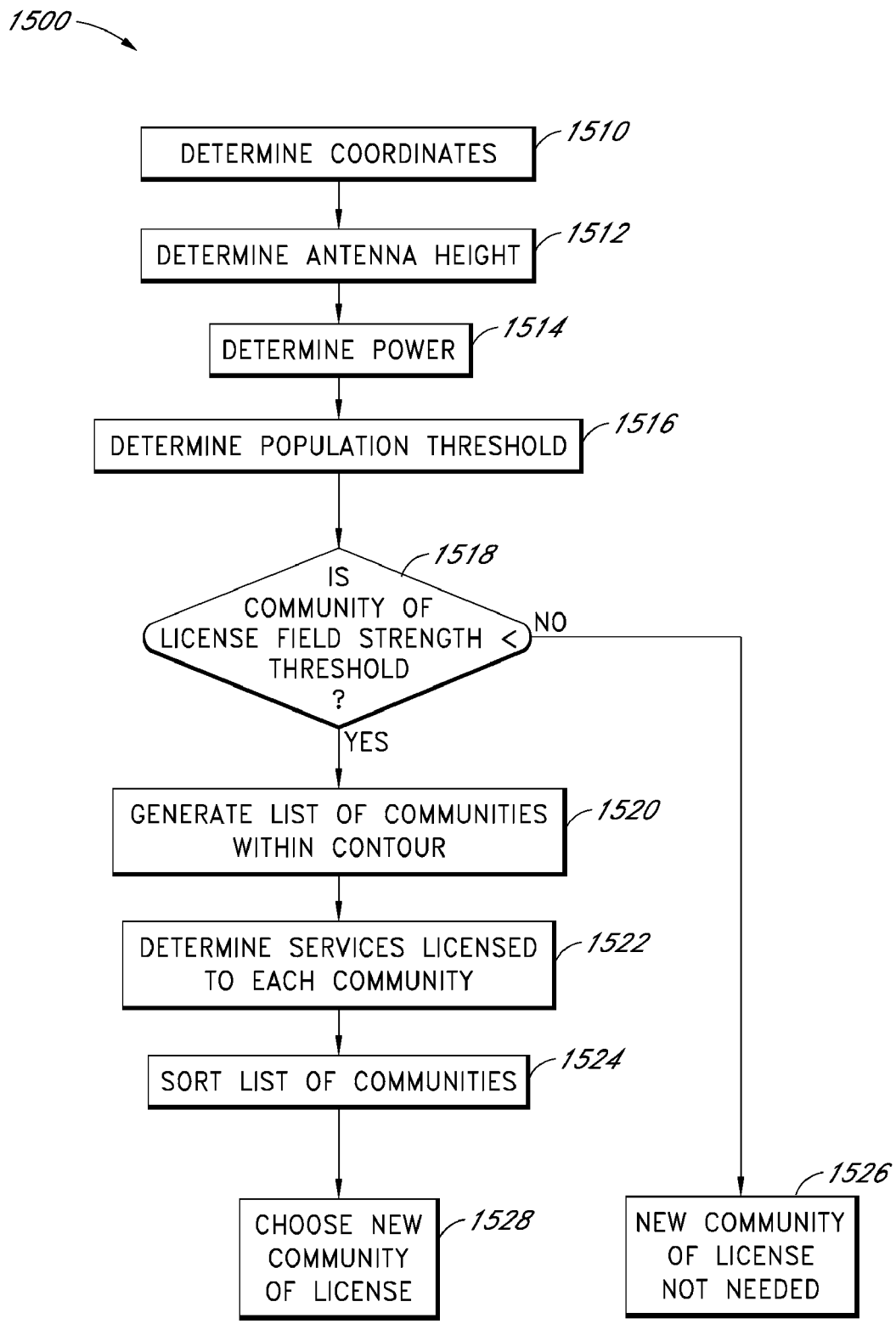
FIG. 15 is a flow chart illustrating a process to identify a community of license (COL), according to an embodiment of the invention.
Figure 33:
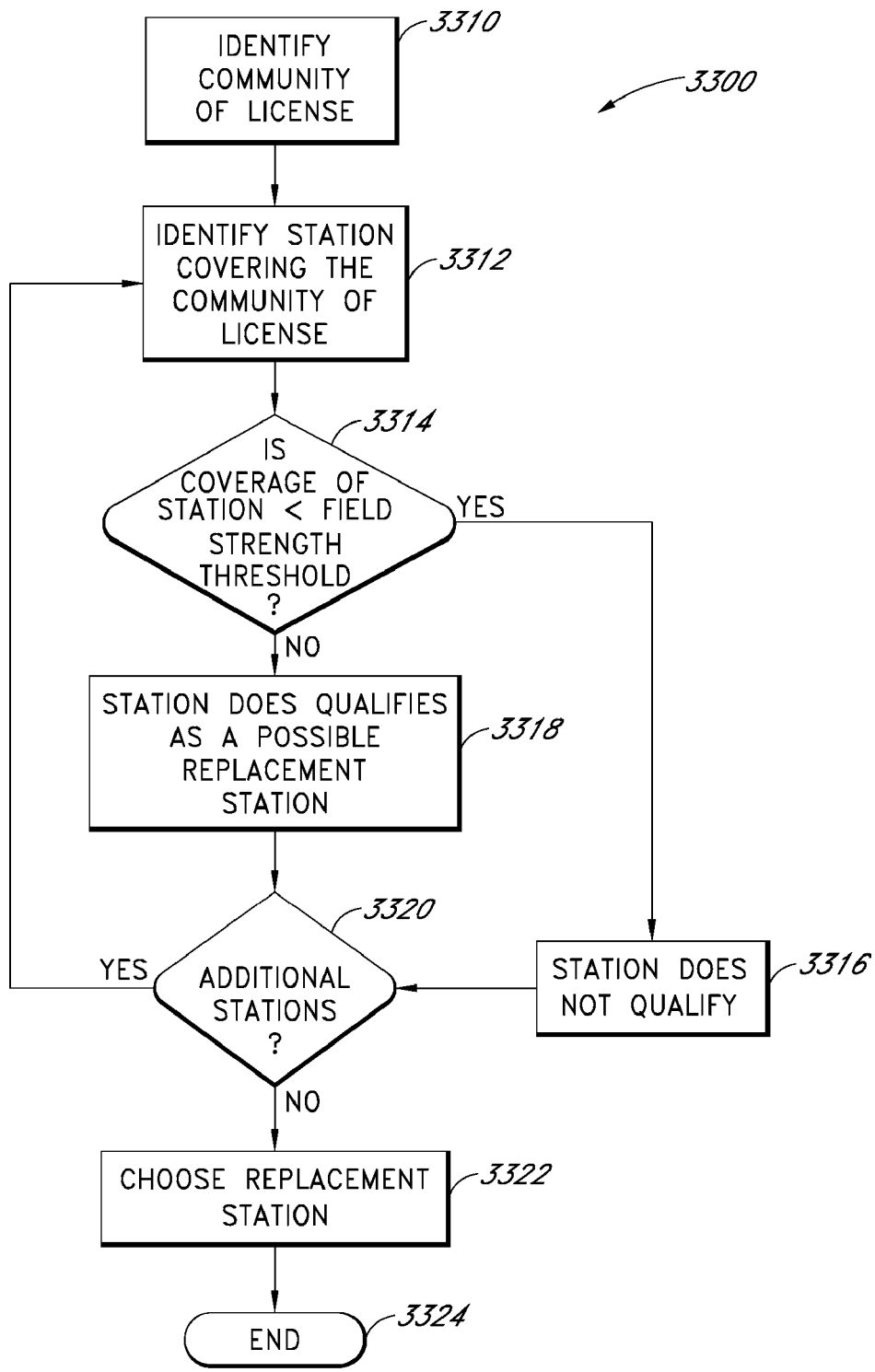
FIG. 33 is a flow chart illustrating a process to identify a replacement station, according to an embodiment of the invention.

If the scenario is feasible, the program 3414 scores the scenario in block 716. FIG. 14 describes the scoring process. In block 718, the program 3414 identifies a new community of license (COL), if needed. FIG. 15 describes the process of identifying a new community of license. In block 720, the program 3414 identifies a replacement station, if needed. FIG. 33 describes the process of identifying a replacement station.

Figure 16:
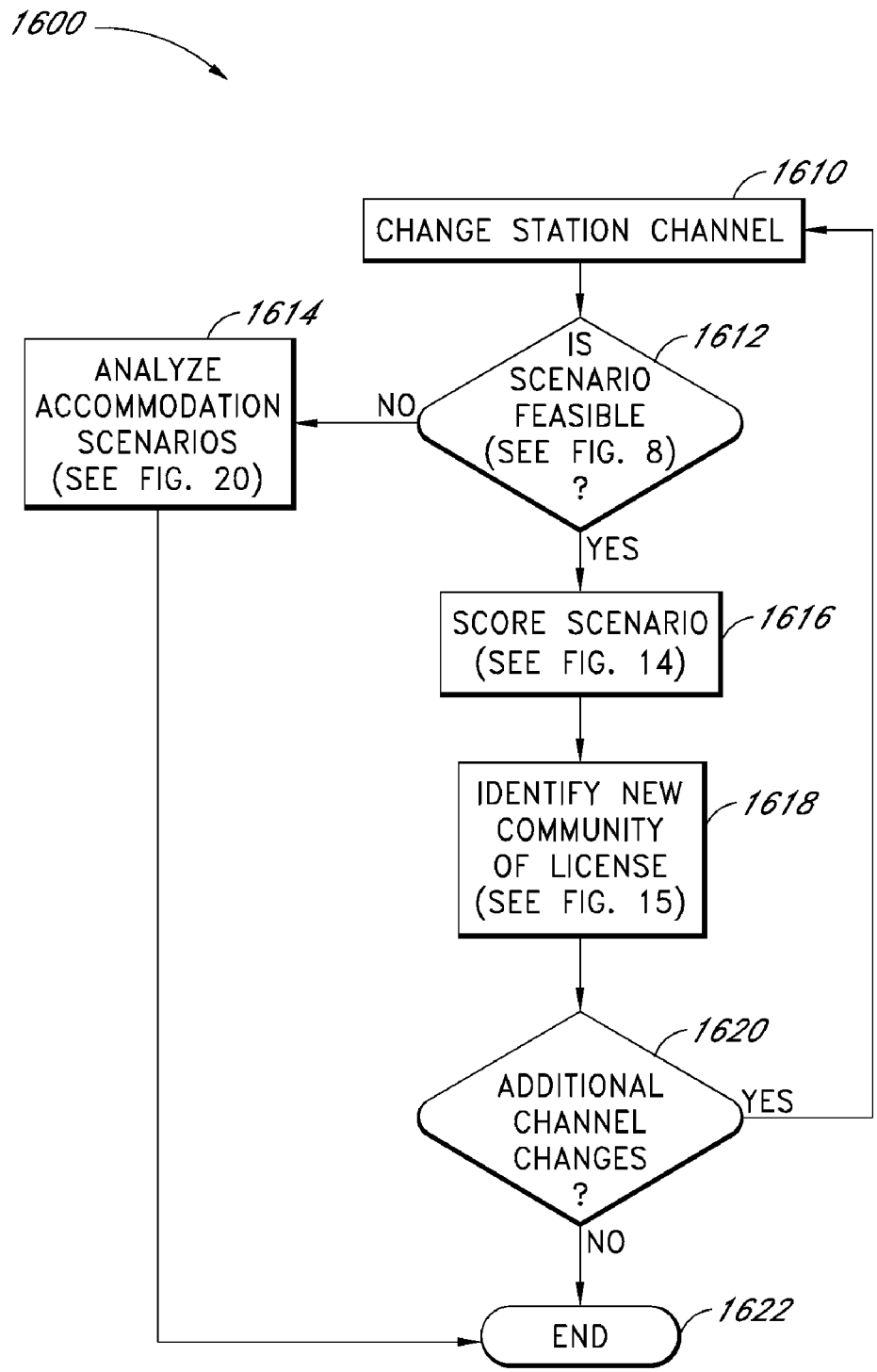
FIG. 16 is a flow chart illustrating a process to identify possible changes of the station channel and/or frequency, according to an embodiment of the invention.
Figure 17:
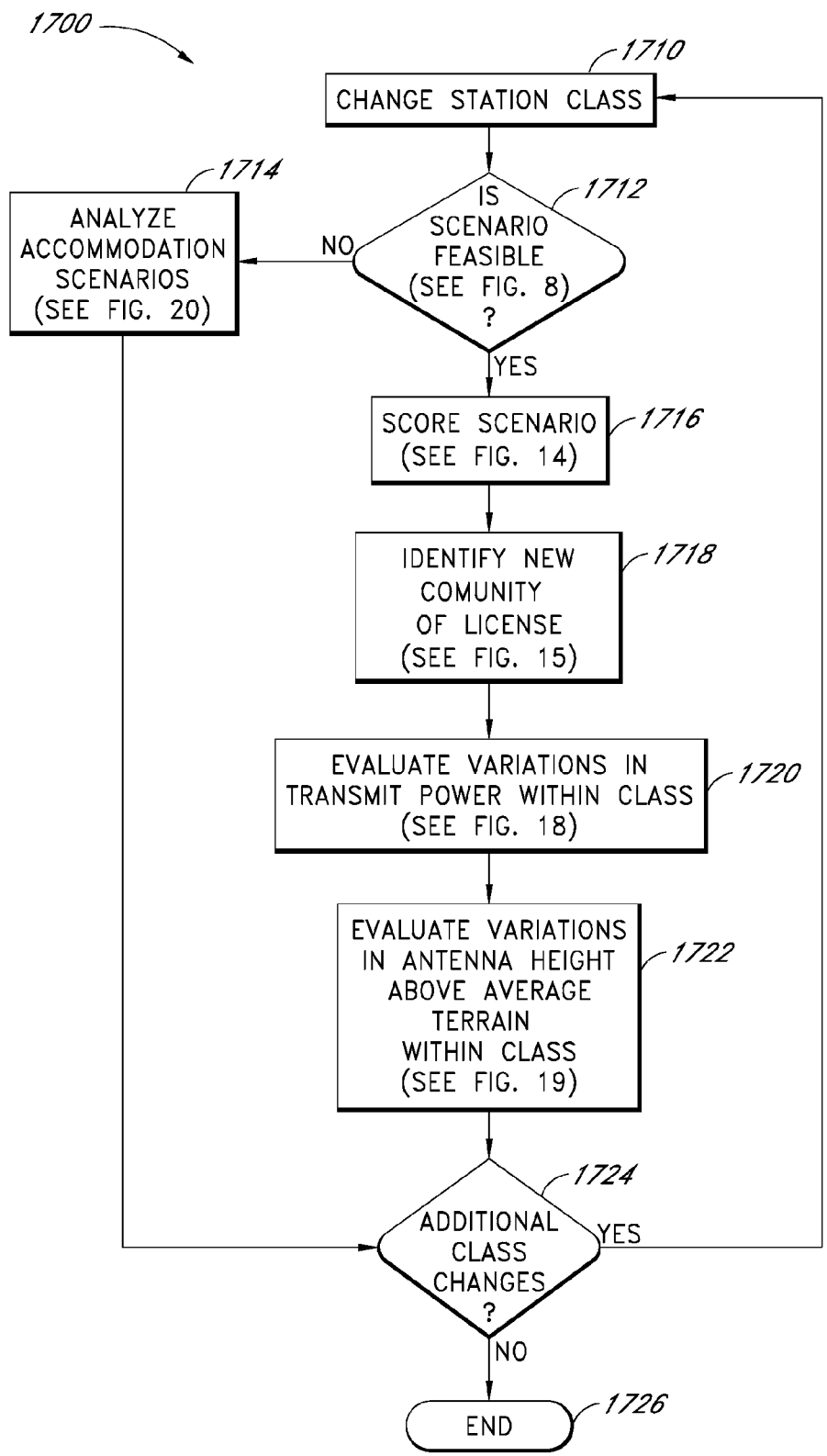
FIG. 17 is a flow chart illustrating a process to identify possible changes of the station class, according to an embodiment of the invention.

In block 722, the program 3414 evaluates scenarios for the identified station at the new location and at different channels and/or frequencies. FIG. 16 describes the process of changing the channels and/or frequencies of the station in the location scenario. In block 724, the program 3414 evaluates scenarios for the identified station at the new location and at different classes. FIG. 17 describes the process of changing the class of the station in the location scenario.

Figure 20:
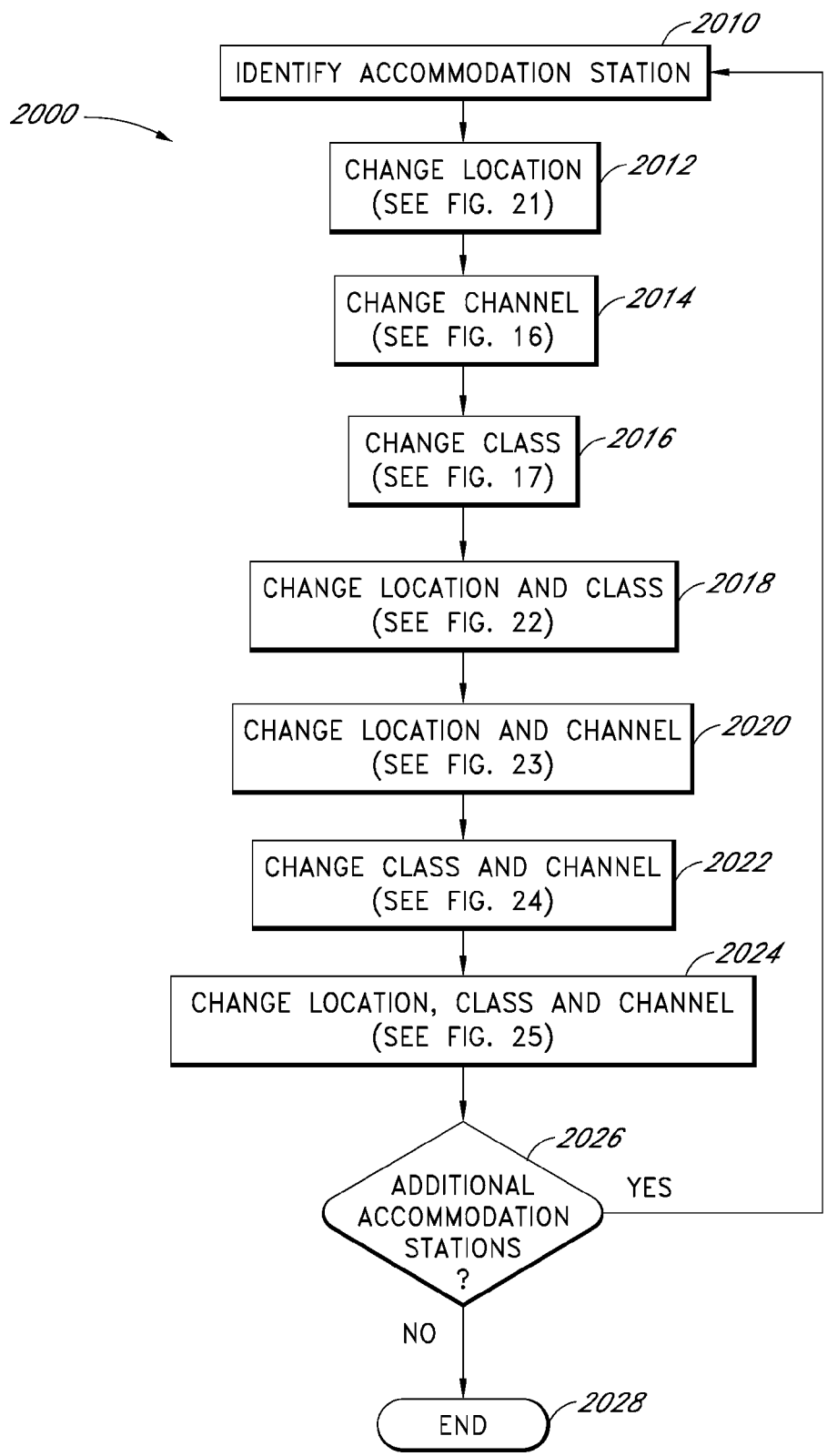
FIG. 20 is a flow chart illustrating a process to analyze accommodation station scenarios, according to an embodiment of the invention.

If the scenario in block 712 is not feasible, the program 3414 analyzes accommodation scenarios in block 714. FIG. 20 describes the process of evaluating the accommodation scenarios for the infeasible location scenario.

After analyzing accommodation scenarios and/or evaluating the changes in location, class, channel, and/or frequencies, the program 3414, in block 726, determines if there are additional locations to study. If there are additional locations, the program 3414 returns to block 710, where the steps 710-724 are repeated for the identified station at another location. The program 3414 repeats steps 710-724 until the locations that have been identified for the station have been evaluated. When the identified locations for the station have been evaluated, the process 214 ends in block 728.

FIG. 8 is a flow chart illustrating a process 800 of determining whether the scenario is feasible, according to an embodiment of the invention. In an embodiment, a scenario is feasible when it satisfies the FCC Rules sections 73.207 and 73.215. In FIG. 8, the station pairs comprise the existing station at a new location and/or a new class and/or a new channel and/or frequency, and another station. In block 810, the program 3414 determines if the station pair is separated by at least a minimum distance. In an embodiment, the FCC Rules section 73.207 defines the minimum distance. If the station pair is farther apart than the minimum distance, the scenario is feasible, and the process 800 moves to block 820. If the station pair does not meet the minimum distance rule, the process 800 moves to block 812.

In block 812, the program 3414 determines whether at least one of the stations in the station pair is a short-spaced station. In an embodiment, the FCC Rules section 73.215 defines a short-spaced station. If neither of the stations in the pair of stations is a short-spaced station, the scenario is not feasible, and the process 800 moves to block 822.

If one of the stations of the station pair is a short spaced station, the program 3414 determines if the other station of the station pair is a short-spaced station in block 814. If the other station of the station pair is not a short-spaced station, the process 800 moves to block 818.

In block 818, the program 3414 determines if the station pair meets the field strength contour protection requirements where one station is short-spaced and the other station is regular. In an embodiment, the FCC Rules section 73.215 defines the field strength contour protection requirements for a short-spaced station paired with a regular station that is categorized under FCC Rules section 73.207. If the pair of stations does not meet the field strength contour protection requirements, the scenario is not feasible, and the process 800 moves to block 822. If the pair of stations meets the field strength contour protection requirements, the scenario is feasible, and the process 800 moves to block 820.

If both stations in the station pair are short-spaced stations, the process 800 moves to block 816 where the program 3414 determines if the short-spaced station pair meets field strength contour protection requirements. In an embodiment, the FCC Rules section 73.215 defines the field strength contour protection requirements for a short-spaced pair of stations. If the station pair does not meet the field strength contour protection requirements, the scenario is not feasible, and the process 800 moves to block 822. If the station pair meets the field strength contour protection requirements, the scenario is feasible, and the process 800 moves to block 820.

After determining the feasibility of the scenario in block 820 or the infeasibility of the scenario in block 822, the process moves to block 824. In block 824, the process 800 determines if there are additional stations with which to pair the identified station. If there are additional stations, the process 800 moves to block 810, where the steps 810-822 are repeated with the additional station. The steps 810-824 are repeated for each station pair. When there are no other stations with which to pair the identified station in block 824, the process 800 ends in block 826.

The program 3414 uses several calculation techniques, such as, for example, the grand circle distance calculation, the 360 degree radial contour projection, the AMSL (above mean sea level) calculation, and the radial transformation, in the feasibility determination. The grand circle distance calculation calculates the distance between two stations. In an embodiment, the grand circle distance between the two stations is compared with the spacing requirements for stations according to the FCC Rules sections 73.207 and 73.215, respectively. In the grand circle distance calculation, (lat1, lon1) is the geographical location of station 1 in a coordinate system, such as NAD27 (North American Datum) or NAD83, and (lat2, lon2) is the geographical location of station 2 in the same coordinate system. ρ represents the radius of the earth. The program 3414 first converts the latitude and longitude coordinates to spherical coordinates, then to Cartesian coordinates. Next, the program 3414 calculates the separation angle between the pair of Cartesian coordinates and then calculates the distance between the pair of stations along the curvature of the earth based on the separation angle. The grand circle calculation procedure is outlined below:

Step 1: Convert latitude and longitude to spherical coordinates $$slat1=\pi(90-lat1)/180$$

$$slon1=\pi lon1/180$$

$$slat2=\pi(90-lat2)/180$$

$$slon2=\pi lon2/180$$

Step 2: Convert spherical coordinates to Cartesian coordinates $$x1=\rho \sin(slat1)\cos(slon1)$$

$$y1=\rho \sin(slat1)\sin(slon1)$$

$$z1=\rho \cos(slat1)$$

$$x2=\rho \sin(slat2)\cos(slon2)$$

$$y2=\rho \sin(slat2)\sin(slon2)$$

$$z2=\rho \cos(slat2)$$

Step 3: Calculate the separation angle between the pairs of Cartesian coordinates $$\phi=\cos-1(x1x2+y1y2+z1z2)/\rho2$$

Step 4: Calculate the grand circle distance based on the separation angle $$d=\phi\rho$$

Figure 9:
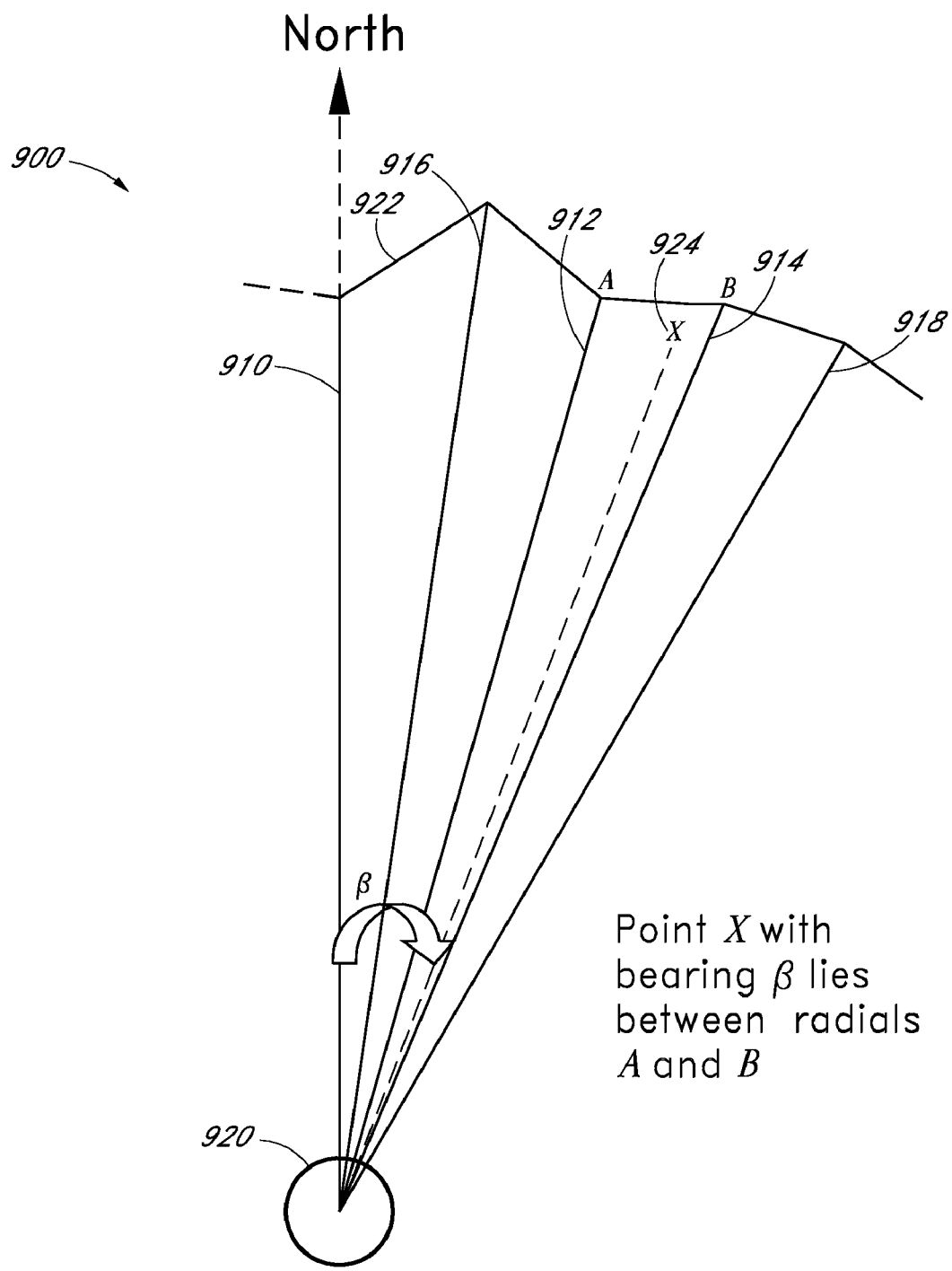
FIG. 9 illustrates field strength contour projections used in determining the field strength contour area coverage of a station and the field strength contour population and/or demographics coverage of a station, according to an embodiment of the invention.

FIG. 9 illustrates a portion of a 360 degree radial contour projection 900 used in determining the field strength contour area coverage of a station and the field strength contour population coverage of a station, according to an embodiment of the invention. In an embodiment, the program 3414 uses the field strength contour projections to determine the field strength contour area coverage of a station and the field strength contour population coverage of a station under the FCC Rules section 73.213.

The contour can be defined by as many radials as are necessary to accurately define the area. FIG. 9 illustrates a portion of a contour 922 and is used to illustrate area coverage calculations. The contour 922 comprises 5 radials: a north radial 910, radial A 912 having a contour length of $L_A$ and a bearing A, radial B 914 having a contour length of $L_B$ and a bearing B, a fourth radial 916, and a fifth radial 918. Point X 924, having a distance $L_X$ from a tower 920 and a bearing β, lies between the radial A 910 and the radial B 912. X is within the contour if:

$$L_X \leq FL_A+(1-F)L_B \text{ where } F=B-\beta/B-A.$$

To determine the field strength contour coverage area, the market is divided into user-defined tiles. In an embodiment, the tiles can be any size and geometric shape. A tile is considered to be within the contour if a point on the tile is within the contour. In an embodiment, the point is a user-defined point. In another embodiment, the point is the center of the tile. The contour area covered is equal to the sum of the areas of the tiles within the contour.

To determine the field strength contour population coverage, program 3414 uses the population centroids or points in census data, where each centroid or point is associated with a population and/or demographics count. A population and/or demographics is considered to be within the contour if the centroid is within the contour. The field strength contour population covered is equal to the sum of the population and/or demographics of the centroids within the contour.

In an embodiment, evenly-spaced points along evenly-spaced radials on a map are used to determine average elevation above mean sea level (AMSL) within a radio station's coverage area. This in turn determines the height above average terrain (HAAT), which greatly affects a station's range and potential for interference with other stations.

An embodiment of the invention does not use projections to preserve heading and does not require numerical search or approximations to find the points of interest along a radial. An embodiment rotates a standard radial from east to west and from north to south, and reduces computational effort for finding distances. In one embodiment, the earth is approximated by a spherical model. The standard radial(s) are corrected using the radius of the earth at the point of interest and then rotated. In an embodiment, the radius at the equator was used for the standard radials.

In another embodiment, an elliptical model is used to apply the rotation from the standard radial set. These embodiments provide accuracy without increased computational effort. Therefore, methods of calculating radials, according to an embodiment of the invention, are more efficient, since desired accuracy can be achieved with less computational effort.

The AMSL (above mean sea level) calculation calculates the average elevation in meters above sea level for a number of points. Examples of a number of points include, but are not limited to a tower location, a set of radials, or 50 points along a single radial. The height above the average terrain (HAAT) is defined as "antenna height above average terrain". In an embodiment, the average meters above sea level values are pre-processed for a given market or area. In another embodiment, the average meters above sea level values are calculated as a tower location is added to the database.

In another embodiment, the radials used to calculate the elevation above mean sea level and the height above average terrain, as required by the FCC, are calculated by transforming a set of radials centered on the equator and the Greenwich meridian to a set of radials at any tower location. The program 3414 can calculate points for any number of radials with any number of sample points. For example, the FCC Rules section 73.215 requires 50 sample points from 3 km to 16 km along 8 equally spaced radials extending from the center point or station location with one radial due north. The points calculated lie along the surface of the spherical approximation of the earth and are equidistant in terms of the surface length between two points along any radial from 3 km to 16 km.

Given the set of radial points centered at (x, y, z)=(R, 0, 0), the radial set can be rotated to any center point, such as a station location, using the latitude as a rotation north from the equator and longitude as a rotation clockwise as seen from due north, around the axis extending through the north and south poles of the spherical model of the earth. In an embodiment, the standard set of radial points is stored in a file for use at any arbitrary center point, such as a station location, through a rotation of the standard stored set(s).

Figure 10:
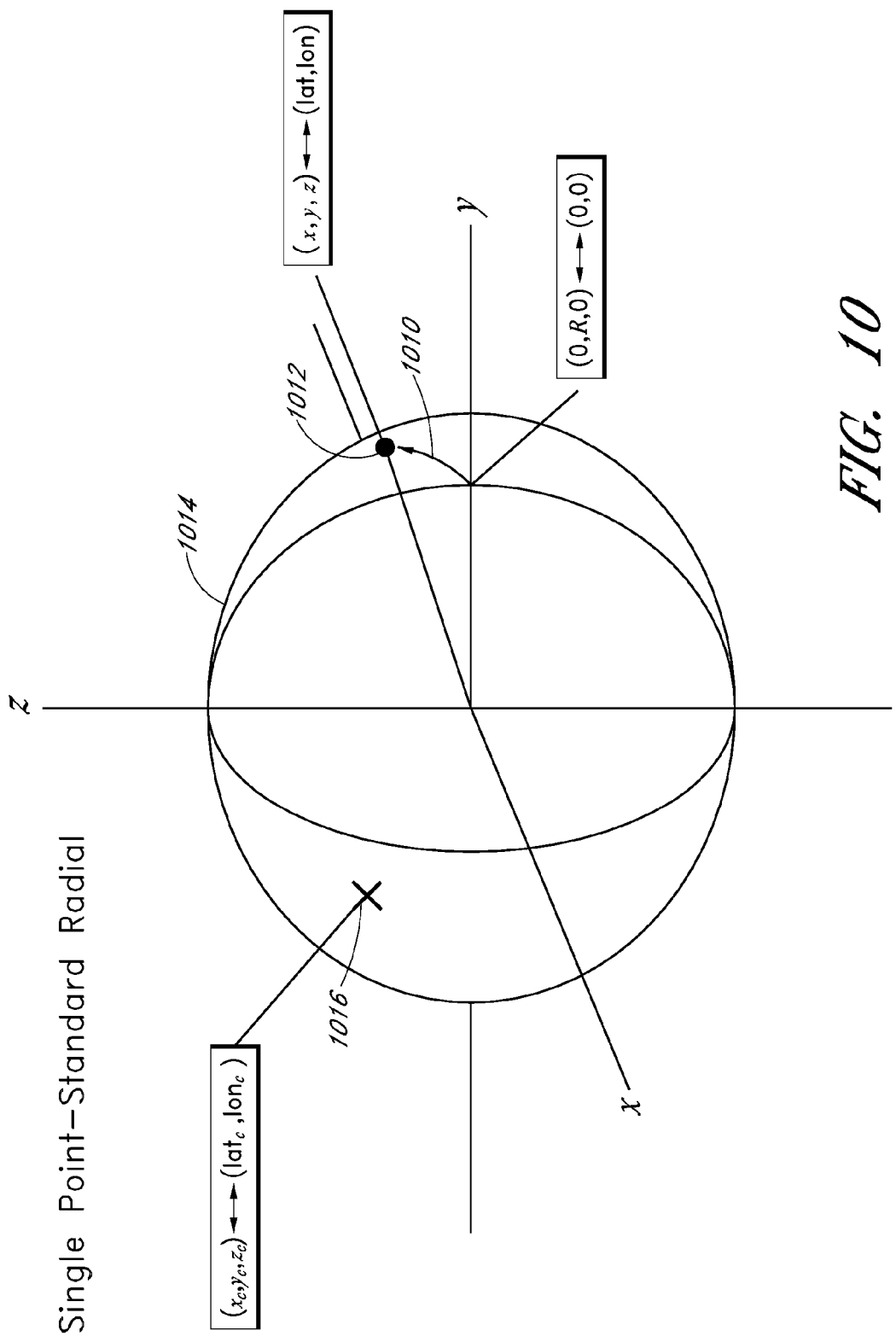
FIG. 10 is a graphical representation of radial for use in the height above average terrain (HAAT) calculation, according to an embodiment of the invention.

FIG. 10 is a graphical representation of a radial 1010 to a point 1012 for use in the height above average terrain calculation, according to an embodiment of the invention. The radial 1010 is centered on the equator and the Greenwich meridian and the point 1012 has Cartesian coordinates (x, y, z) corresponding to latitude and longitude coordinates (lat, lon). A station is located at a point 1016 on the surface of the earth 1014 at (lat$_c$, lon$_c$) corresponding to Cartesian coordinates (x$_c$, y$_c$, z$_c$). The earth 1014 is approximated as a sphere in this embodiment. In another embodiment, the program 3414 approximates the earth 1014 as an ellipsoid.

Figure 11:
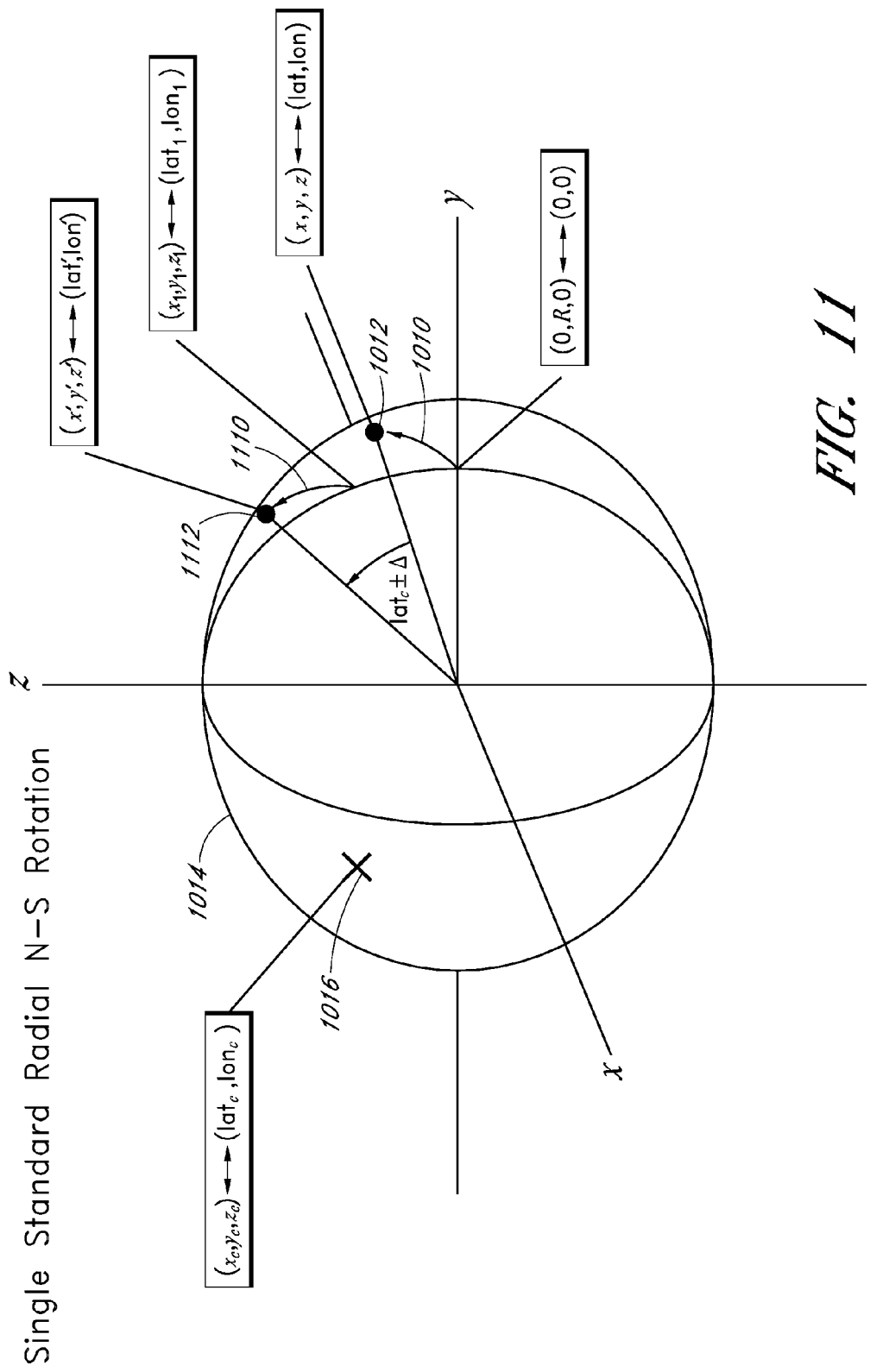
FIG. 11 is a graphical representation of a north-south radial transformation for use in the HAAT calculation, according to an embodiment of the invention.

FIG. 11 is a graphical representation of a north-south radial transformation for use in the height above average terrain calculation, according to an embodiment of the invention. As illustrated in FIG. 11, the radial 1010 is rotated north from the equator by an angle of approximately lat$_c$ plus or minus an amount Δ, which preserves the radial length as it is rotated, to create a radial 1110 at a point 1112 having Cartesian coordinates (x', y', z') corresponding to latitude and longitude coordinates (lat', lon').

Figure 12:
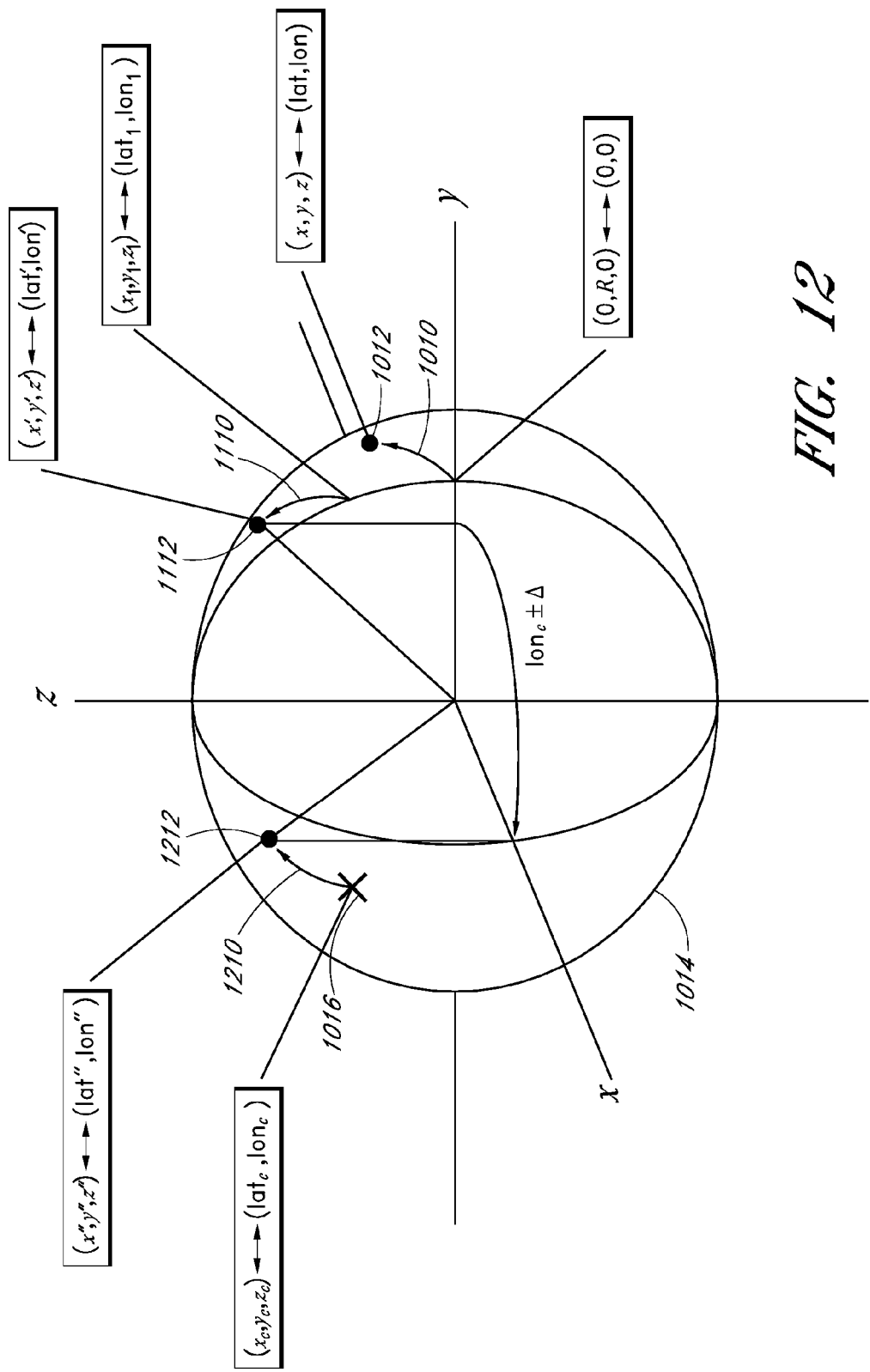
FIG. 12 is a graphical representation of an east-west radial transformation for use in the HAAT calculation, according to an embodiment of the invention.

FIG. 12 is a graphical representation of an east-west radial transformation for use in the height above average terrain calculation, according to an embodiment of the invention. As illustrated in FIG. 12, the radial 1110 is rotated clockwise as seen from due north, around the axis extending through the north and south poles of the spherical model of the earth by an angle of approximately lon$_c$ plus or minus an amount Δ, which preserves the radial length as it is rotated, to create a radial 1210. The radial 1210 extends from a point 1212 having Cartesian coordinates (x", y", z") corresponding to latitude and longitude coordinates (lat", lon") to the point 1016 having Cartesian coordinates (x$_c$, y$_c$, z$_c$) corresponding to latitude and longitude coordinates (lat$_c$, lon$_c$).

Figure 13:
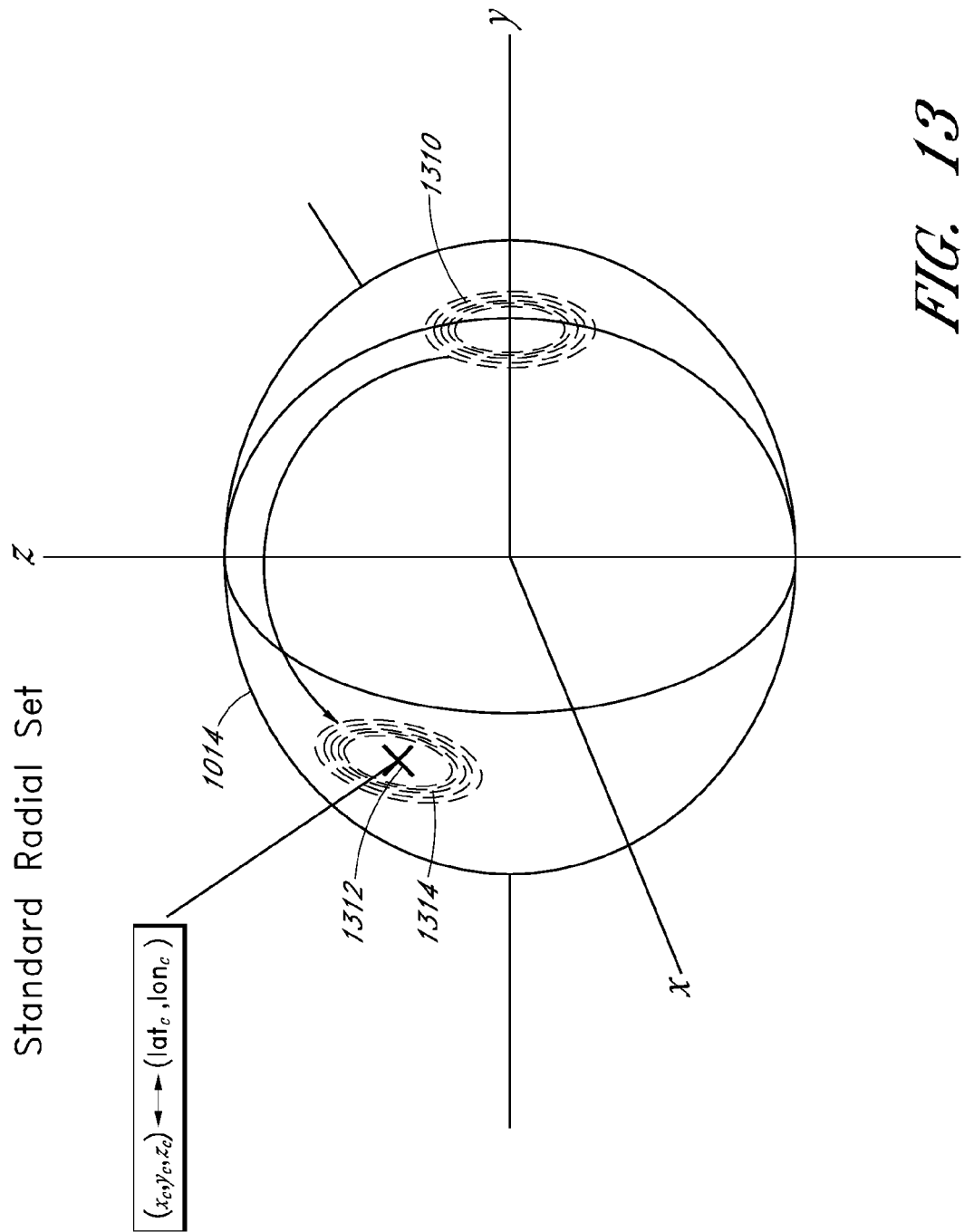
FIG. 13 is a graphical representation of a radial set transformation for use in the HAAT calculation, according to an embodiment of the invention.

FIG. 13 is a graphical representation of a radial set transformation for use in the height above average terrain calculation, according to an embodiment of the invention. FIG. 13 illustrates a radial set 1310 centered at the equator and the Greenwich meridian rotated to any center point 1312, i.e., tower location at (lat$_c$, lon$_c$) corresponding to Cartesian coordinates (x$_c$, y$_c$, z$_c$). The program 3414 rotates the radial set 1310 by lat$_c$±Δ from the equator and lon$_c$±Δ as a rotation clockwise as seen from due north, around the axis extending through the north and south poles of the spherical model of the earth 1014 to create a new radial set 1314 centered at the point 1312.

The rotations preserve distance and bearing of the radial set. The center of the radials rotates from (0, 0) corresponding to the equator and the Greenwich meridian to (lat$_c$, lon$_c$). Rotation of the individual radial points corrects the rotations to preserve the correct distance along the surface of the earth 1014 by adding or subtracting Δ. For example, 3-16 km radials centered at (0, 0) transform to 3-16 km radials centered at (lat$_c$, lon$_c$) after the rotation.

Many trigonometric transformations are possible to accomplish the rotations. In an embodiment, the first rotation is through the vertical plane and the second rotation is through the horizontal plane. In another embodiment, the first rotation is though the horizontal plane and the second rotation is through the vertical plane. In yet another embodiment, the rotation is a single three-dimensional rotation. Computationally rotating the radials centered at (0, 0) is more computationally efficient than computing radials centered at (lat$_c$, lon$_c$).

One embodiment of the invention analyzes multiple alternative operational parameters associated with a communications broadcast and calculates numerical scores for the alternative operational parameters. In an additional embodiment, the invention ranks the alternative operational parameters based at least in part on the numerical scores. FIG. 14 is a flow chart 1400 illustrating a financial feasibility/numerical scoring process 1400, according to an embodiment of the invention.

The financial feasibility/numerical scoring process 1400 calculates a feasibility score for the scenario applied to the identified station. The feasibility score represents a multi-dimensional parameter score based at least in part on the estimated increase in financial value created by each broadcast scenario. These parameters can include but are not limited to a change in the value of target station 100, accommodation stations 104, and replacement stations, where the stations' financial value is based at least in part on changes to population and/or demographics coverage and/or other user-defined criteria, the cost of capital, interim operating costs of the target station and other stations, and the probability of success. For example, a scenario that comprises a major change FCC filing results in higher financial costs. Likewise, a scenario that comprises a major change FCC filing for the target station 100, the accommodation station 104, or a replacement station decreases the probability of success. In another example, more accommodation stations 104 in the broadcast scenario also reduce the probability of success. Further, other parameters used in calculating the net present value can include but are not limited to the bargaining power of accommodation stations, implementation costs, such as, for example, legal costs, engineering costs, and the like.

In block 1410, the program 3414 determines a change in financial value driven by changes in the population and/or demographics covered. In an embodiment, the population and/or demographics coverage loss is the difference between existing population and/or demographics coverage and new population and/or demographics coverage after station modification.

In block 1412, the program 3414 determines construction costs. In an embodiment, the construction costs depend on equipment, height of the current station or tower, the number of new stations sharing the tower, the cost of new construction, the cost of a station extension, and the like.

In block 1414, the program 3414 determines the share in the value of the deal, and in block 1416, the program 3414 determines the return on investment. In an embodiment, the return on investment is the time value of money. In an embodiment, the return on investment is a user-defined parameter. In block 1418, the program 3414 determines the probability of success. In an embodiment the probability of success is a user-defined value.

In block 1420, the program 3414 determines a financial feasibility score. In an embodiment, the financial feasibility score is a net present value of the target station 100 having new scenario parameter and any costs associated with possible accommodation stations 104. The process 1400 ends in block 1422.

In an embodiment, for the feasible scenario k, the net present value of the target station 100, given the new station parameters and any accommodation stations 104 is:

$$NPV_k = \frac{\left(\prod_j P_{j,k}^{Success}\right)\left(V_k - \sum_j C_{j,k} - C_k^{Extract}\right)}{(1+r)^n}$$

where $$C_{j,k} = C_{j,k}^{Pops} + C_{j,k}^{NewTX}$$

is the cost attributed to station j for scenario k and comprises the cost due to a change in population and/or demographics coverage for station j and the cost of a new transmission facility for station j in scenario k, $$C_k^{Extract} = \sum_j s_j^{Extract}\left(V_k - \sum_i C_{i,k}\right)$$

is the cost of negotiations, lost to accommodation stations, for example, in scenario k, $$C_{j,k}^{Pops} = \begin{cases} \alpha_j \Delta_{j,k}^{Pops} & \text{if } \Delta_{j,k}^{Pops} < 0 \\ 0 & \text{otherwise} \end{cases}$$

is the cost due to the change in population and/or demographics coverage for station j and represents the difference between existing coverage and new coverage after station modification, and $$\Delta_{j,k}^{Pops} = Pops(F^{50,50}(ERP_j, HAAT_j, FS), x_j, y_j) - Pops(F^{50,50}(ERP_j^{New}, HAAT_j^{New}, FS), x_j^{New}, y_j^{New})$$

is the change in covered population and/or demographics for station j in scenario k.

Construction costs, represented by $$C_{j,k}^{NewTX} = \begin{cases} C^{Antenna} + \dfrac{C^{Extend}}{m_{x_{j,k}^{New}, y_{j,k}^{New}}} & \text{if } H_{x_{j,k}^{New}, y_{j,k}^{New}}^{New} - H_{x_{j,k}^{New}, y_{j,k}^{New}}^{Old} < \delta \\ C^{Antenna} + \dfrac{C^{Construct}}{m_{x_{j,k}^{New}, y_{j,k}^{New}}} & \text{otherwise} \end{cases}$$

depend on equipment, height of current tower, the number of new stations sharing the tower, and the like, where cost of extension is:

$$C_{j,k}^{Extend} = FC^{Extend} + VC^{Extend}\left(H_{x_{j,k}^{New}, y_{j,k}^{New}}^{New} - H_{x_{j,k}^{New}, y_{j,k}^{New}}^{Old}\right)$$

and cost of new construction is:

$$C_{j,k}^{Construct} = FC^{Construct} + VC^{Construct} H_{x_{j,k}^{New}, y_{j,k}^{New}}^{New}$$

where $C_{j,k}$ is the cost attributed to station j for scenario k,
$C_{j,k}^{NewTX}$ is the cost of new transmission facility for station j for scenario k,
$C_{j,k}^{Pops}$ is the cost due to change in population and/or demographics coverage for station j,
$C_k^{Extract}$ is the cost of negotiation (lost to accommodations station(s) from NPV of project) in scenario k,
$C^{Antenna}$ is the cost of an antenna (not including tower),
$FC^{Construct}$ is the fixed cost to construct a new tower (regardless of height),
$VC^{Construct}$ is the variable cost (per meter) to construct a new tower,
$FC^{Extend}$ is the fixed cost to extend an existing tower (regardless of height),
$VC^{Extend}$ is the variable cost (per meter) to extend an existing tower,
$Class_j$ is the class of radio station j,
$ERP_j$ is the transmission power for station j,
$ERP_j^{New}$ is the new transmission power for station j in scenario k,
FS is the field strength in dBu defining a field strength contour using $F^{50,50}$,
$HAAT_j$ is the height above average terrain for station j,
$HAAT_{j,k}^{New}$ is the new height above average terrain for station j for scenario k,
$H_{x,y}$ is the height of existing tower at location (x,y),
$H_{x,y,k}^{New}$ is the new height of tower (extension of existing or new construction) at location (x,y) in scenario k,
$m_{x,y,k}$ is the number of accommodation stations being relocated to location (x,y) for a given accommodation scenario k,
$N_k$ is the number of months to complete scenario k, e.g. 18 months for projects by application; 36 months for projects with rule-making.
$NPV_k$ is the new present value for scenario k,
$P_{j,k}^{Success}$ is the probability of success for change to station j in scenario k,
r is the return on investment, i.e. "cost of money",
$S_k^{Extract}$ is the share of base value for target station j, lost to negotiation in scenario k,
$V_j$ is the base value of station j,
$x_j, y_j$ is the current geographic location of station j, given as (x,y) coordinates,
$x_j^{New}, y_j^{New}$ is the new geographic location of station j, given as (x,y) coordinates,
$\alpha_j$ is the marginal value per population and/or demographics covered for station j,
$\delta$ is the parameter reflecting permissible extension of existing tower facilities, e.g. $\delta=25\%$ would allow extension of a 200 m tower to 250 m without new construction,
$\Delta_{j,k}^{Pops}$ is the change in covered population and/or demographics for station j in scenario k,
$NPV_k$ is the new present value of accommodation scenario k, $|F^{50,50}ERP_j,HAAT_j,FS|$ is the evaluation of geographic locations along the field strength contour defined by FCC's F(50,50) field strength contour, for radio station j, and $Pop_{j,k}|F^{50,50}ERP_j,HAAT_j,FS_i,s_j,y_j|$ is the evaluation of population and/or demographics using the F(50,50) field strength contour at location $(x_j,y_j)$ and a field strength of FS dBu, e.g. 60 dBu for station j in scenario k.

Other cost components can include but are not limited to changes in operating expenses, interim station operating costs, filing costs, such as FCC filing fees, legal fees, and environmental studies, project development costs, structural analysis, risk assessment, consulting fees, the time value of money for the accommodation stations, financial risk costs for the accommodation stations, and the like.

A variety of models can be used to calculate the financial feasibility value for the target station 100, including but not limited to net present value models such as linear, polynomial, exponential, logarithmic, Cobb-Douglas, constant elasticity of substitution, power, or others. The cost components either can be estimated or itemized costs. Changes to the value added to the target station 100 can include values beyond the base value, including but not limited to format change values, portfolio values, and economies of scale and scope.

Other scoring embodiments can implement additional or different scoring methods. Scenario scoring can be ranked numerically, alphabetically, or other user-defined rankings. In one embodiment, the program 3414 calculates a population improvement score. The population improvement score is a score based on the percentage of population and/or demographics coverage improvement. In an embodiment, the population improvement score is [scenario coverage−existing coverage]×10.

For example, if the existing stations broadcasts cover 21% of the population and/or demographics of the market (existing configuration) and the station broadcasts to 89% of the population and/or demographics in the market with the changes identified in the scenario (scenario configuration), the population improvement score is (89−21)×10=680. In an embodiment, scenarios that produce less than 90% of the total coverage of the original station configuration are further penalized by multiplying the population improvement score by a factor of less than one.

In another embodiment, the program 3414 calculates an implementation score. The implementation score indicates how well a particular scenario performs with respect to the FCC allocation process. In one embodiment, the implementation score is a number between 0 and 100, where an implementation score of 0 represents a scenario that the program 3414 determines to be unobtainable and an implementation score of 100 represents a scenario where the regulations concerning the spacing between stations are met.

In an embodiment, the highest implementation score is 100. This indicates a scenario where the situations meet the spacing requirements. In an embodiment, the FCC Rules comprise the spacing requirements. For each station around the target station 100 that does not meet the spacing requirement with the target station 100, the program 3414 deducts points from the implementations score. In another embodiment, for situations where the spacing requirements are not met and the field strength contour overlaps are 10 km, 9 km, 7 km, and 6 km on the direct line for co-channel stations, first adjacent stations, second adjacent stations, third adjacent stations and intermediate frequencies, such as the 53$^{rd}$ and 54$^{th}$ adjacent stations, respectively, then the program 3414 subtracts additional points from the implementation score.

In a further embodiment, if the scenario involves a class downgrade, then the program 3414 deducts points from the implementation score. Finally, in yet another embodiment, if the target station 100 under the scenario configuration does not cover the community of license point with a 70 dBu signal, then the program 3414 deducts points from the implementation score. The implementation score is 0 if there are more than a user-defined quantity of stations where the spacing requirements are not met or if there is more than one station where the FCC Rules section 73.215 table of minimum distance separations for short spacings are not met, according to other embodiments of the invention.

In a further embodiment, the program 3414 calculates a composite score. The composite score combines the implementation score and the population improvement score. In an embodiment, the composite score is [(10×implementation score)+population improvement score]/2.

A community of license in broadcasting, for example, is the community that a radio station or television station is officially licensed or allocated to serve by the applicable broadcast regulatory body. Stations cover the community of license with their broadcast signal, while the transmitter itself can be some distance away.

In the FM radio example, a station's 70 dBu field strength contour is the area that the station's broadcast signal reaches with at least a signal strength of approximately 70 dBu. In the FM radio example, a radio station's 70 dBu field strength contour typically is required to cover approximately 85% or more of the area and approximately 85% or more of the population and/or demographics of the station's community of license.

If the new station scenario creates a situation where a station's field strength contour as measured from the new location is less than the requirements over the population and area of the existing COL, the program 3414 identifies new COL candidates for the scenario. The program 3414 uses the set of station scenario coordinates, the effective radiated power (ERP) of the scenario transmitter, the above mean sea level (AMSL) height of the scenario transmitter, the height above average terrain, and the like to determine new community of license candidates.

FIG. 15 is a flow chart illustrating a process 1500 to identify a community of license (COL), according to an embodiment of the invention. In block 1510, the program 3414 determines the latitude and the longitude of the scenario station. In block 1512, the program 3414 determines the antenna height, such as the above mean sea level height or the height above average terrain, for example, of the scenario station. In block 1514, the program 3414 determines the power, such as the effective radiated power, for example, of the scenario station.

For example, an embodiment of the invention electronically analyzes one or more operational parameters for a communications broadcast and electronically determines whether the alternative operational parameters are associated with a need to obtain a new community. A further embodiment of the invention then identifies one or more community candidates that can accommodate the alternative operational parameters.

In block 1516, the program 3414 determines the population and/or demographics threshold of the communities to consider. In an embodiment, the user can define a minimum population and/or demographics percentage and/or a minimum area percentage of the candidates community of license covered by the signal.

In block 1518, the program 3414 uses the above mean sea level elevation, height above average terrain, and effective radiated power to calculate a 70 dBu field strength contour at the latitude and longitude coordinate point. In an embodiment, the program 3414 calculates the 70 dBu field strength contour of the station scenario using an omni-directional antenna pattern.

The program 3414 determines whether the community of license field strength of the new station scenario is less than a threshold. In an embodiment, the threshold is the requirement that the 70 dBu field strength contour cover at least 85% of both the area and the population of the community of license. If the requirements are met, the process 1500 moves to block 1526, where a new community of license is not needed for the scenario.

If the requirements are not met, the process 1500 moves to block 1520, where the program 3414 generates a list of communities within the field strength signal contour. In an embodiment, the field strength signal contour is the 70 dBu field strength contour. In another embodiment, the program 3414 generates a list of communities that are within a user-specified percentage of the FCC required field strength contour of the station. In another embodiment, the program 3414 generates a list of communities that are at least partially covered by a user-defined station field strength contour of the new station scenario. In an embodiment, communities will be determined using data polygons from the U.S. Census Bureau TIGER (Topologically Integrated Geographic Encoding and Referencing) system.

For each new community of license candidate identified in the field strength signal contour, the program 3414 identifies the population and/or demographics and percentage of the population and/or demographics covered for each community. The population and/or demographics is based on data in a census database 3414. In an embodiment, the census database 3416 is a US Census database. The program 3414 further identifies the geographic area of the community of license candidate polygon, the size of the area and the percentage of the area covered by the field strength signal contour.

In block 1522, the program 3414 determines the services licensed to each of the communities listed in block 1520. In an embodiment, the program 3414 determines the number of services that are licensed to each community by matching the community name string from the polygon data with the community names contained in the appropriate FCC database 3416, such as, for example, the FCC AM and FM databases. In an embodiment, station data records that cannot be matched to the community name in the polygon data by string comparison are excluded.

In an embodiment, the program 3414 uses the community polygon's geographic centroid to determine if the community is part of an urban area. If the centroid is located within an urban area as defined by an urban area database 3416, such as the TIGER Urban Area database, for example, then the community is considered as part of that urban area.

In block 1524, the program 3414 sorts the list of community of license candidates. In an embodiment, the community of license candidates are ranked and listed in ascending order of number of licensed services, and secondarily ranked and listed in descending order of population and/or demographics for those community of license candidates with the same number of services. In this embodiment, the top of the list comprises community of license candidates with no licensed services, such as no AM or FM stations, for example, ranked in descending order of population and/or demographics. A new community of license for the new station scenario is chosen based on the number of licensed services and the population and/or demographics in block 1528.

An example of a report listing community of license candidates is shown below. This report lists five community of license candidates, and indicates the population and area of the community, population and area covered by the station scenario, the percent of the population and area covered by the station scenario, the number of licensed services in the community, and the urban area associated with the community.

Community of License Search
Latitude: 42-40-12 N Longitude: 091-54-44 W
ERP: 100.0 kW AMSL Height: 926.129 m
Existing Facility COL: Oelwein, Iowa
Population Database: 2000 US Census (SF1)
Primary Terrain: 30 Second US Database
Cities where less than 85.0% are covered are not included.
Cities with a population less than 3000 are not included.

Marion, Iowa:
Population: 26,667 Covered: 26,663 Percentage: 100.0
Area (sq. km): 45.25 Covered: 43.75 Percentage: 96.7
Number of Services: 0 Urban Area: Cedar Rapids, Iowa Evansdale, Iowa:
Population: 4,475 Covered: 4,475 Percentage: 100.0
Area (sq. km): 11.25 Covered: 11.25 Percentage: 100.0
Number of Services: 0 Urban Area: Waterloo, Iowa Monticello, Iowa:
Population: 3,664 Covered: 3,607 Percentage: 98.4
Area (sq. km): 17.50 Covered: 11.00 Percentage: 62.9
Number of Services: 0 Urban Area: Monticello, Iowa Oelwein, Iowa:
Population: 6,692 Covered: 6,692 Percentage: 100.0
Area (sq. km): 13.75 Covered: 13.75 Percentage: 100.0
Number of Services: 1 Urban Area: Oelwein, Iowa
Services: KOEL(950)

Hiawatha, Iowa:
Population: 6,483 Covered: 6,483 Percentage: 100.0
Area (sq. km): 11.00 Covered: 11.00 Percentage: 100.0
Number of Services: 1 Urban Area: Cedar Rapids, Iowa
Services: KWOF-FM(206)

If the target station 100 having a community of license is relocated such that the target station 100 in the new location scenario does not cover the community of license, the program 3414 identifies candidate replacement stations. The replacement station replaces the target station 100 in the community of license. For business reasons, the owner of the target station 100 may desire a replacement station that covers a user-defined target market or area 102. In other embodiments, regulations can require a replacement station to continue service to the community. For example, the FCC requires a new community of license station to replace the target station 100, if the target station 100 is the only station licensed service to the community of license and it is relocated outside of the community of license.

In an embodiment, replacement stations comprise FM and AM radio stations. In an embodiment, the program 3414 identifies existing stations that cover the community of license required by the FCC or specified by a user-defined target market or area 102 and evaluates these stations as possible replacement stations for the target station 100. In another embodiment, the program 3414 identifies and evaluates new station scenarios that cover the community of license required by the FCC or specified by a user-defined target market or area 102 to identify replacement station candidates. Replacement stations may be determined independently in the same process as a new scenario or as part of a target station scenario.

FIG. 33 is a flow chart illustrating a process 3300 to identify a replacement station, according to an embodiment of the invention. In block 3310, the program 3414 identifies the community of license needing a replacement station. In block 3312, the program 3414 identifies a station whose broadcast coverage area covers the community of license.

For example, one embodiment of the invention analyzes one or more alternative operational parameters of a point of communication and determines whether the alternative operational parameters are associated with a need to obtain a replacement station. A further embodiment identifies one or more points of communication that could function as the replacement station.

In block 3314, the program 3414 determines if the station's coverage is less than a threshold. In an embodiment, the threshold is that the 70 dBu field strength contour cover at least 85% of both the area and the population and/or demographics of the community of license. If the threshold is not met, the process 3300 moves to block 3316, where the station does not qualify as a replacement station.

If the threshold is met, the process 3300 moves to block 3318, where the station qualifies as a possible replacement station. In block 3320, the program 3414 checks for additional stations.

If there are additional stations, the process moves to block 3312, where blocks 3312-3318 are repeated. The program 3414 repeats steps 3312-3318 until the replacement station candidates have been evaluated. When the replacement station candidates have been evaluated, the process moves to block 3322, where a replacement station is chosen. The process ends in block 3324. In another embodiment, the program 3414 identifies replacement station candidates in the same way as a new scenario, as described in FIG. 2.

FIG. 16 is a flow chart illustrating a process 1600 to identify possible scenarios comprising changes of the station channel and/or frequency, according to an embodiment of the invention. In block 1610, the program 3414 analyzes a station scenario where the station channel and/or frequency have changed.

In an embodiment, the program 3414 changes the channel of the scenario station by at least one of ±1, ±2, ±3 ±53, and ±54 broadcast channels. In another embodiment, the program 3414 changes the broadcast frequency of the scenario station by at least one of ±10.6 MHz and ±10.8 MHz.

In block 1612, the program 3414 determines if the scenario of the station at the new location and new channel and/or frequency is feasible. In an embodiment, the program 3414 performs a feasibility analysis on each channel change and/or frequency change to determine if it is allowable under FCC and other applicable regulations and laws. FIG. 8 describes the feasibility process.

If the scenario is feasible, the program 3414 scores the scenario in block 1616. FIG. 14 describes the scoring process. In block 1618, the program 3414 identifies a new community of license (COL) if needed. FIG. 15 describes the process of identifying a new community of license.

If the scenario in block 1612 is not feasible, the program 3414 analyzes accommodation scenarios in block 1614. FIG. 20 describes the process of analyzing accommodation scenarios.

After analyzing accommodation scenarios and/or evaluating the channel and/or frequency change scenario, the program 3414, in block 1620, determines if there are additional channel and/or frequency changes to evaluate. If there are additional channel and/or frequency changes, the program 3414 returns to block 1610, where the steps 1610-1620 are repeated for the identified station at another channel and/or frequency. The program 3414 repeats steps 1610-1620 until the channel and/or frequency changes for the station have been evaluated. When the channel and/or frequency changes for the station have been evaluated, the process 1600 ends in block 1622.

FIG. 17 is a flow chart illustrating a process to identify possible scenarios comprising changes of the station class, according to an embodiment of the invention. In block 1710, the program 3414 analyzes a station scenario where the station class has changed. In the FM radio example, possible station classes are A, B, B1, C0, C1, C2, C3, and the like.

For example, in one embodiment, a computerized method improves the operation of the target station 100 by electronically analyzing multiple alternative classes for the target station 100, wherein the alternative classes are different than the class of the target station 100. In another embodiment, the computerized method ranks the alternative classes based at least in part on the variance in one or more user-defined objectives such as the coverage associated with the alternative classes.

In block 1712, the program 3414 determines if the scenario of the station at the new location and new class is feasible. In an embodiment, the program 3414 performs a feasibility analysis on each class change to determine if it is allowable under FCC and other applicable regulations and laws. FIG. 8 describes the feasibility process.

If the scenario is feasible, the program 3414 scores the scenario in block 1716. The scoring process is described in FIG. 14. In block 1718, the program 3414 identifies a new Community of License (COL) if needed. FIG. 15 describes the process of identifying a new community of license.

Figure 18:
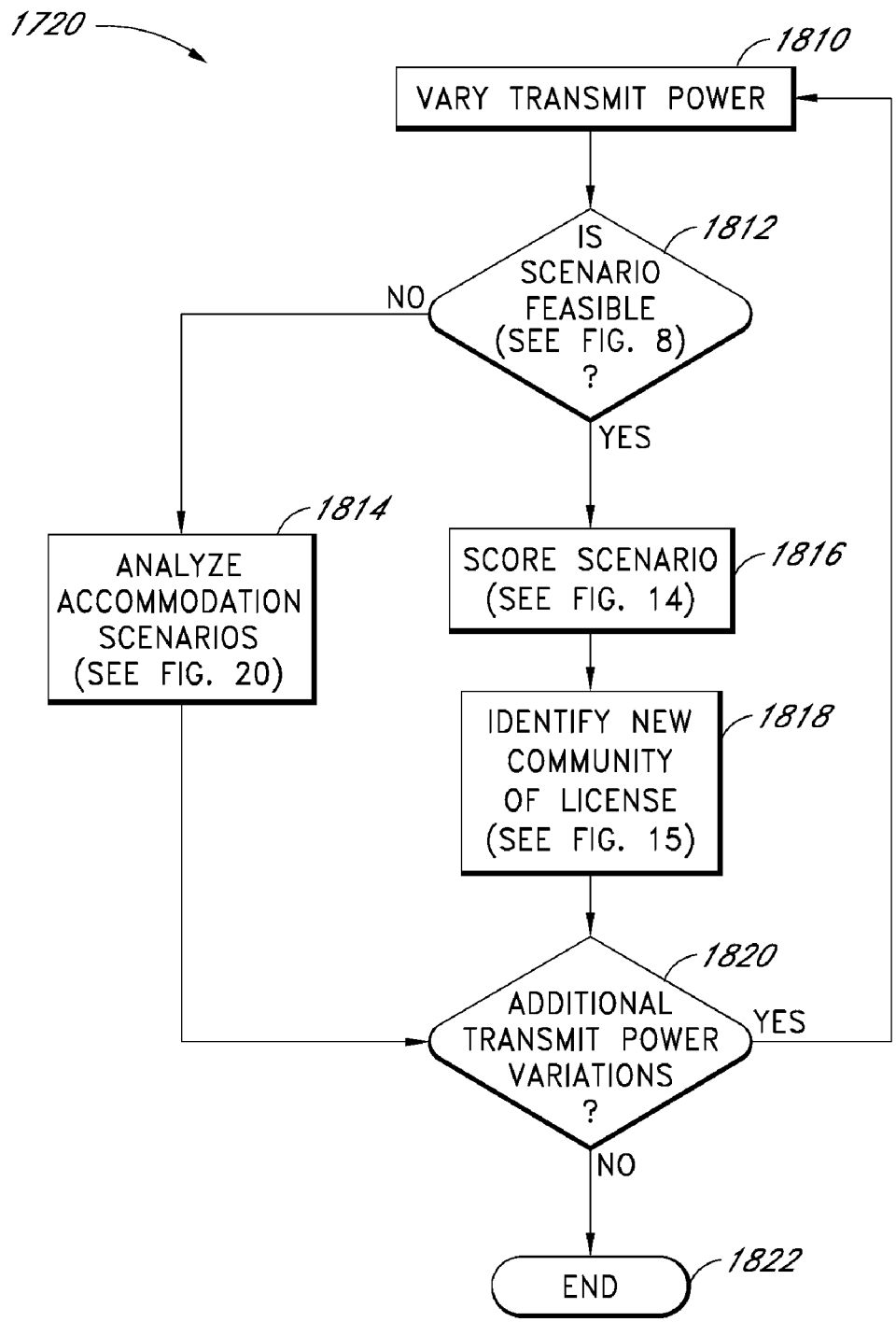
FIG. 18 is a flow chart illustrating a process to evaluate variations in the transmit power within a station class, according to an embodiment of the invention.
Figure 19:
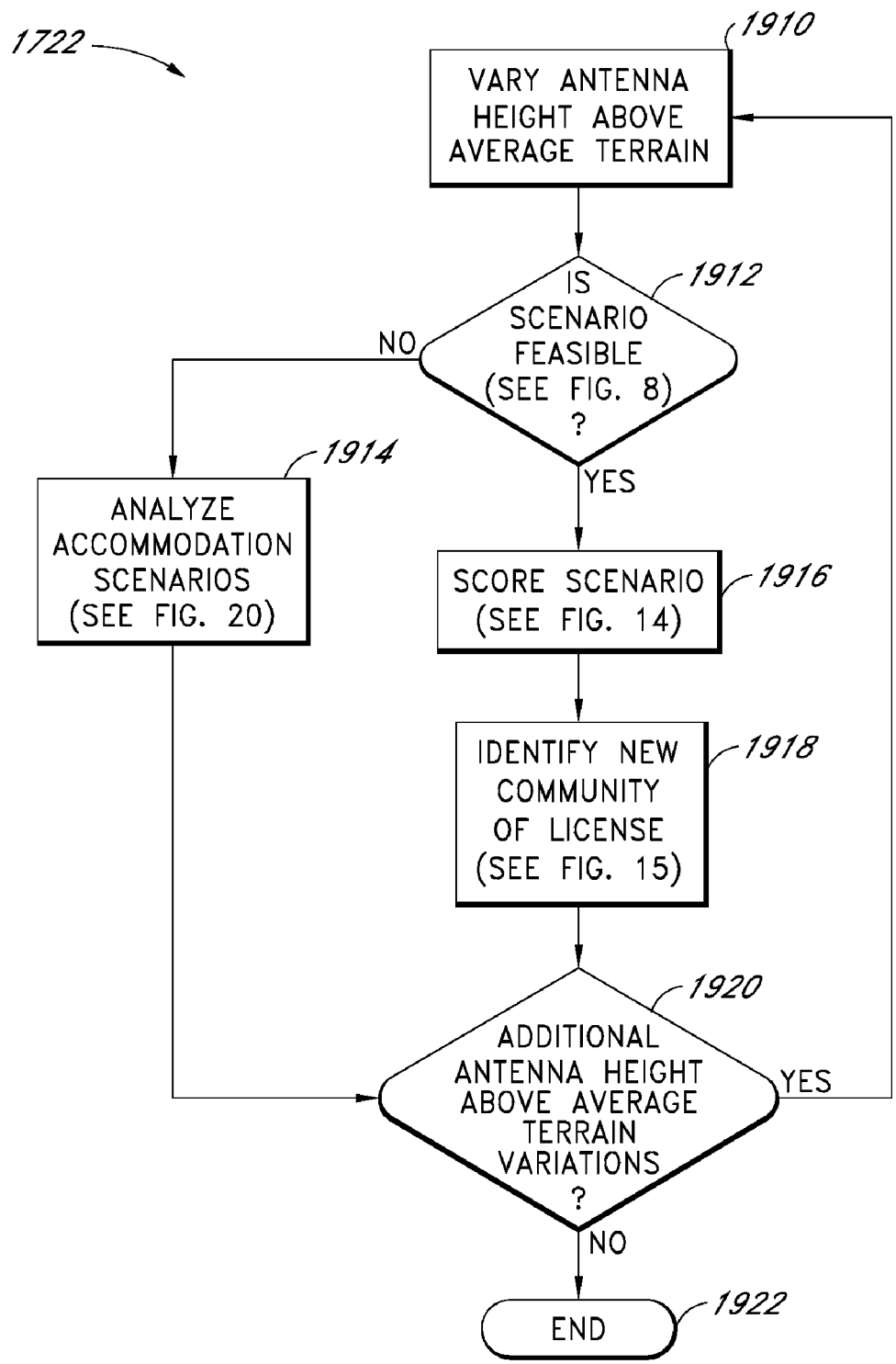
FIG. 19 is a flow chart illustrating a process to evaluate variations in the antenna HAAT within a station class, according to an embodiment of the invention.

In block 1720, the program 3414 evaluates variations in the transmit power within each class as allowed by FCC regulations. FIG. 18 describes the process of evaluating variations in the transmit power. In block 1722, the program 3414 evaluates variations in the antenna height above average terrain (HAAT) within each class as allowed by FCC regulations. FIG. 19 describes the process of evaluating variations in the antenna height above average terrain.

If the scenario in block 1712 is not feasible, the program 3414 analyzes accommodation scenarios in block 1714. FIG. 20 describes the process of analyzing accommodation scenarios.

After analyzing accommodation scenarios and/or evaluating the class change, transmit power variations, and/or height above average terrain variations, the program 3414, in block 1724, determines if there are additional class changes to evaluate. If there are additional class changes, the program 3414 returns to block 1710, where the steps 1710-1722 are repeated for the identified station at another class, transmit power and/or height above average terrain. The program 3414 repeats steps 1710-1722 until the identified class, transmit power and/or height above average terrain changes for the station have been evaluated. When the identified class, transmit power and/or height above average terrain changes for the station have been evaluated, the process 1700 ends in block 1726.

FIG. 18 is a flow chart illustrating a process 1800 to evaluate variations in the transmit power within a station class, according to an embodiment of the invention. In block 1810, the program 3414 varies the transmit power of the scenario station.

In block 1812, the program 3414 determines if the scenario of the station at the new transmit power is feasible. In an embodiment, the program 3414 varies the transmit power within each class as allowed by applicable communications and/or regulatory laws. In an embodiment, the program 3414 performs a feasibility analysis on each variation in the transmit power to determine if it is allowable under applicable communications and/or regulatory laws. FIG. 8 describes the feasibility process.

If the scenario is feasible, the program 3414 scores the scenario in block 1816. FIG. 14 describes the scoring process. In block 1818, the program 3414 identifies a new community of license if needed. FIG. 15 describes the process of identifying a new community of license.

If the scenario in block 1812 is not feasible, the program 3414 analyzes accommodation scenarios in block 1814. FIG. 20 describes the process of analyzing accommodation scenarios 1814.

After analyzing accommodation scenarios, the program 3414, in block 1820, determines if there are additional variations in the transmit power to evaluate. If there are additional variations, the program 3414 returns to block 1810, where the steps 1810-1820 are repeated for the identified station at another transmit frequency. The program 3414 repeats steps 1810-1820 until the identified transmit power variations for the station have been evaluated. When the identified transmit power variations for the station have been evaluated, the process 1800 ends in block 1822.

FIG. 19 is a flow chart illustrating a process to evaluate variations in the antenna HAAT within a station class, according to an embodiment of the invention. In block 1910, the program 3414 varies the antenna height above average terrain of the scenario station.

In block 1912, the program 3414 determines if the scenario of the station at the new antenna height above average terrain is feasible. In an embodiment, the program 3414 varies the antenna height above average terrain within each class as allowed by applicable communications and/or regulatory laws. In an embodiment, the program 3414 performs a feasibility analysis on each variation in the antenna height above average terrain to determine if it is allowable under applicable communications and/or regulatory laws. The feasibility process is described in FIG. 8.

If the scenario is feasible, the program 3414 scores the scenario in block 1916. The scoring process is described in FIG. 14. In block 1918, the program 3414 identifies a new community of license if needed. FIG. 15 describes the process of identifying a new community of license.

If the scenario in block 1912 is not feasible, the program 3414 analyzes accommodation scenarios in block 1914. FIG. 20 describes the process of analyzing accommodation scenarios.

After analyzing accommodation scenarios, the program 3414, in block 1920, determines if there are additional variations in the antenna height above average terrain to evaluate. If there are additional variations, the program 3414 returns to block 1910, where the steps 1910-1920 are repeated for the identified station at another antenna height above average terrain. The program 3414 repeats steps 1910-1920 until the identified antenna height above average terrain variations for the station have been evaluated. When the identified antenna height above average terrain variations for the station have been evaluated, the process 1900 ends in block 1922.

Referring to FIG. 7, the program 3414 determines if the station scenario is feasible in block 712, and if the station scenario does not meet the applicable communications and/or regulatory laws spacing requirements between field strength contours of stations, the scenario is not feasible. Because it may be possible to make changes to one or more of the stations in conflict with the scenario station to resolve the conflict, the process moves to block 714, where the program 3414 evaluates accommodation scenarios. FIG. 20 is a flow chart illustrating a process 2000 to analyze accommodation station scenarios, according to an embodiment of the invention. The process 2000 analyzes accommodation scenarios to generate accommodation solutions for infeasible target station scenarios. The process 2000 further scores, sorts, and presents scored accommodation scenarios.

For example, one embodiment of the invention electronically or via data analysis analyzes one or more alternative operational parameters associated with a communication broadcast and electronically or via data analysis determines whether the alternative operational parameters conflict with at least one other communication broadcast. The embodiment can further determine whether the operational parameters of the other communication broadcast can be varied to remove the conflict.

In an embodiment, the process 2000 considers simple and complex accommodation scenarios. In an embodiment, simple accommodation scenarios comprise changing one of the location, channel, or class of the accommodation station. In an embodiment, complex accommodation scenarios comprise varying, in any combination, the location, channel, frequency, or class of the accommodation station 104. In an embodiment, the changes are based at least in part on the FCC Rules section 73.215.

In another embodiment, if the accommodation scenario is not feasible because it creates secondary conflicts with other stations, the process 2000 evaluates additional accommodation scenarios to resolve the secondary conflict. In an embodiment, the process 2000 can evaluate accommodation scenarios to resolve conflicts with other accommodation scenarios. The process 2000 can continue until the program 3414 has exhausted all possible locations having all possible channel and/or frequency changes and all possible class changes for each accommodation station 104 that is identified as having a conflict with the previously determined accommodation station 104. By considering secondary accommodation station scenarios to resolve conflicts with primary accommodation scenarios, where the primary accommodation station 104 conflicts with the target station, the program 3414 cascades or daisy chains accommodation station scenarios. In an embodiment, the user determines the maximum acceptable number of cascading accommodation stations 104.

Figure 21:
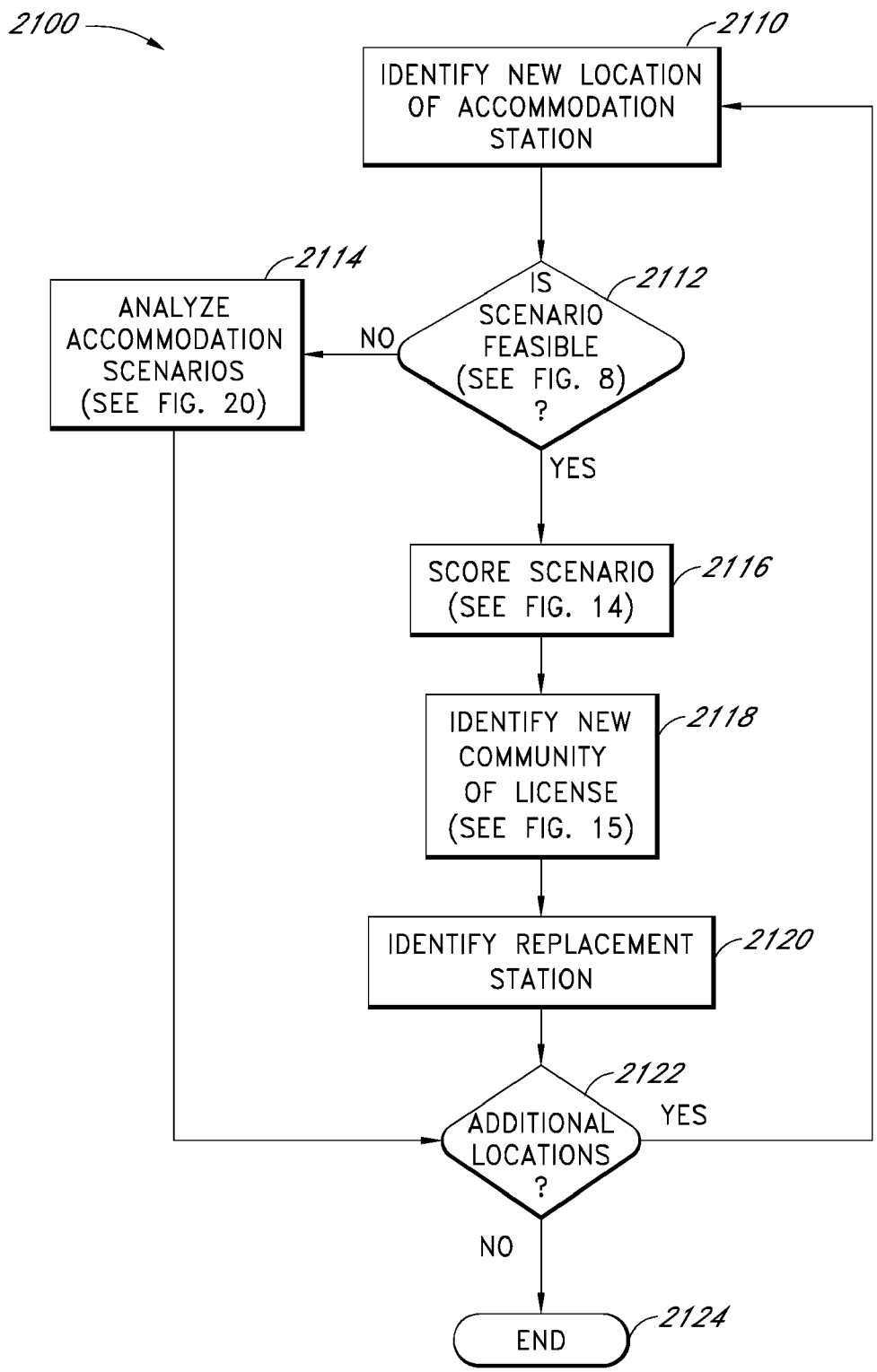
FIG. 21 is a flow chart illustrating a process to identify possible changes of the accommodation station location, according to an embodiment of the invention.

In block 2010, the program 3414 identifies an accommodation station 104. Accommodation stations 104 are the stations conflicting with the station scenario. In block 2012, the program 3414 evaluates changing the location of the accommodation station 104. FIG. 21 describes the process of evaluating location changes for the accommodation station 104. In block 2014, the program 3414 evaluates changing the channel of the accommodation station 104. FIG. 16 describes the process of evaluating channel and/or frequency changes for the accommodation station 104. In block 2016, the program 3414 evaluates changing the class of the accommodation station 104. FIG. 17 describes the process of class changes for the accommodation station 104.

Figure 22:
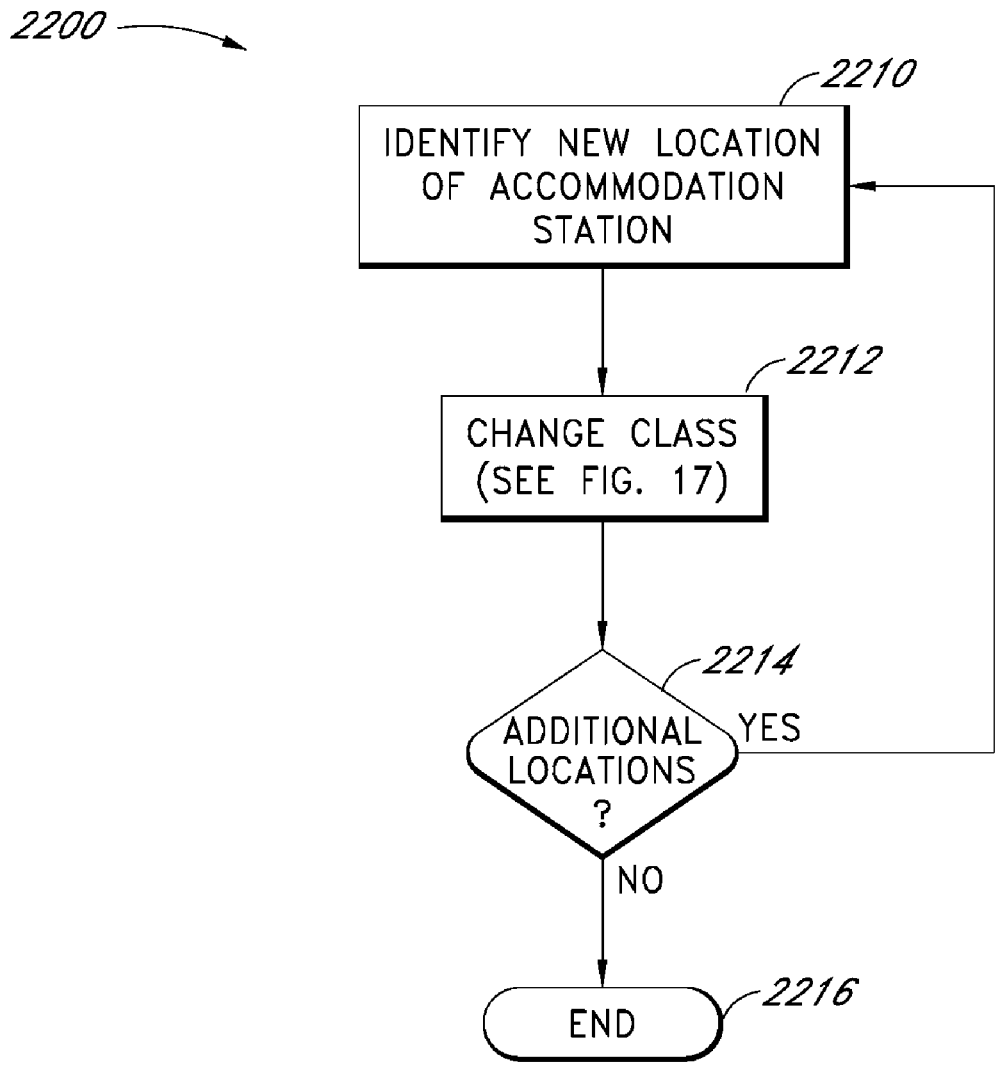
FIG. 22 is a flow chart illustrating a process to identify possible changes of the accommodation station location and class, according to an embodiment of the invention.
Figure 23:
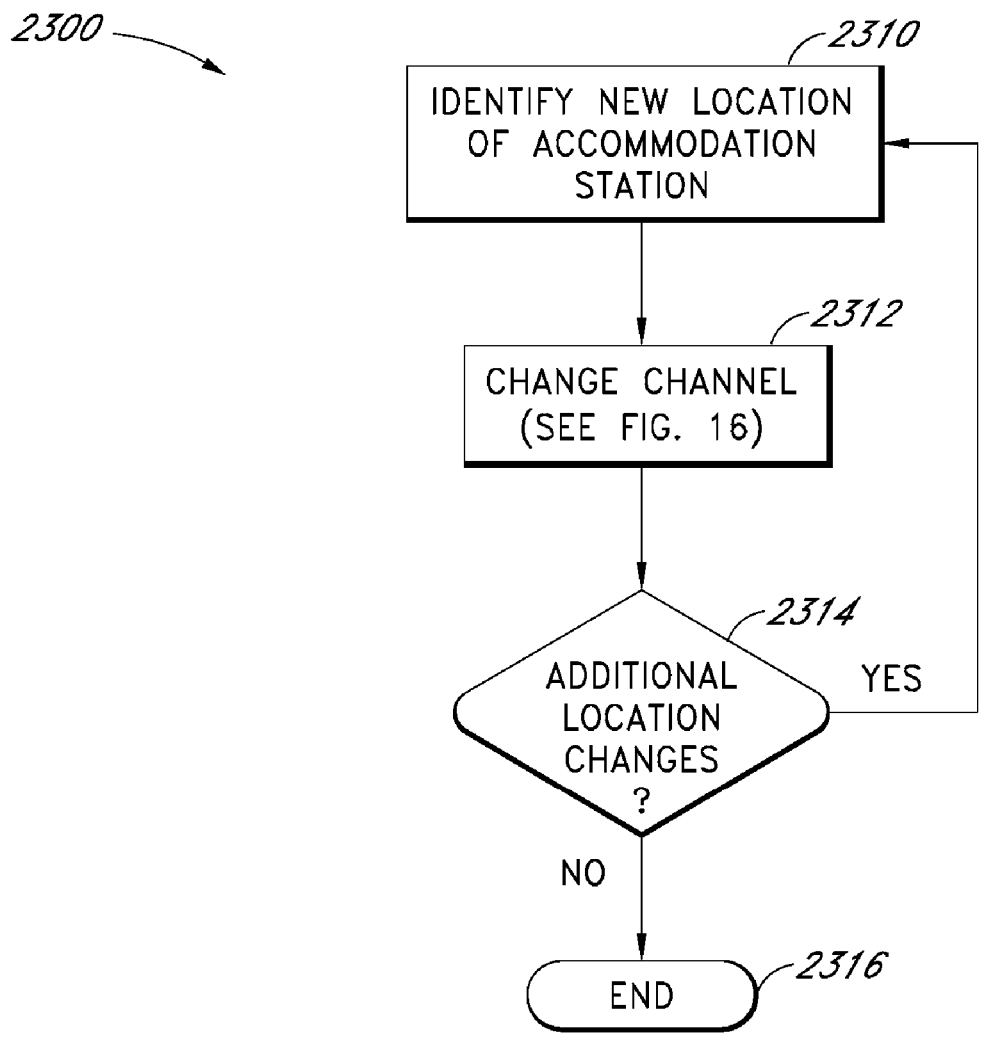
FIG. 23 is a flow chart illustrating a process to identify possible changes of the accommodation station location, channel and/or frequency according to an embodiment of the invention.
Figure 24:
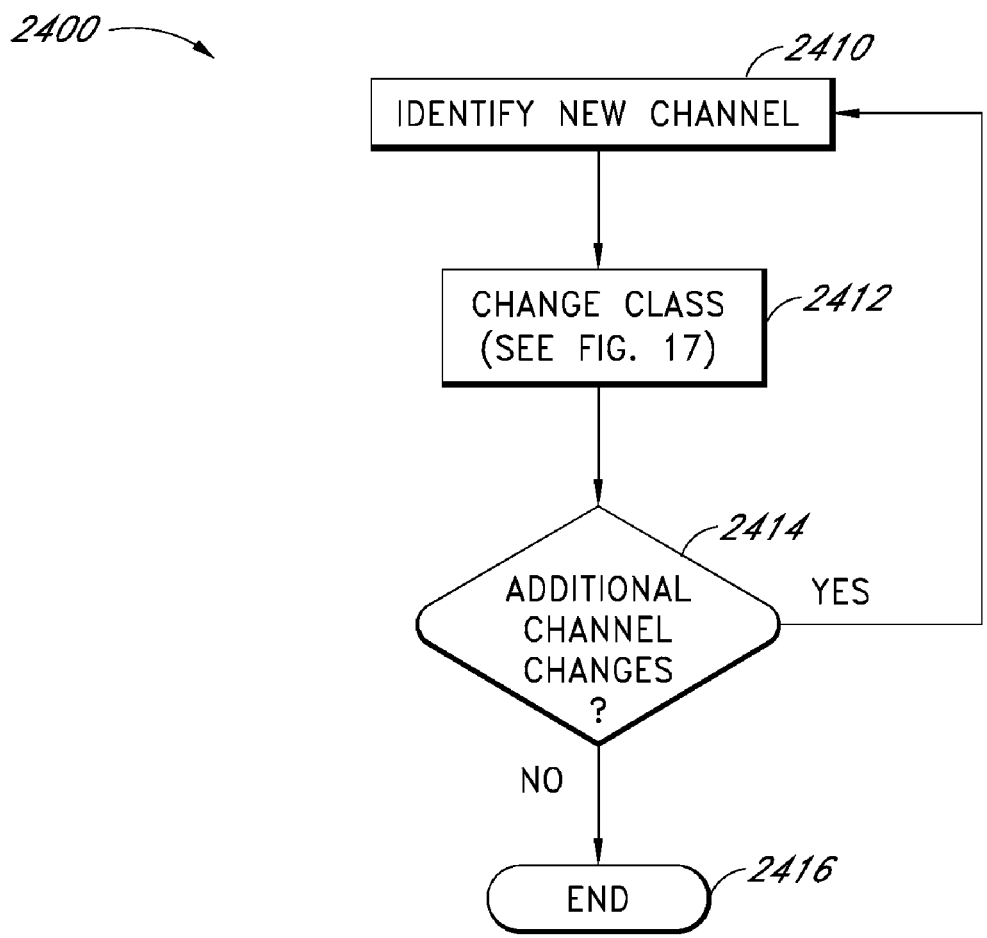
FIG. 24 is a flow chart illustrating a process to identify possible changes of the accommodation station class, channel and/or frequency according to an embodiment of the invention.

In block 2018, the program 3414 evaluates changing the location and class of the accommodation station 104. FIG. 22 describes the process of evaluating location and class changes for the accommodation station 104. In block 2020, the program 3414 evaluates changing the location, channel, and/or frequency of the accommodation station 104. FIG. 23 describes the process of evaluating location, channel, and/or frequency changes for the accommodation station 104. In block 2022, the program 3414 evaluates changing the class, channel, and/or frequency of the accommodation station 104. FIG. 24 describes the process of evaluating class, channel, and/or frequency changes for the accommodation station 104.

Figure 25:
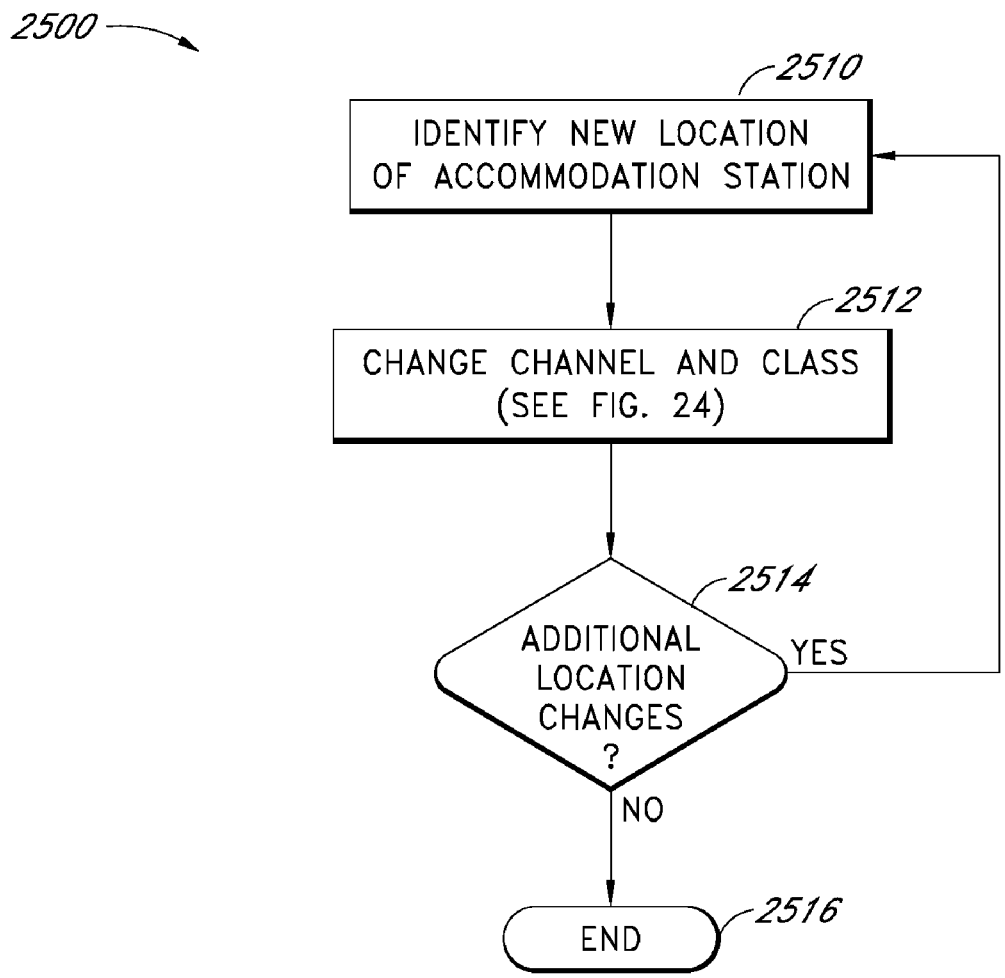
FIG. 25 is a flow chart illustrating a process to identify possible changes of the accommodation station location, class, channel and/or frequency, according to an embodiment of the invention.

In block 2024, the program 3414 evaluates changing the location, class, channel, and/or frequency of the accommodation station 104. FIG. 25 describes the process of evaluating location, class, channel, and/or frequency changes for the accommodation station 104.

After evaluating changes in location, class, channel, and/or frequency, alone or in combination, for the accommodation station 104, the program 3414, in block 2026, determines if there are additional accommodation stations 104 to study. If there are additional accommodation stations 104, the program 3414 returns to block 2010, where the steps 2010-2024 are repeated for another accommodation station 104. The program 3414 repeats steps 2010-2024 until the accommodation stations 104 that have been identified for the target station 100 have been evaluated. When the identified accommodation stations 104 for the target station 100 have been evaluated, the process 2000 ends in block 2028.

FIG. 21 is a flow chart illustrating a process 2100 to evaluate possible changes of the accommodation station location, according to an embodiment of the invention. In block 2110, the program 3414 identifies a new location for the accommodation station 104. In block 2112, the program 3414 determines if the accommodation station scenario is feasible. FIG. 8 describes the process of determining whether the scenario is feasible.

If the scenario is feasible, the program 3414 scores the scenario in block 2116. FIG. 14 describes the scoring process. In block 2118, the program 3414 identifies a new community of license for the accommodation station 104, if needed. FIG. 15 describes the process of identifying a new community of license.

In block 2120, the program 3414 identifies a replacement station if needed. FIG. 33 describes the process of identifying a replacement station. An accommodation station 104 may need to have part or all of its previous coverage area replaced by a replacement station. In other embodiments, regulations can require a replacement station to continue service to the community. For example, the FCC requires a new community of license station if the accommodation station 104 is the only station licensed to provide service to the community of license and it is relocated outside of the community of license. In further embodiments, for business reasons, the owner of the accommodation station 104 may desire a replacement station that covers a user-defined target market or area. In an embodiment, replacement stations comprise FM and/or AM radio stations.

If the scenario in block 2112 is not feasible, the program 3414 analyzes accommodation scenarios in block 2114. FIG. 20 describes the process of analyzing accommodation scenarios.

After evaluating the change in the accommodation station location, the program 3414, in block 2122, determines if there are additional locations to study. If there are additional locations, the program 3414 returns to block 2110, where the steps 2110-2120 are repeated for the identified accommodation station 104 at another location. The program 3414 repeats steps 2110-2120 until the locations that have been identified for the accommodation station 104 have been evaluated. When the identified locations for the accommodation station 104 have been evaluated, the process 2100 ends in block 2124.

FIG. 22 is a flow chart illustrating a process 2200 to evaluate changes of the accommodation station location and class, according to an embodiment of the invention. In block 2210, the program 3414 identifies a new accommodation station location. In block 2212, the program 3414 evaluates class changes for the accommodation station at the new location. FIG. 17 describes the process of evaluating class changes.

In block 2214, the program 3414 determines if there are additional locations. If there are more locations at which to evaluate the accommodation station 104, the process 2200 moves to block 2210, where the steps 2210-2214 are repeated for the accommodation station 104 at another location. The program 3414 repeats steps 2210-2214 until the identified locations have been evaluated. When the identified locations for the accommodation station 104 have been evaluated, the process 2200 ends in block 2216.

FIG. 23 is a flow chart illustrating a process 2300 to evaluate changes of the accommodation station location, channel and/or frequency, according to an embodiment of the invention. In block 2310, the program 3414 identifies a new accommodation station location. In block 2312, the program 3414 evaluates channel and/or frequency changes for the accommodation station 104 at the new location. FIG. 16 describes the process of evaluating channel and/or frequency changes.

In block 2314, the program 3414 determines if there are additional locations. If there are more locations at which to evaluate the accommodation station 104, the process 2300 moves to block 2310, where the steps 2310-2314 are repeated for the accommodation station 104 at another location. The program 3414 repeats steps 2310-2314 until the locations have been evaluated. When the identified locations for the accommodation station 104 have been evaluated, the process 2300 ends in block 2316.

FIG. 24 is a flow chart illustrating a process 2400 to evaluate changes of the accommodation station class, channel, and/or frequency, according to an embodiment of the invention. In block 2410, the program 3414 identifies a new accommodation station channel and/or frequency. In block 2412, the program 3414 evaluates class changes for the accommodation station 104 having the new channel and/or frequency. FIG. 17 describes the process of evaluating class changes.

In block 2414, the program 3414 determines if there are additional channel and/or frequency changes. If there are more channels and/or frequencies at which to evaluate the accommodation station 104, the process 2200 moves to block 2410, where the steps 2410-2414 are repeated for the accommodation station 104 at another channel and/or frequency. The program 3414 repeats steps 2410-2414 until the identified channel and/or frequency changes have been evaluated. When the identified channel and/or frequency changes for the accommodation station 104 have been evaluated, the process 2400 ends in block 2416.

FIG. 25 is a flow chart illustrating a process to evaluate changes of the accommodation station location, class, channel, and/or frequency, according to an embodiment of the invention. In block 2510, the program 3414 identifies a new accommodation station location. In block 2512, the program 3414 evaluates class, channel, and/or frequency changes for the accommodation station 104 at the new location. FIG. 24 describes the process of evaluating class, channel, and/or frequency changes.

In block 2514, the program 3414 determines if there are additional locations. If there are more locations at which to evaluate the accommodation station 104, the process 2500 moves to block 2510, where the steps 2510-2514 are repeated for the accommodation station 104 at another location. The program 3414 repeats steps 2510-2514 until the identified locations have been evaluated. When the identified locations for the accommodation station 104 have been evaluated, the process 2500 ends in block 2516.

To facilitate the search for a new location for the accommodation station 104, the search can be restricted to areas that are more likely to produce results efficiently. In an embodiment, the program 3414 considers locations within a user-defined area of arbitrary shape and size surrounding the accommodation station 104. In another embodiment, the search area can be divided into any user-defined polygon or set of polygons.

In yet another embodiment, the program 3414 considers locations that are no farther than a user-defined maximum distance from the accommodation station 104. In this embodiment, the search forms a portion of a circle around the accommodation station 104.

The search area in any of the above search embodiments can be further divided into sectors of feasibility as cones or as polygons and each of these cones or polygons is searched for new potential locations for the accommodation station 104. The number of cones is user-defined. The search within each cone terminates when a user-specified distance is reached, or when a new violation of the regulations is encountered. In the FM radio example, the search distance from the accommodation station 104 terminates when the FCC Rules sections 73.207 and 73.215 are violated. In other words, the spacing requirements between the possible accommodation station 104 and yet another station are not met.

Figure 26:
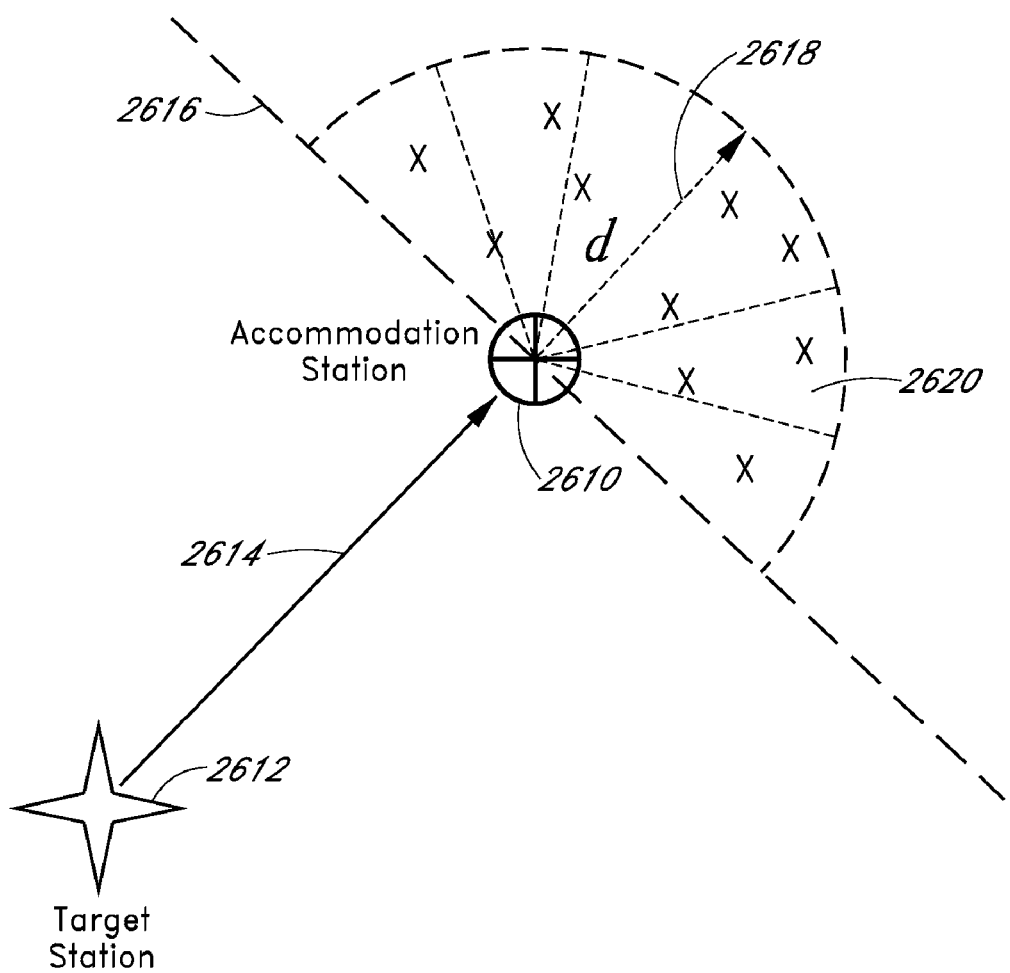
FIG. 26 is a graphical representation of a single accommodation station location change, according to an embodiment of the invention.

FIG. 26 is a graphical representation of a single accommodation station location change illustrating possible new locations for an accommodation station 2610. As illustrated in FIG. 26, the accommodation station 2610 conflicts with a target station 2612. In order to create a feasible scenario for the target station 2612, the program 3414 evaluates the accommodation station 2610 at various new locations to determine if moving the accommodation station 2610 to a new location resolves the conflict with the target station 2612.

The program 3414 determines which locations to search by determining the bearing 2614 of the accommodation station 2610 from the target station 2612. Next, the program 3414 determines a boundary 2616 passing through the accommodation station 2610 and perpendicular to the bearing 2614. In an embodiment, the user specifies a radius of distance d 2618 from the accommodation station 2610 and the program 3414 searches an area 2620 defined by the radius d 2618 from the accommodation station and the boundary 2616 for station locations. The program 3414 considers station locations, as specified in FIG. 4, for example, within the area 2618. In an embodiment, station locations comprise the locations of real, hypothetical, and mutually exclusive towers, repeaters, translators, antennas, self-supporting structures, guide towers, building rooftop locations, locations suitable for a broadcast antenna, and the like.

In an embodiment, the program 3414 searches for stations along the radius d 2616 until the station location becomes infeasible with respect to other stations or until the program 3414 reaches the distance d. The program 3414 saves the feasible stations as possible accommodation station locations.

To accommodate a scenario target station 100, in some embodiments, it is possible that more than one accommodation station 104 be relocated to comply with applicable communications and/or regulatory laws. In one embodiment, the program 3414 can simultaneously relocate the stations in parallel, or in another embodiment, the program 3414 can relocate the stations sequentially. In another embodiment, any combination of parallel and sequential moves can be applied to accommodate a target station 100 and one or more accommodation stations 104.

Figure 27:
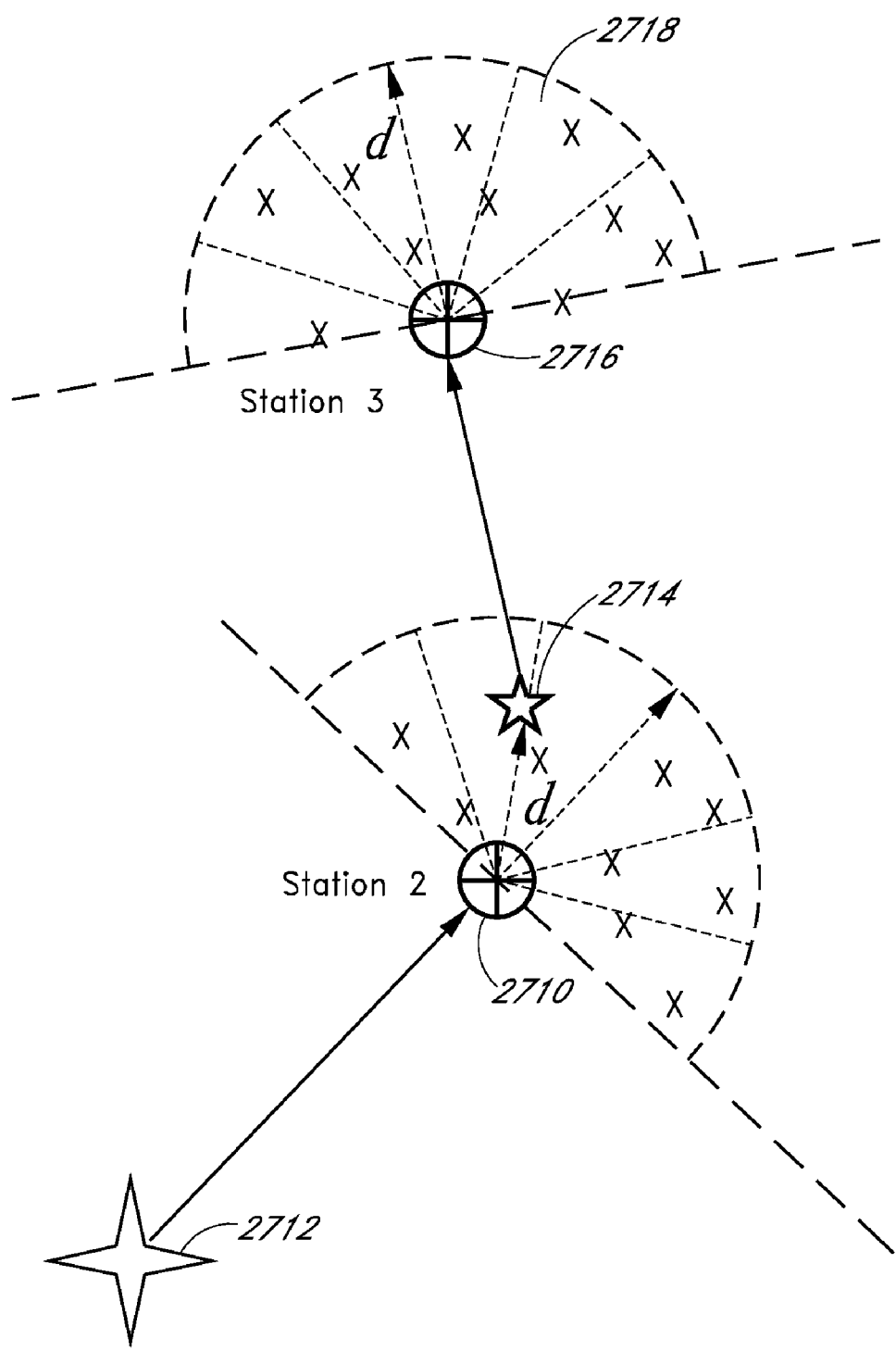
FIG. 27 is a graphical representation of multiple accommodation station location changes, according to an embodiment of the invention.

FIG. 27 is a graphical representation of multiple accommodation station location changes, according to an embodiment of the invention. As illustrated in FIG. 27, the program 3414 has cascaded two accommodation stations. A first accommodation station 2710 (Station 2) conflicts with a target station 2712. By moving the accommodation station 2710 to a new location 2714, the interference between the accommodation station 2710 (Station 2) and the target station 2712 is resolved, but the target scenario is not feasible due to a conflict between the accommodation station 2710 (Station 2) and a second accommodation station 2716 (Station 3). The program 3414 searches for a new location for the accommodation station 2716 within an area 2718.

FIG. 28 is a screen shot illustrating a table of 2800 possible target stations 100, according to an embodiment of the invention. The table has one entry for each station 100 that was studied for the defined market or area 102. Each row of the table 2800 shows the best scenario for each of the existing stations 100 that the program 3414 evaluated. In this example, the table 2800 comprises a call column 2810, a class column 2812, a city column 2814, an in market population column 2816, a percentage of the market increase column 2818, a total percentage of the market column 2820, and a composite score column 2822. The call column 2810 displays the call letters of the existing facility and the class column 2812 displays the class of the existing facility. The city column 2814 displays the community of license and the state for the facility.

The in market population column 2816 displays the total population and/or demographics within the market that is covered by the best scenario. The percentage of the market increase column 2818 displays the increase of market coverage between the best scenario and the existing facility as a percentage. The total percentage of the market column 2820 displays the amount of the market that is covered by the best scenario as a percentage of population and/or demographics. The composite score column displays the composite score of the best scenario for the station. The composite score is a combination of the implementation score, based on applicable communications and/or regulatory laws, and the population improvement score, based on market coverage improvement.

Figure 29:
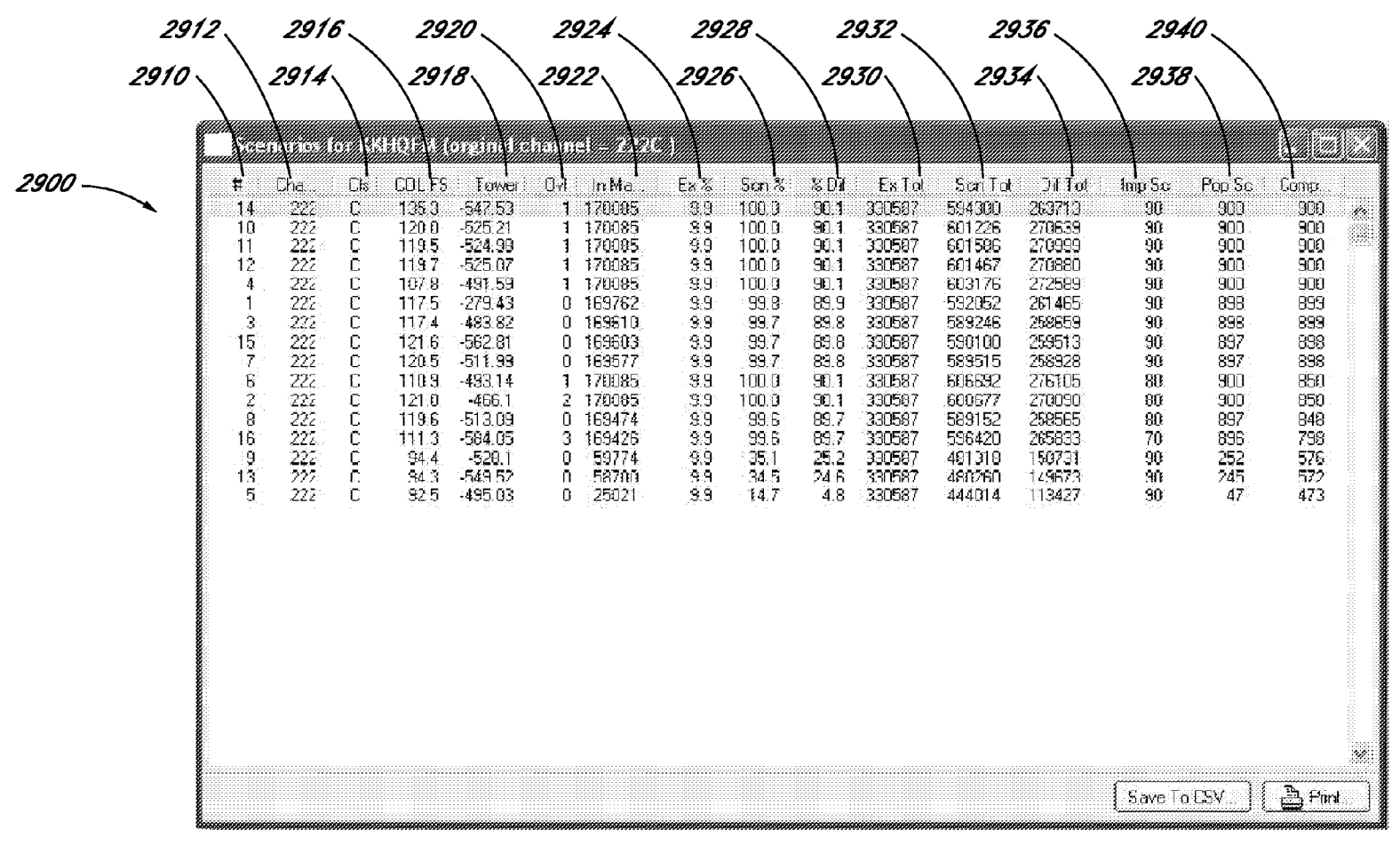

FIG. 29 is a screen shot illustrating a table of scenarios 2900 for the target station 100, according to an embodiment of the invention. The title bar area of the table 2900 displays the call letters, channel, and class of the existing facility. In this example, the table shows 16 scenarios that the program 3414 evaluated for station KKHQ-FM, which is the first target station 100 listed in FIG. 28. The table comprises a number column 2910, which is used for reference, a channel column 2912, which displays the channel number for a given scenario, and a class column 2914, which displays the class for the given scenario.

The table 2900 further comprises the community of license field strength column 2916, the tower column 2918, and the overlaps column 2920. The community of license field strength column 2916 displays the field strength in dBu at the community of license coordinates given the scenario's parameters. The tower column 2918 displays the difference between the actual tower height listed in the database 3416, such as, for example, the ASR database or the FM/TV database and the height used for calculating the scenario. A negative number indicates the tower height is less than the scenario height. The overlaps column 2920 displays the number of field strength contour overlaps in the scenario, or in other words, the number of accommodation stations 104.

The table 2900 further comprises an in market population column 2922, an existing facility percentage column 2924, a scenario percentage column 2926, and a difference percentage column 2928. The in market population column 2922 displays the total population and/or demographics coverage of the scenario in the market. The existing facility percentage column 2924 displays the existing facility percentage of the market coverage, the scenario percentage column 2926 displays the scenario percentage of market coverage, and the difference percentage column 2928 displays the difference between the scenario and existing facility market coverages.

The table 2900 further comprises an existing facility population column 2930, which displays the total population and/or demographics coverage of the existing facility, a scenario population column 2932, which displays the total population and/or demographics coverage of the scenario facility, and a difference population column 2934, which displays the difference between the scenario coverage and the existing facility coverage. The table 2900 further comprises an implementation score column 2936, a population score column 2938, and composite score column 2940.

Figure 30:
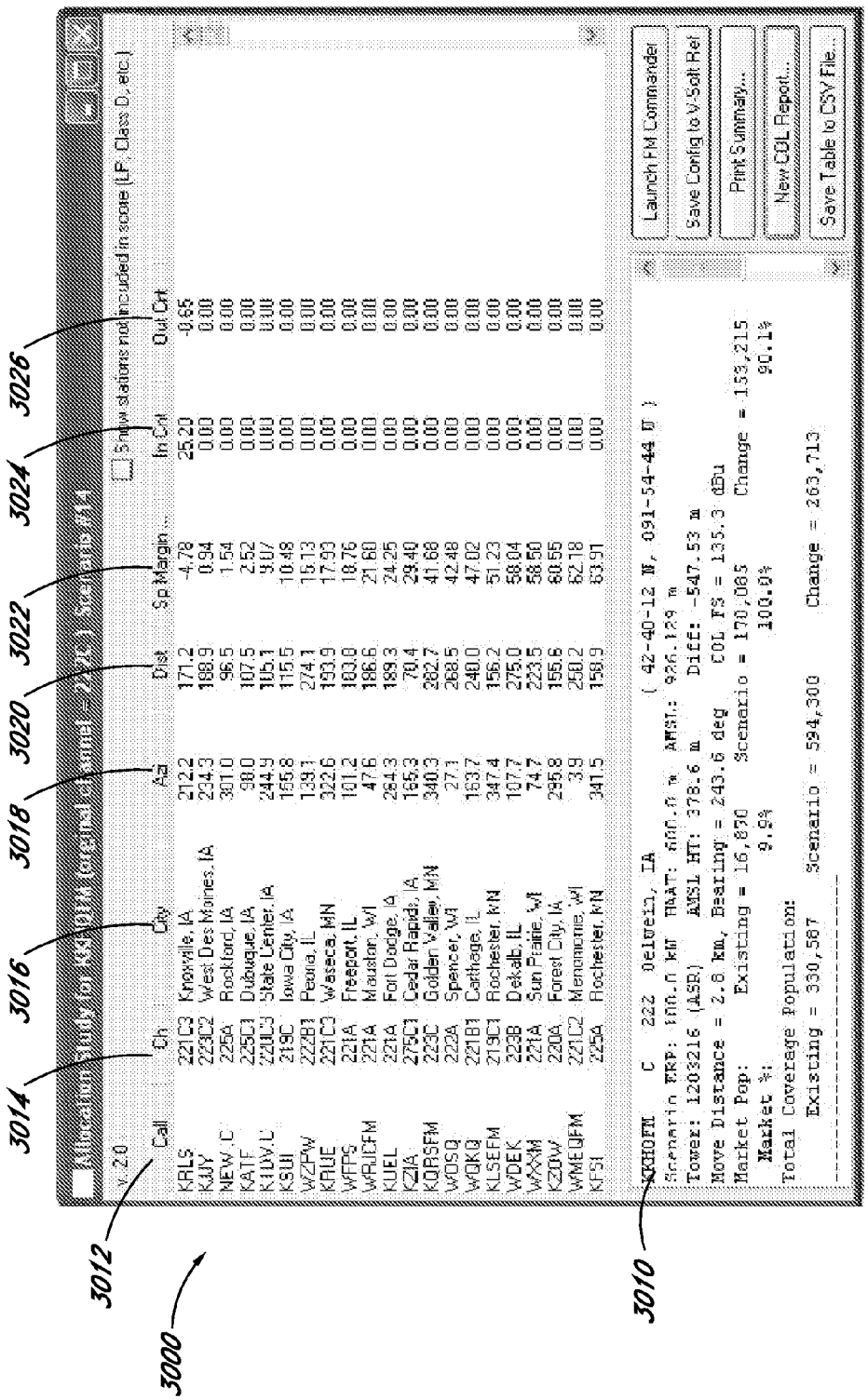
FIG. 30 is a screen shot illustrating a list stations having an allocation relationship with the target station, according to an embodiment of the invention.

FIG. 30 is a screen shot illustrating an allocation table 3000 listing allocation study information for the specific scenario, according to an embodiment of the invention. The title bar of table 300 comprises the call letters, original channel and class, and scenario number. In this example, the table 3000 displays the allocation study for KKHQ-FM scenario 14, which is the first scenario listed in table 2900. Each row in the allocation table 3000 contains a station with which the scenario station configuration has an allocation relationship. A text box 3010 at the bottom of the screen shot shows a summary of the scenario configuration and changes made to the existing facility in the scenario.

The table 3000 comprises a call column 3012, which displays the call letters of the station, a channel column 3014, which displays the station channel number, and a community of license column 3016, which displays the community of license and state for the station.

The table 3000 further comprises an azimuth column 3018, which displays the azimuth from the reference station in degrees, and a distance column 3020 which displays the distance between the stations. Column 3022 displays the spacing margin for the separation and channel/class relationship between the two stations. This is the difference between the required separation and the actual separation. If it is negative, then the configuration fails to meet the required spacing. In an embodiment, the spacing margin is displayed in km and is based on FCC Rules. In this example, the negative spacing margin value in row 1 corresponds to the one overlap for station KKHQ-FM scenario 14, as displayed in table 2900, row 1, column 2920.

The table 3000 further comprises an in contour column 3024, and an out contour column 3026. The in contour column 3024 displays the direct line distance between the protected field strength contour of the reference station and the interfering field strength contour of the station in the table. If it is less than zero, it indicates that the station in the table is causing field strength contour overlap to the reference station. In an embodiment, this value is not calculated if the spacing requirement is met. The out contour column 3026 displays the direct line distance between the interfering field strength contour of the reference station and the protected field strength contour of the station in the table. If it is less than zero, it indicates that the reference station is causing field strength contour overlap to the station in the table. In an embodiment, this value is not calculated if the spacing requirement is met.

FIG. 31 is a screen shot illustrating a table of scenarios 3100 for target station KXXI, according to an embodiment of the invention. The candidate station for reengineering is station KXXI near Albuquerque, N. Mex. As shown in the table 3100, the program 3414 identified 28 target scenarios for KXXI. Of the 28 scenario, 12 are not viable because they would result in a reduction in population and/or demographics covered by the target station. Of the remaining 16 scenarios, 5 of them, scenario numbers 5, 7, 24, 21, and 20, do not have any identified conflicts. Therefore, these scenarios need only be scored.

The other 11 scenarios have one or two conflicts with other stations. The program 3414 evaluates possible changes to the conflicted or accommodation stations 104 in order to make the 11 conflicted scenarios feasible for target station KXXI.

In scenario 4, for example, the program 3414 moves station KXXI to a new tower location without changing the channel, the frequency or the class of the original station (FIG. 7). Next, the program 3414 evaluates the feasibility of scenario 4 (FIG. 8) and determines that moving the location of KXXI results in conflicts with two stations, KZRR, a class C station on channel 231, and KKOB-FM, a class C station on channel 227. The new location of KXXI can potentially be made feasible by changing the accommodation stations channel, frequency, class, or location.

The program 3414 next evaluates potential accommodation scenarios for KZRR and KKOB-FM (FIG. 20). In a first accommodation scenario, the program 3414 changes the class of KZRR and KKOB-FM to class C3, evaluates the feasibility of the accommodation scenario, and determines that the accommodation class changes make scenario 4 feasible.

In a second accommodation scenario, the program 3414 changes the channel of KZRR to 233 to remove the conflict between KXXI and KZRR. The program 3414 evaluates the accommodation scenario and determines that it is not a feasible accommodation because changing the channel of KZRR creates new conflicts between KZRR and other stations in the area. However, it may be yet possible to cascade additional accommodation changes to resolve the conflict between KZRR and the other stations in the area.

In a third accommodation scenario, the program 3414 changes the location of KZRR and KKOB-FM, evaluates the feasibility of the accommodation scenario, and determines that the accommodation location changes make the new location of KXXI in scenario 4 feasible.

Figure 34:
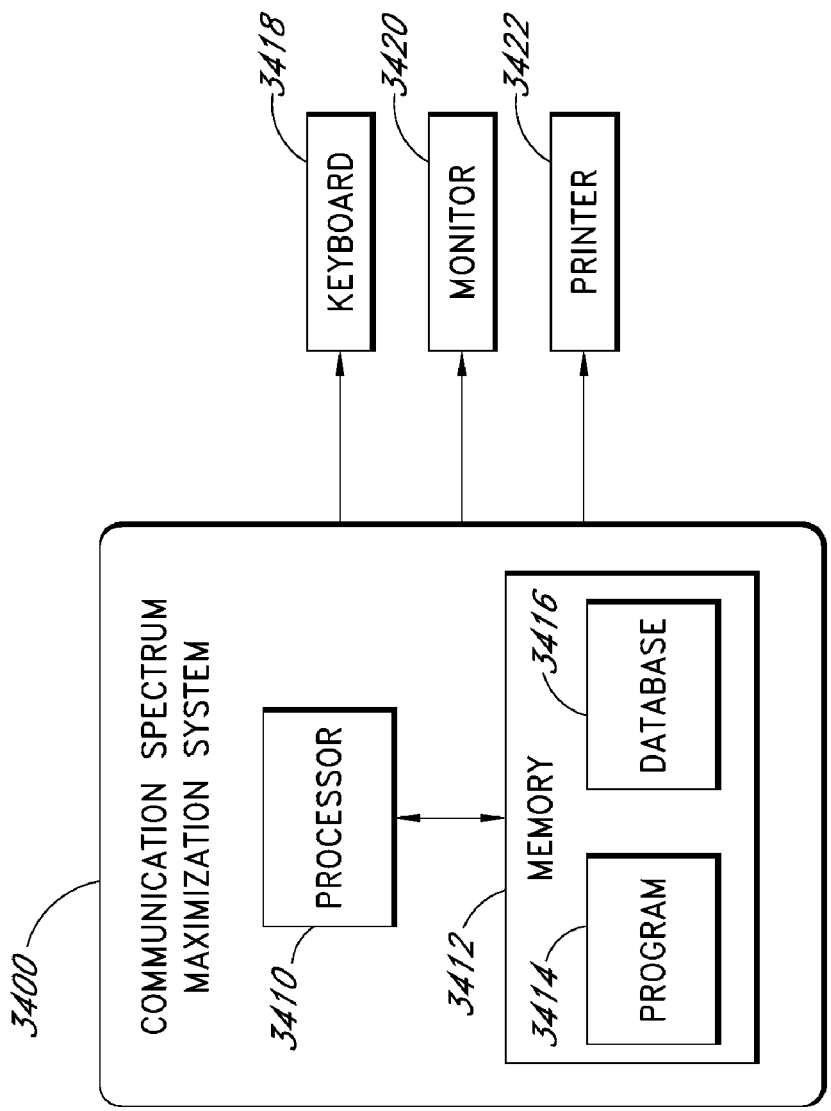
FIG. 34 is a schematic of a communication spectrum improvement system, according to an embodiment of the invention.

In an embodiment, a computer-based software application or firmware/hardware based application and/or program performs calculations to analyze, manage, and/or vary location, power, class, antenna height, format channel and/or frequency of points of communication in the communication spectrum. FIG. 34 is a schematic of a communication spectrum improvement system 3400, according to an embodiment of the invention. The communication spectrum improvement system 3400 comprises the computer 3410, and memory 3412 comprising the communication spectrum program 3414 and database information 3416. In an embodiment, the database information 3416 comprises at least one of a terrain database, a demographic database, a location database, a station database, an FCC database, a tower database, and the like. The communication spectrum improvement system 3400 interfaces with users through user input/output devices. In an embodiment, the user enters information through a keyboard 3418 and receives output from the communication spectrum improvement system 3400 through a monitor 3418 and/or a printer 3420. In other embodiments, other user input/output devices can be used The application or program 3414 executes on one or more computers 3410 and comprises program 3414 logic. In an embodiment, the application 3414 executes on a Windows based platform. In an embodiment, the term "channels" comprises transmission points, "virtual" repeaters, "virtual"

boosters, and/or "virtual" translators. In an embodiment, the communication spectrum ranges from approximately 3 kHz to approximately 300 GHz.

The computers 3410 comprise, by way of example, processors, program logic, or other substrate configurations representing data and instructions which operate as described herein. In other embodiments, the processors 3410 can comprise controller circuitry, processor circuitry, processors, general-purpose single-chip or multi-chip microprocessors, digital signal processors, embedded microprocessors, microcontrollers and the like.

In one embodiment, the program logic 3414 may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines segments of program code, drivers, firmware, microcode, circuitry, data, databases, data structures, tables, arrays, or variables.

The term "output" describes any type of results generated by the program 3414 including conclusion or analysis information after calculations have been completed. The output can include, but is not limited to, information displayed on the computer monitor 3420, information input into a database and/or spreadsheet program, information printed out from the printer 3422 as a report and/or readable by any machine and/or computer that can then take the information and perform further analysis, and/or other information outputs generated by the program 3414.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computerized method of improving the coverage of a target area by an existing radio transmitter, the method comprising:

analyzing with one or more computer processors potential changes in the signal coverage of a target area associated with potential alternative classes for an existing radio transmitter based on predictions of changes in the signal coverage associated with the potential alternative classes, wherein the existing radio transmitter comprises at least one of the group consisting of: an AM radio transmitter, an FM radio transmitter and a television transmitter;

testing whether the potential alternative classes are feasible by automatically accessing with one or more computer processors a database of FCC rules, wherein testing whether the potential alternative class is feasible comprises:

determining spacings between the existing radio transmitter and at least one of multiple other existing radio transmitters, wherein the existing radio transmitter and the at least one of the multiple other existing radio transmitters form a broadcast pair;

comparing each spacing with a distance; and determining the potential alternative class is feasible when the spacings are greater than the distance;

wherein if the potential alternative class of the existing radio transmitter is infeasible due to interference from the at least one of the multiple other existing radio transmitters, the method further comprising analyzing one or more potential alternative locations, potential alternative channels, potential alternative frequencies, and potential alternative classes of the at least one of the multiple other existing radio transmitters to potentially remove the interference;

scoring the potential alternative classes based on user defined criteria;

ranking the potential alternative classes based on the scoring of the potential alternative classes;

determining a feasibility of the potential alternative locations for the at least one of the multiple other existing radio transmitters;

determining the feasibility of the potential alternative channels and the potential alternative frequencies for the at least one of the multiple other existing radio transmitters;

determining the feasibility of the potential alternative classes for the at least one of the multiple other existing radio transmitters;

determining the feasibility of potential alternative classes at each potential alternative location for the at least one of the multiple other existing radio transmitters;

determining the feasibility of potential alternative channels potential alternative frequencies at each potential alternative location for the at least one of the multiple other existing radio transmitters;

determining the feasibility of potential alternative classes at each potential alternative channel and potential alternative frequency for the at least one of the multiple other existing radio transmitters;

determining the feasibility of each potential alternative class and each potential alternative channel and potential alternative frequency at each potential alternative location for the at least one of the multiple other existing radio transmitters;

scoring the potential alternative locations, the potential alternative classes, and the potential alternative channels and the potential alternative frequencies of the at least one of the multiple other existing radio transmitters; and ranking the potential alternative locations, the potential alternative classes, and the potential alternative channels and the potential alternative frequencies of the at least one of the multiple other existing radio transmitters based on the scoring of the potential alternative locations, the potential alternative classes, and the potential alternative channels and the potential alternative frequencies.

2. The method of claim 1, wherein if the potential alternative class of the at least one of the multiple other existing radio transmitters is infeasible due to interference from one or more additional existing radio transmitters, the method further comprising analyzing one or more potential alternative locations, potential alternative channels, potential alternative frequencies, and potential alternative classes of the one or more additional existing radio transmitters to potentially remove the interference from the one or more additional existing radio transmitters.

* * * * *